US008300219B1

(12) United States Patent
Gordin et al.

(10) Patent No.: US 8,300,219 B1
(45) Date of Patent: Oct. 30, 2012

(54) APPARATUS, SYSTEM, AND METHODS OF PRECISION AIMING AND INSTALLATION OF PRE-AIMED DEVICES AND METHOD OF COMPOSITE LIGHTING ON TARGET AREA

(75) Inventors: Myron Gordin, Oskaloosa, IA (US); David L. Barker, Ottumwa, IA (US); Timothy J. Boyle, Oskaloosa, IA (US); Christopher T. Chantos, Davenport, IA (US); Philip D. Hol, New Sharon, IA (US); Darrell D. Rogers, Oskaloosa, IA (US); Kenneth G. Lewis, Jr., New Sharon, IA (US); Timothy D. McGill, Pleasantville, IA (US)

(73) Assignee: Musco Corporation, Oskaloosa, IA (US)

( * ) Notice: Subject to any disclaimer, the term of this patent is extended or adjusted under 35 U.S.C. 154(b) by 114 days.

(21) Appl. No.: 12/534,335

(22) Filed: Aug. 3, 2009

Related U.S. Application Data

(63) Continuation of application No. 12/418,379, filed on Apr. 3, 2009, now abandoned.

(60) Provisional application No. 61/042,613, filed on Apr. 4, 2008.

(51) Int. Cl.
*G01C 3/08* (2006.01)

(52) U.S. Cl. ......... 356/139.05; 356/139.01; 356/139.07; 356/139.09; 356/141.1; 356/152.2; 362/259; 362/269

(58) Field of Classification Search .................. 356/138, 356/139.05; 362/259, 269, 414, 431
See application file for complete search history.

(56) References Cited

U.S. PATENT DOCUMENTS

| | | | | |
|---|---|---|---|---|
| 4,450,507 | A | 5/1984 | Gordin | |
| 5,398,478 | A | 3/1995 | Gordin et al. | |
| 5,944,413 | A * | 8/1999 | Crookham et al. | 362/431 |
| 6,340,790 | B1 | 1/2002 | Gordin et al. | |
| 7,171,793 | B2 * | 2/2007 | Gordin et al. | 52/848 |
| 7,500,764 | B2 | 3/2009 | Gordin | |
| 7,600,901 | B2 * | 10/2009 | Gordin et al. | 362/431 |
| 2006/0176695 | A1 * | 8/2006 | Gordin et al. | 362/263 |
| 2006/0245189 | A1 * | 11/2006 | Gordin | 362/234 |

(Continued)

OTHER PUBLICATIONS

"NDI:Accurate Measurement Solutions for Medical, Industrial, and Life Sciences Application", 2008 Northern Digital, Inc., Retrieved from the Internet Apr. 6, 2009: http://www.ndigital.com., 1 page.

(Continued)

*Primary Examiner* — Luke Ratcliffe
(74) *Attorney, Agent, or Firm* — McKee, Voorhees & Sease, P.L.C.

(57) ABSTRACT

Methods and apparatuses are provided that can be utilized for accurate pre-aiming and installation of devices. The devices are pre-set to an aiming orientation relative to a universal reference plane. The reference plane is then correlated to a feature of a pole, tower, or other structure that will be used to elevate or suspend the devices. A position sensing subsystem is utilized to inform a worker when each device is correctly angularly oriented to the reference plane. The worker simply moves the mounting structure for the device to the correct three-dimensional angular orientation, uses the position sensor to confirm the correct orientation to within a highly accurate margin of error, and either locks the device in that orientation or marks the orientation. The pole, tower, or other elevating structure is then preliminarily erected at its pre-designed location and pre-designed rotational orientation with the pre-aimed devices.

25 Claims, 31 Drawing Sheets

U.S. PATENT DOCUMENTS

2009/0135411 A1* 5/2009 Gordin .......................... 356/138
2009/0135596 A1* 5/2009 Gordin .......................... 362/241

OTHER PUBLICATIONS

"OPTOTRAK PROseries Optical Tracker", Retrieved from the Internet Apr. 6, 2009: http://www.ndigital.com/industrial/optotrakproseries-models.php. , 2 pages.

"Baldor Electric Company, a leader in energy efficient electric motors, linear motors and . . . " Retrieved from the Internet Apr. 6, 2009: http://www.baldor.com, 1 page.

"Virtual Reality—Virtual Realities!!!—Worldwide Distributor of Virtual Realities", Retrieved from the Internet Mar. 6, 2009: http://www.VREALITIES.COM/, 3 pages.

"Motion Capture—Meta Motion sells Motion Capture Hardware and Software—Mocap", Retrieved from the Internet Apr. 6, 2009: http://www.metamotion.com, 1 page.

StockerYale—Line Laser, Machine Vision Laser—Lasiris SNF Laser, Retrieved from the Internet Apr. 6, 2009: http.//www.stockeryale.com/i/lasers/products/snf.htm, 2 pages.

"5DT Fifth Dimension Technologies" "Virtual Reality for the Real World!" "Welcome to the Fifth Dimension!", Retrieved from the Internet Apr. 6, 2009: http://www.5dt.com, 1 page.

* cited by examiner (INITIAL LOG-ON SCREEN; SHOWS, INTER ALIA, OPERATOR'S I.D. # AND JOB ASSEMBLY # OR I.D.)

APPARATUS, SYSTEM, AND METHODS OF PRECISION AIMING AND INSTALLATION OF PRE-AIMED DEVICES AND METHOD OF COMPOSITE LIGHTING ON TARGET AREA

CROSS-REFERENCE TO RELATED APPLICATIONS

This application is a Continuation Application of U.S. Ser. No. 12/418,379 filed Apr. 13, 2009, now abandoned, which claims priority under 35 U.S.C. §119 to provisional application Ser. No. 61/042,613 filed Apr. 4, 2008, herein incorporated by reference in their entirety.

I. BACKGROUND OF THE INVENTION

A. Field of the Invention

The present invention relates to pre-installation, precise preliminary aiming of devices to pre-designed orientations, and then efficient and precise installation with precise final aiming, and in particular, to a comprehensive system of preliminary aiming and then installation, and also to specific apparatuses and methodologies that can be used in parts or components of the comprehensive systems.

B. Problems in the Art

A variety of devices exist that need to be installed in relatively precise pre-determined orientation(s) or directions. One example is wireless communications tower devices such as are found on cellular telephone, land mobile radio, or television towers. Normally the transmitter(s) or receiver(s) are installed in pre-planned geographical direction(s) for best signal coverage for a given geographic area. Another example is airport runway towers. The orientation of such lights must be directional and unequivocal to help pilots locate and guide the plane to the runway. A further example is lighting fixtures. Arrays of lighting fixtures are suspended on tall poles. Each fixture is individually oriented in reference to certain unique points on or near the field or target to be lighted. The orientations of each fixture are many times pre-determined to attempt to meet intensity and uniformity minimums across the field or target.

One way to aim or orient such device(s) to its/their desired installed position is to erect the supporting structure and then elevate a worker to the device(s). Each device is then manually adjusted to some approximate orientation by the elevated worker. Alternatively, some method can be devised to find or measure relative to the predetermined orientation. In any event, it is usually difficult for one worker to adjust, aim, and then lock in correct orientation relatively large and cumbersome devices when elevated high in the air or when standing high on a tower. This is especially true if outdoors. Wind, precipitation, or other outside environment factors can make this work very difficult. Even with two or more workers, it is still difficult to adjust, aim and lock in the correct orientation from these high elevations. Additionally, the precise orientation of the devices is difficult to achieve with tools and methods commonly available to field workers.

In the example of sports lighting systems, if the poles and fixtures are erected and then aimed, one or more workers must be elevated high up in the air in difficult working conditions and try to communicate with persons on the ground who would direct the aiming of each fixture. This would use up substantial amounts of time and labor. It usually would require much trial and error. Human error enters into these methods. It is quite difficult to visually identify the center of a beam with the human eye from hundreds of feet, even if attempted at night with the beam projected onto the field. If windy or otherwise unfavorable environmental conditions exist, it is quite difficult for the worker up at the fixtures to be accurate. The mere fact that a crane or other elevating system must be used for substantial periods of time (and thus taken away from other productive use) is quite inefficient and costly.

To reduce field installation time and improve the accuracy of the device orientation or aiming, a preliminary orientation may be set by the manufacturer prior to shipment. This is generally a good practice since the manufacturer or designer of the system understands the needs of the device aiming better than the installation crew. However, accurate preliminary aiming at the manufacturer or assembler can be challenging. Any errors introduced during assembly are often compounded by additional errors during installation. In addition, variances in manufacturing process, personnel and components can also interject errors in the device orientation.

In these examples, accuracy of the final installed aiming can be very important, if not critical. Take the case of a system of lighting fixtures elevated to substantial heights and aimed to specifically predetermined aiming points in the area to be illuminated. One reason to do so is to place light in specific locations. Still further, this can be important when the lighting system includes multiple fixtures. Instead of random or rough aiming of fixtures to achieve lighting of the target area, efficient utilization of light, as well as better uniformity and intensity levels, can be accomplished according to a predesigned plan of aiming each fixture to aiming points in the target area. With recent technological advances in the lighting efficiency from sports lighting fixtures, for example those manufactured by Musco Sports Lighting, LLC of Oskaloosa, Iowa, USA, the precise orientation of the fixtures is desirable to ensure the light is directed to the intended location. Tighter control of the light beam helps reduce wasted light and spill light off the target area. However, it also requires the installation and orientation of the lights to be more exact.

The concept of a pre-designed fixture aiming plan is well known in the sports lighting field. The lighting system must meet minimum intensity and uniformity requirements for the target area. One example is lighting for an athletic field. Computer programs are available and widely used to compute the number of lighting fixtures and their aiming orientation to the target area based on pole locations and light output characteristics from the lighting fixtures. By referring, for example, to FIG. 17 and issued U.S. Pat. No. 7,500,764 entitled “Method, Apparatus, and System of Aiming Lighting Fixtures” and related U.S. application Ser. Nos. 12/270,098, now U.S. Pat. No. 7,918,586, and 12/323,838, each of which is incorporated by reference herein, diagrammatic illustrations of a concept of different angular aiming orientations for multiple fixtures elevated on poles relative to a sports field are shown. There is a need to cover the entire field in a comprehensive and uniform manner. Most times each fixture is aimed to a unique point on the field.

By choice or necessity, many times lighting fixtures are elevated to substantial heights (e.g. from 35 to 150 feet). Also they may be elevated on poles which are offset from the target area such that the distances from each fixture to its aiming location on the field are substantial, even up to hundreds of feet. It can be appreciated, and is well known in the art, that accurate placement of the center of a light beam from a lighting fixture at these great distances from the aiming point is not trivial. In fact, it is quite difficult. Furthermore, any misalignment from the aiming point of even a few degrees (or even less) vertically or horizontally can shift the beam from its intended projection onto the field significantly. Geometrically, a few degrees of offset at the top of a pole hundreds of feet away can shift the beam center quite a few feet. For example, a fixture elevated at 100 feet and aimed 60 degrees from nadir can be off its target aiming point by over 7 feet when the vertical aiming orientation is off by a mere 1 degree (61 degrees from nadir). Thus, such variances from exact aiming accuracy can upset the composite lighting of the target area enough that it would potentially negatively impact intensity and uniformity requirements for such a field.

These types of concerns have been discussed in co-owned issued U.S. Pat. No. 7,500,764 and related U.S. application Ser. Nos. 12/270,098, now U.S. Pat. No. 7,918,586, and Ser. No. 12/323,838. Not only is it difficult to get precise aiming of lighting fixtures that are attached to cross arms on poles, the methodology of aiming is cumbersome and can be quite inefficient from a resource standpoint. U.S. Pat. No. 7,500,764 and the related applications cited above describe an aiming method having advantages over other methods which rely on aiming fixtures once the pole(s) are erected by elevating a worker to do so. It places a relatively inexpensive collimated light source, such as laser beam pointer or similar unit, on at least one light fixture on each pole or array of lighting fixtures for the field or target. Each fixture of the pole or array is pre-aimed either on the ground or at the factory. The pole and/or array are then simply pivoted to vertical at the appropriate location for the pole and the alignment beam turned on. If it intersects with the correct aiming point on the target area for that fixture (each fixture has its own designed aiming point on the field that is determined by a lighting layout design), it is assumed each other pre-aimed fixture of the pole or whole array is also correctly aimed since the array is essentially a collective group of devices mounted together on a framework that allows the group to act as a composite unit. However, this assumption may interject substantial error into the lighting design. If the fixture with the alignment beam is incorrectly aimed, even a few degrees of error (or less) could materially disrupt the composite lighting of the field, because it would then be likely that all fixtures on that pole would also end up mis-aimed. Error could exist by human error in aiming the fixture with the alignment beam. Or it could exist because of manufacturing tolerances. For example, the cross-arm on which the fixture is mounted may be warped, or there may be manufacturing error or play in the connection between the fixture and the cross-arm. This method also requires a fairly accurate mount of the alignment beam to the fixture so that it at least coincides with a reference, e.g. vertical plane through the aiming axis of the fixture. If not correctly mounted, the assumption the alignment beam is an accurate reference can interject substantial error into the installation. This method also requires workers to accurately find the appropriate aiming point on the field or target for the alignment beam. This interjects substantial risk of human error into the process. It can be difficult to accurately locate a point on a large area such as an athletic field that is many hundreds of feet in length and width. It is difficult to be precise with a measuring tape of those lengths. Thus, even if this method avoids individual aiming of fixtures after elevated on their poles, there are a number of factors that can interject material error into the installation.

Another aspect of aimed devices is the accuracy of the installation of the support structure the devices are mounted to. Examples are poles, towers, and other tall structures. Many times these tall structures are assembled on the ground and must be raised into vertical position and then precisely lowered onto a support base. For example, the base can be a protruding structure that the pole slip mates over or more of an in-ground footing to which the pole could be attached by anchor bolts. Control of the structure alignment during installation is critical to the accuracy of the aimed devices. Often times, the structure (e.g. pole with light fixtures, tower with wireless transceivers, etc.) is held free by the crane to allow the worker to align the structure as needed to achieve the desired orientation of the aimed devices. However, as the structure is lowered to its final position, the worker would benefit from micro level or fine control over the structure rotation to reduce risk of slight movement or misalignment of the structure that can occur due to lack of control by the worker. A method of controlling the structure orientation during installation is needed and solved by this invention.

Therefore, there is a need in the art for improvements in accurate aiming of lighting fixtures that are elevated on poles or other structures designed for a specific accurate angular orientation to target area aiming points. There is also a need in the art of improvement in accurate aiming of other devices that are elevated or supported on structures to substantial heights.

DEFINITIONS

Certain definitions used in the specification are provided below. Also in the examples that follow, a number of terms are used. In order to provide a clear and consistent understanding of the specification and claims, including the scope to be given such terms, the following definitions are provided.

Aiming, aim, aimed—this refers to the orientation of a device relative some reference, e.g., some known axis projecting from an output side of the device relative to a known coordinate system. For example, the aiming axis of a device such as a lighting fixture, or radio transmitter is generally established by the manufacturer and will typically align with a geometric feature of the device, but is not limited to such.

Device(s)—apparatus(es) that are to be installed at relatively precise pre-determined aiming.

Optical motion capture system—this refers to the system that tracks the position of markers added to or associated with a device and determines the position and orientation of the device. Optical motion capture systems, sometimes referred to as MOCAP in the art, can be based on passive or active markers. An optical component, such as a video camera, captures the markers in its field(s) of view (camera space). A software component tracks the markers in camera space and provides position feedback which correlates camera space position and orientation to real space. In some cases, multiple cameras are required to provide full range of motion and/or sufficient degrees of freedom of movement information. Optional motion capture systems may also be described as a dynamic measuring system. Optional motion capture systems are commercially offered by a variety of sources. A few examples are: Meta Motion of 268 Bush St. #1, San Francisco, Calif. 94104, USA, see www.metamotion.com, or NDI (Northern Digital, Inc.) of 103 Randall Drive, Waterloo, Ontario CANADA N2V IC5, see www.ndigital.com.

Marker(s)—also known in the art as targets, optical targets, active markers, passive marker(s), or optical marker(s). Markers are features or targets used by the position sensors of an optical motion capture system to determine the position and orientation of the device they are mounted to or associated with. Markers are generally mounted on a frame, sometimes called a rigid body. Different types of markers can be used to fit the individual needs of the tracking system or device to be measured or aligned. The markers may be what are called active markers that emit a signal to the position sensor, such as an infrared signal or strobed or pulsed light, such as LEDs. What are called passive markers are retro-reflective and reflect a signal back to its emitter to indicate the position.

Rigid body(ies)—a rigid body is known in physics as a solid body of finite size having a constant distance between any two given points. For purposes of this description, a rigid body has similar meaning. The rigid body is the frame, fixture, or jig that the markers or targets mount to at a known relationship and constant distance from each other and other known points on the frame, fixture, or jig. The position and orientation of a rigid body can be determined by the known points, generally six parameters or more.

Position sensor—an apparatus that can automatically sense a device within the apparatus' effective range and translate the sensing into a position related to a reference in real space. An optical motion capture system is one example of a position sensor.

Target area—the boundary or surface area in which the aiming of a light or other aimed device is intended to be directed. For lighting, it may also be referred to or known in the art as target lighting area, lighting area, illuminated area, area to be illuminated, field, sports field or variations thereof. Some examples of target areas for aimed lighting devices are parking lots, traveled surfaces, and sports fields such as baseball, soccer or football. For non-lighting devices, such as antennas, the target area may be the acceptance angle of the aimed device or area of coverage.

Alignment beam—a beam of light produced by a light source or light that has been altered by a lens or other method into an output pattern that is at least substantially collimated or pseudo-collimated in at least one plane, but which may or may not diverge in other planes. A collimated light beam is generally described as non-diverging, or does not increase in width as distance from light source increases. The light pattern from the alignment beam, when projected onto a surface (e.g. the target area), can be shaped to produce a single dot, a line that diverges in one direction, crosshairs, concentric circles, squares or other shapes. See http://www.stockeryale.com/i/laser/products/snf.htm for more information about laser beams.

Pole—a pole generally refers to an elongated tube or member that supports and elevates one or more aimed device(s). Poles are not limited to round-in-cross section or cylindrical shapes. For example, square, rectangular or even triangular or oval cross sections are common. In addition, poles may vary in size, height and/or taper from larger to smaller cross section as elevation increases.

Elevating structure—a tower or other elevating structure that provides similar function as a pole.

Landmark—this refers to a point, existing or otherwise on or near the target area. The landmark can be a pre-existing, fixed, object at or on the target area or simply an easy-to-determine location or point. An example would be a home base or home base location on a baseball or softball field. Another example would be a vertical leg of a goal on a football or soccer field. Yet another example may be the center of the field. A further example would be a corner edge of a building, an edge of a roadway, or other identifiable feature.

II. BRIEF SUMMARY OF THE INVENTION

It is a principal object, feature, aspect, or advantage to provide apparatus, methods, and systems for precision aiming and/or installation of pre-aimed devices that improve over or solve problems and deficiencies in the art.

Other objects, features, aspects, or advantages of the present invention may include apparatus, methods, or systems as above-described which provide one or more of:

a. pre-aiming of devices using an optical motion capture system and/or three-dimensional position sensors with relatively high accuracy (e.g. sometimes accuracy within a fraction of a degree);
b. automatic confirmation of within-range aiming of each device in a controlled setting, as well as optional documentation of the same and optional automatic notification or warning if any device is outside of range;
c. accurate reference of each device to a common reference (e.g. plane(s)) that is related to the pole upon which the device(s) is/are to be elevated;
d. accurate and efficient installation of the device(s) on a pole by simply confirming correct orientation of the reference to a landmark or other easily confirmable point or direction;
e. elimination of having to measure to an aiming point on a target area;
f. an efficient and easy way to manipulate rotation of a pole;
g. an efficient and easy way to confirm correct rotational alignment of a pole from a distance.

In one aspect of the invention, a method and set of apparatuses are utilized in a comprehensive system for accurate pre-aiming and installation of devices on a pole or poles or other elevating structure. The devices are pre-set to an aiming orientation relative to a common reference, for example, a plane or set of planes. The reference plane(s) are then correlated to a feature of the pole or other elevating structure that will be used to elevate or suspend the devices. A position sensor subsystem is utilized to inform a worker when each device is correctly angularly oriented to the reference plane. The position sensor is preprogrammed with the correct aiming orientation for each device. The worker simply manipulates mounting structure for the device to move the device to the correct three-dimensional angular orientation, using the position sensor to confirm the correct orientation to within a highly accurate margin of error, and either locks the device in that orientation or marks the orientation. The pre-aimed device(s) of each pole are then shipped to the installation site as separate components or as part of a structure assembly. At ground or floor level, the devices, any wiring or other associated components, and all other aspects for the final system can be preassembled. The device(s) are already pre-aimed or are brought to their pre-aimed positions as marked on the structure. The pole is preliminarily erected at its pre-designed location and pre-designed rotational orientation. Before the final positioning, an alignment beam or other rotational alignment unit is utilized to confirm the correct rotation of the pole relative to a landmark which has been previously correlated with correct rotational alignment. Once rotational alignment is confirmed, it is assumed each of the pre-aimed devices on the pole is/are correctly aligned or aimed. The system avoids having to elevate workers up to the devices to aim the devices by hand once the pole is erected. All that is required is manipulation and confirmation that the pole is accurately aligned by confirming accurate alignment of the reference plane with a landmark.

Another aspect of the invention relates to aiming lighting fixtures of a multiple light lighting system according to a pre-designed lighting layout with each fixture having an aiming point on a target area. Using an automated angular position sensor, each fixture is pre-aimed relative to a single reference plane. The reference plane is correlated to a portion of the pole. An alignment beam is mounted on the pole in correlation to the reference plane to issue an alignment beam in that plane and a direction that corresponds with a predetermined landmark at, on or near the target area when the pole is in a correct rotational orientation for correct aiming of the lighting fixtures. The pole is preliminarily erected at its correct location relative the target area and manipulated until a worker or sensor confirms the alignment beam is aligned with the landmark. Once the reference plane represented by the alignment beam is correctly aligned with the landmark, the pre-aimed fixtures, accurately aligned relative to the reference plane, are assumed accurately aimed to their individual pre-designed aiming locations across the target area. This process can be repeated with additional poles or elevating structures and devices for the system using the same landmark as previous poles. Using a single landmark reduces time and may improve the accuracy of the system by referencing all the poles or structures from a common point, eliminating potential measurement errors finding multiple reference points. A single landmark also provides unity with the support structures (e.g. poles), or device arrays (e.g. light fixture arrays), and allow them to function as a composite system.

In another aspect of the invention, the pole is erected onto a footing or base allowing a range of rotational adjustment of the pole. The bottom of the pole is preliminarily lowered or placed onto the footing or base. A tool is operatively connected to the pole and used to rotate the structure until the desired orientation to the landmark is confirmed. In one embodiment, the footing or base is a stub that is fixed in the ground or floor and plumbed, and has an upper end extending above the ground or floor. The bottom of the pole has a complementary configuration to slip fit over the upper end of the footing or base, and can be preliminarily seated on the base or footing. The preliminary seating allows a tool to be attached to the lower end of the pole to turn the pole on the base until correct rotational alignment is confirmed. The pole can then be finally secured or seated on the base or footing.

Other aspects according to the invention include a position sensor for pre-aiming devices that utilizes optical motion capture system technology as the position sensor. In one aspect, active optical markers are captured in a multiple camera optical motion capture system. A first set of active optical markers designates a reference plane, or set of planes, that is correlated to a feature of the pole. A second set of active optical markers indicates the angular orientation of an aiming axis of the device in space. The camera system is oriented to capture multiple images of both sets of active markers from different vantage points. A processor or controller has software that can analyze the different images and calculate the three-dimensional angular orientation of the axis of the device relative to the reference plane. The processor or controller is pre-programmed to know the correct angular orientation between the reference plane and the angular orientation of each device, and indicates visually or otherwise to the worker any offset between the axis of the device and the correct aiming. This allows the worker to adjust the device and get feedback and confirmation of when the adjustment aligns with the pre-designed angular orientation within a very small range of acceptable error. This helps eliminate worker error and is efficient.

In another aspect of the invention, the pre-aiming of devices comprises pre-aiming only mounting structure for the device or portion of device assembly, e.g. lighting fixtures to a pole fitter assembly that slip fits onto the top of a pole. This is efficient for workers because they can adjust angular orientation of the mounting structure without having to manipulate the sometimes quite large devices (e.g. lighting fixtures). It also is less cumbersome because the whole pole does not have to be involved, but can be shipped separately to the installation site.

In another aspect of the invention, a tool is designed to allow efficient rotational adjustment of a pre-assembled pole and device(s) which is slip-fit mounted on a base or other mounting means for the pole or structure. The tool comprises a head and a long handle. The head includes a strap and cinching mechanism that can clamp the head around the bottom of a pole. The handle can be pivotally attached but removable from the head. It is optionally pivotable in the vertical directions and rigid in the horizontal direction when clamped on a pole. This provides the worker substantial mechanical advantage and positional adjustability of the handle relative to the pole for rotating the pole about a vertical axis. It is also quick and easy to attach and detach from the pole.

In another aspect of the invention, an aiming apparatus can be used to allow remote confirmation of correct rotational position of a pole or other elevating structure with pre-aimed devices or poles or other elevating structures that require a specific orientation. In one embodiment, an alignment beam is mounted on a vertically erected pole or structure to issue a fan-shaped, diverging beam in generally a vertical plane. It is accurately calibrated in its mounting to correspond the plane of the beam with a reference plane correlated to the pole. A worker can stand even many hundreds of feet away when the pole is erected and "find" the alignment beam by moving his or her eye through the plane of the beam, which would produce a "flash" sensation, even if the beam itself cannot be seen or has relatively low intensity at the site of the worker. The worker on the field can then move to the correct point at the target area in which the vertical reference plane of the pole or elevating structure should be aligned and confirm for a worker rotating the pole or elevating structure that the pole or elevating structure is in correct rotational orientation. The correct point can be a pre-established and easily identified landmark relative the field or target area. Two workers can accomplish this quite efficiently. Alternatively, an aiming sight could be attached to the pole or elevating structure with an outwardly extending wall with a vertical slot aligned with the vertical reference plane of the pole or elevating structure. The spaced-apart wall towards the pole or elevating structure from the outward wall would have a middle section aligned with the slot and left and right sections relative the middle section and slot. The left and right sections could be colored differently or have other visible differences from the middle section and each other. A worker could stand at the correct point on the target area for the vertical reference plane of the pole or other elevating structure and with binoculars or other optical assistance look through the outward extended vertical slot of the aiming sight on the distant pole or other elevating structure. If the worker saw the midpoint between the left and right sides of the aiming sight, the worker could confirm the pole or elevating structure is in correct rotational position. On the other hand, if the line of sight of the worker through the vertical slot sees the left side of the sight rear wall, the worker could communicate to a worker at the pole to rotate the pole counter-clockwise until the worker on the field indicates the sight is centered relative to that worker. Conversely if the worker sees the right hand side of the rear wall of the sight, he or she could communicate to a worker at the pole or structure to rotate the pole or structure clockwise on the base until it is centered.

Another means of detecting the location of the plane of an alignment beam created from laser energy is to use a commercially available laser sensor. An on-field worker could point a commercially available laser sensor towards the alignment beam unit on a pole or elevating structure. Such laser sensors can indicate through displays, LED lights, audibly or otherwise how far away the beam is from dead-on position. The worker can direct or coordinate rotation of the pole or elevating structure to the correct position through some communication. A possibility is a walkie-talkie or radio frequency head set radio. Visible lasers are not necessarily required. For example, an infrared (IR) laser could be used. An IR detector could be used at a position away from the IR laser to detect when in alignment with the non-visible IR laser. A laser sensor could be mounted on a tripod or rod, at the landmark, and a remote worker could operate the laser sensor to detect when the beam is in the correct location.

These and other objects, features, aspects, or advantages of the invention will become more apparent with reference to the accompanying specification and claims.

III. BRIEF DESCRIPTION OF THE DRAWINGS

FIGS. 1, 2, 3, 4, 5A-C, 6A-C, 7A-B, 8, 9, 10 and 11 are various views and depictions of an active marker optical motion capture system to pre-aim lighting fixtures according to an exemplary embodiment of the present invention.

Figure 3:
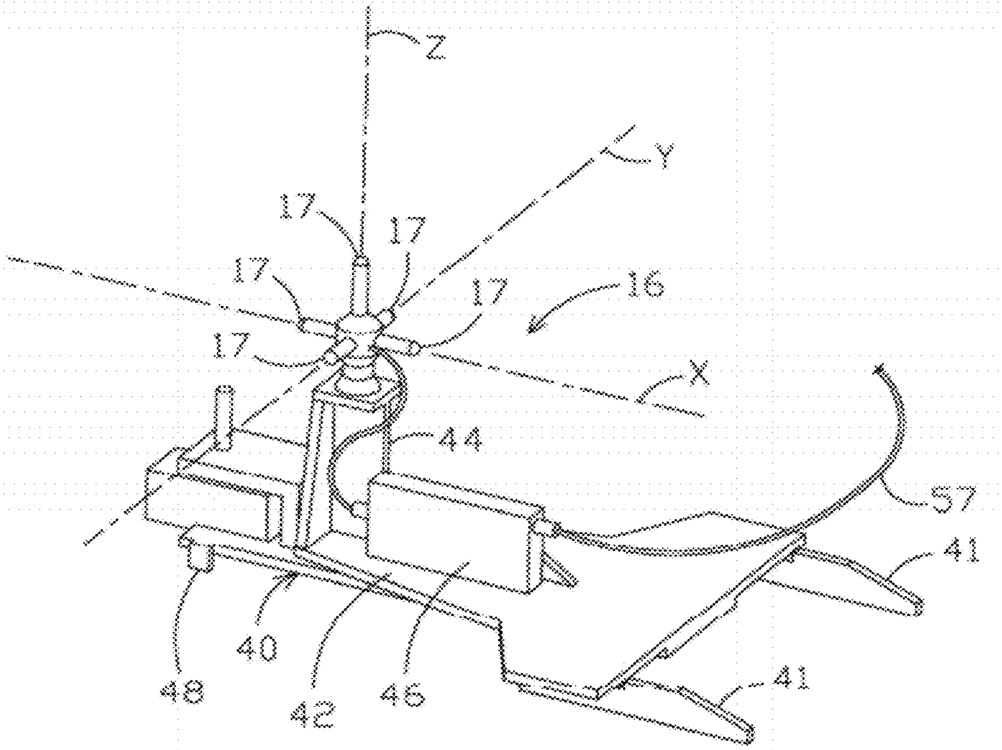
FIG. 3 is an enlarged perspective view of an active marker assembly for positioning on the main backbone of the pole fitter of FIG. 2 in a position like shown in FIG. 7A.
Figure 4:
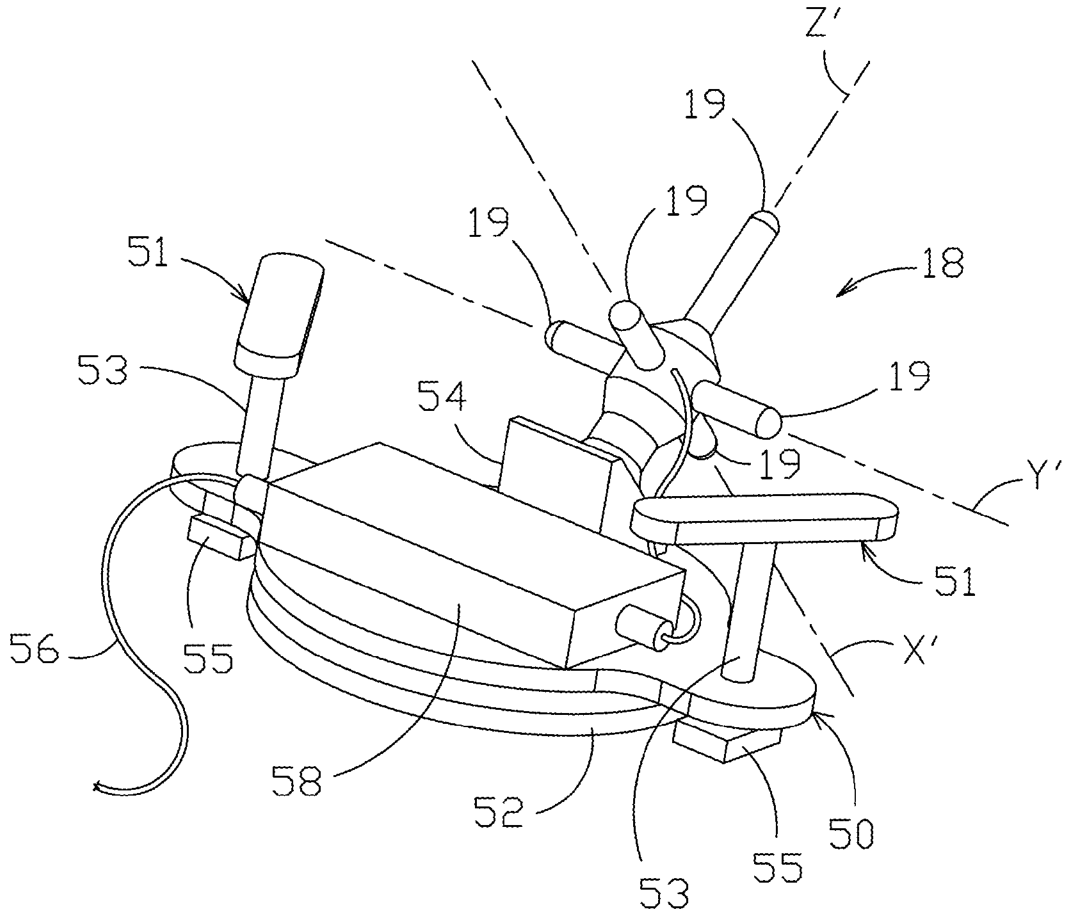
FIG. 4 is an enlarged perspective view of an active marker assembly that can be mounted on the face of each light fixture or mount of FIG. 2 in the manner shown in FIG. 7B.
Figure 5A:
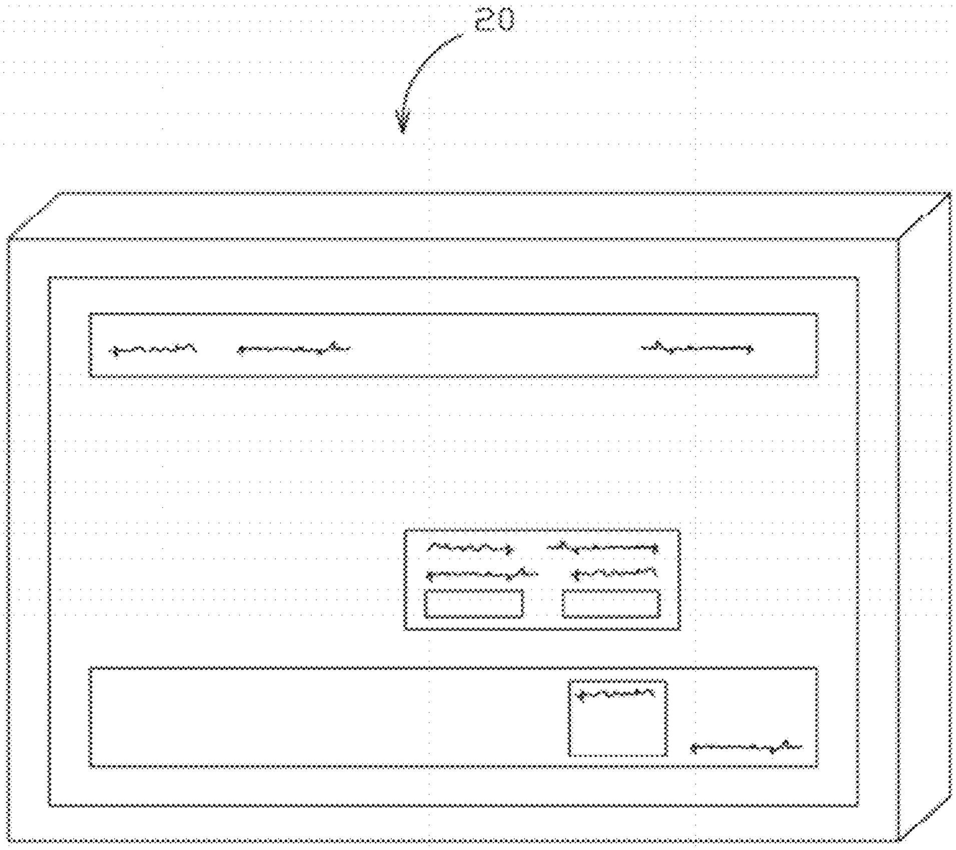
FIG. 5A is a depiction of a display screen for initializing a factory aiming procedure according to an exemplary embodiment of the present invention.
Figure 5B:
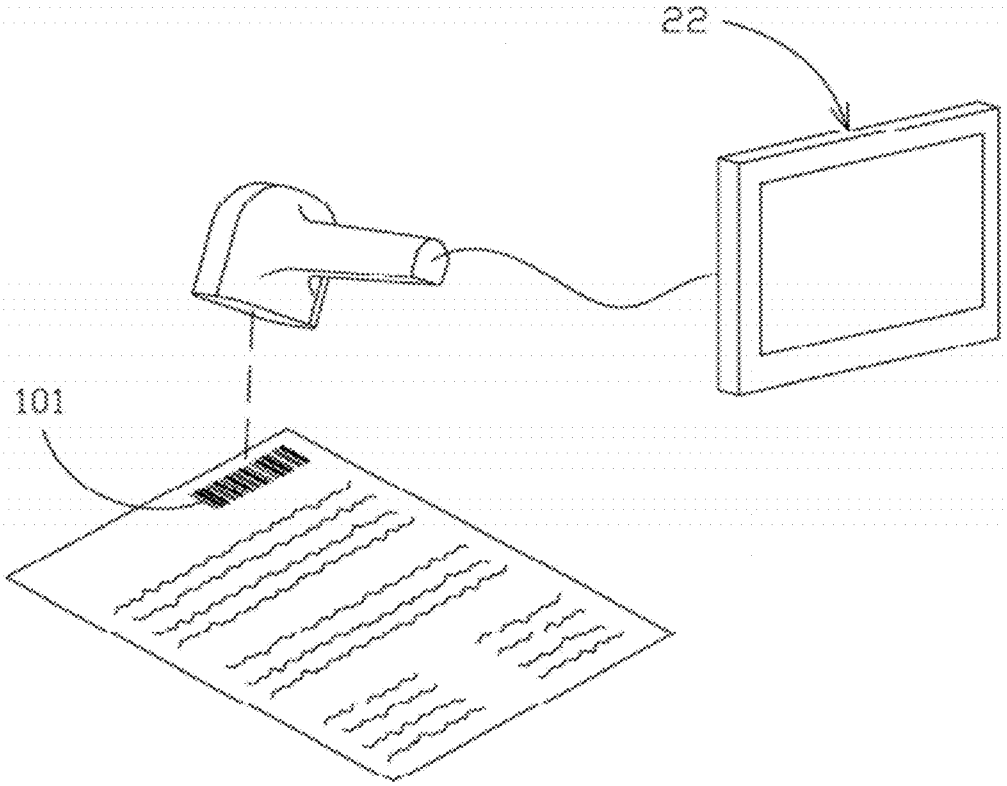
FIG. 5B is a diagram of a bar code and reader relative to identification of the pole fitter and the ability to correlate it with fixture aiming directions for each of the fixture mounts for an embodiment of the invention.
Figure 5C:
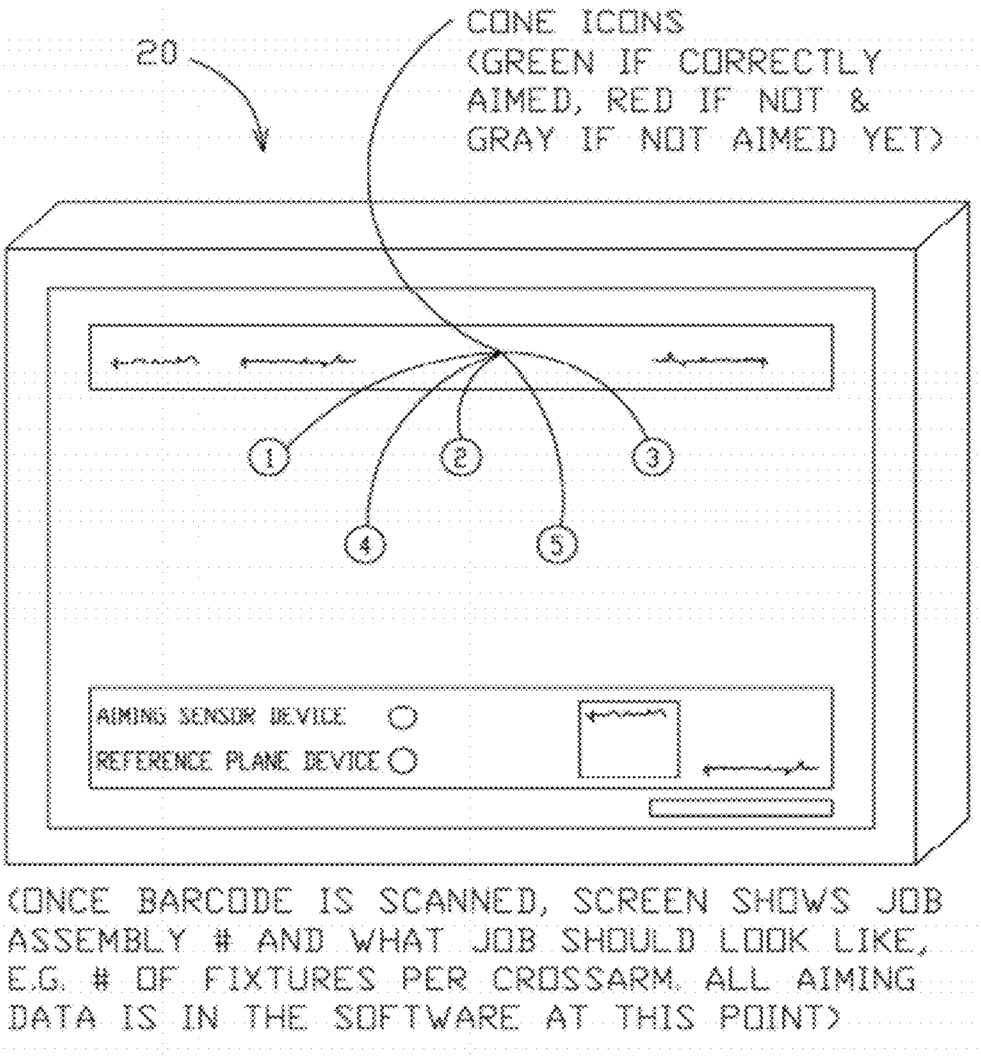
FIG. 5C is similar to 5A but shows a different display of the type that would show a worker a graphic representation of the number of fixture mounts to aim and other pertinent information to begin the aiming task for an embodiment of the invention.
Figure 6A:
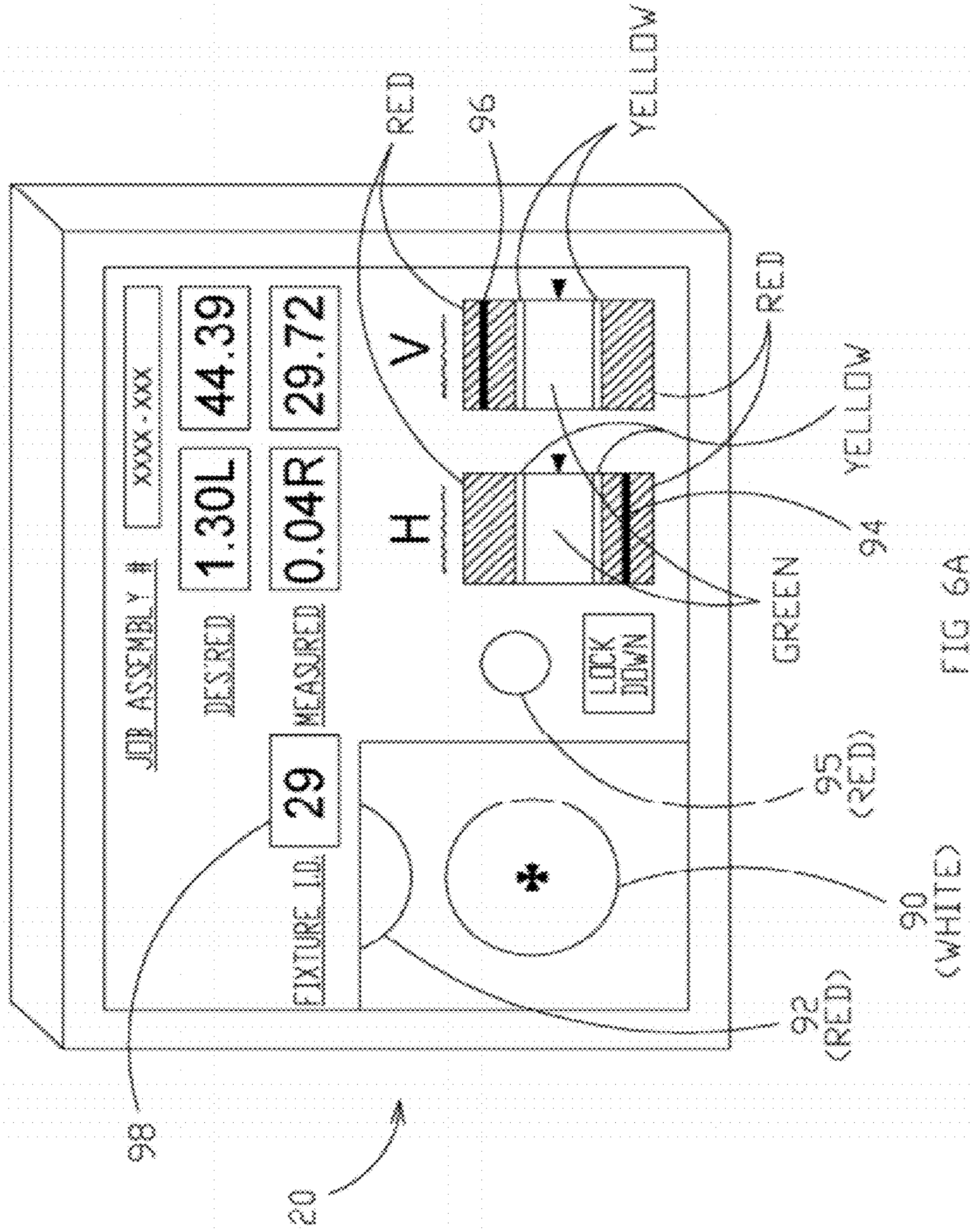

FIG. 6A is similar to FIG. 5C but illustrates a worker viewable display which shows desired aiming direction of a given fixture mount having the active marker assembly of FIG. 4 attached to it relative to the active marker along the fitter spine as shown in FIG. 3, showing an offset between a desired and measured orientation of that particular fixture mount as calculated by the active marker optical motion capture system.

Figure 6B:
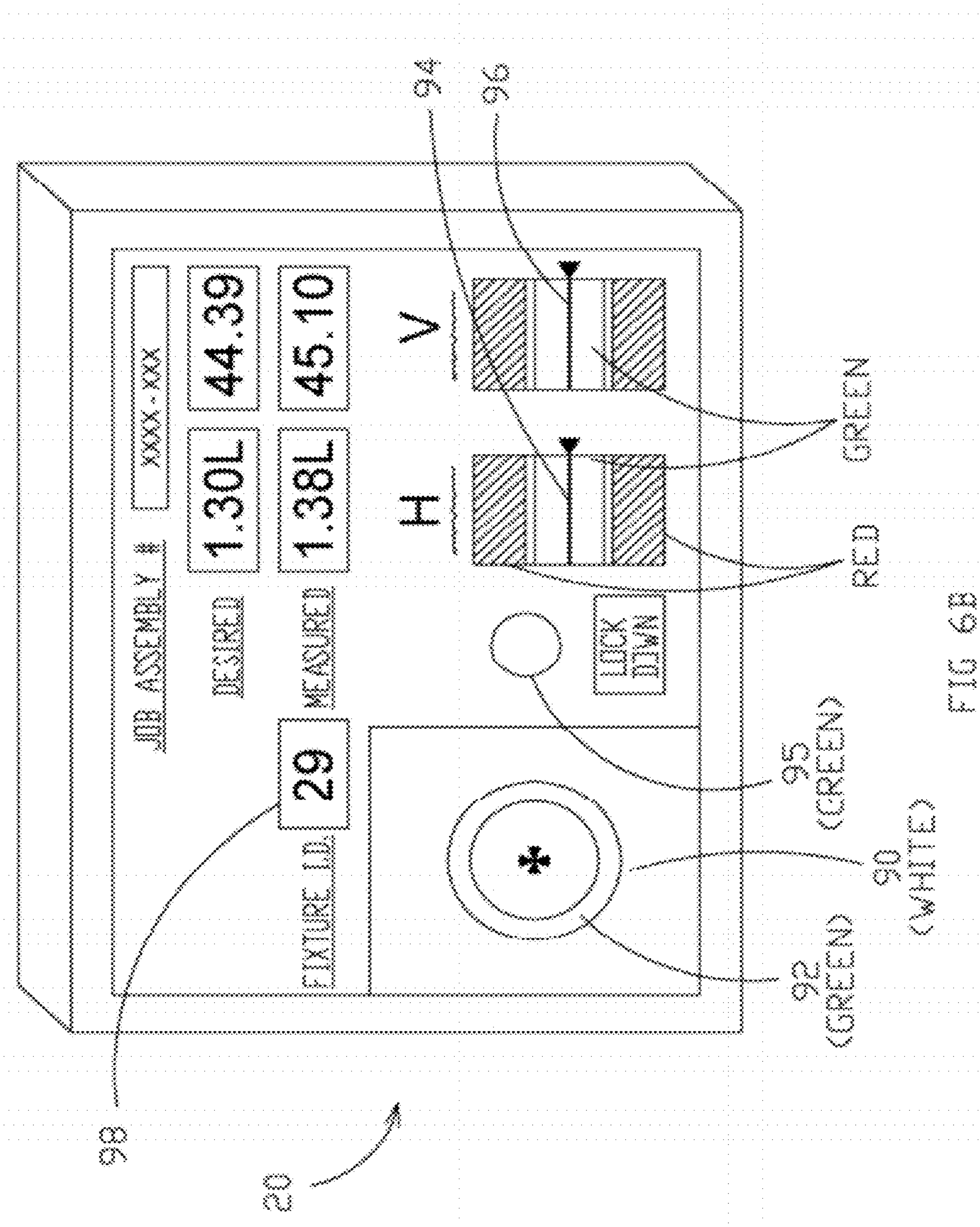

FIG. 6B is similar to FIG. 6A but shows how the graphic display can visually indicate to a worker that they have manipulated the fixture mount to the desired aiming position.

Figure 6C:
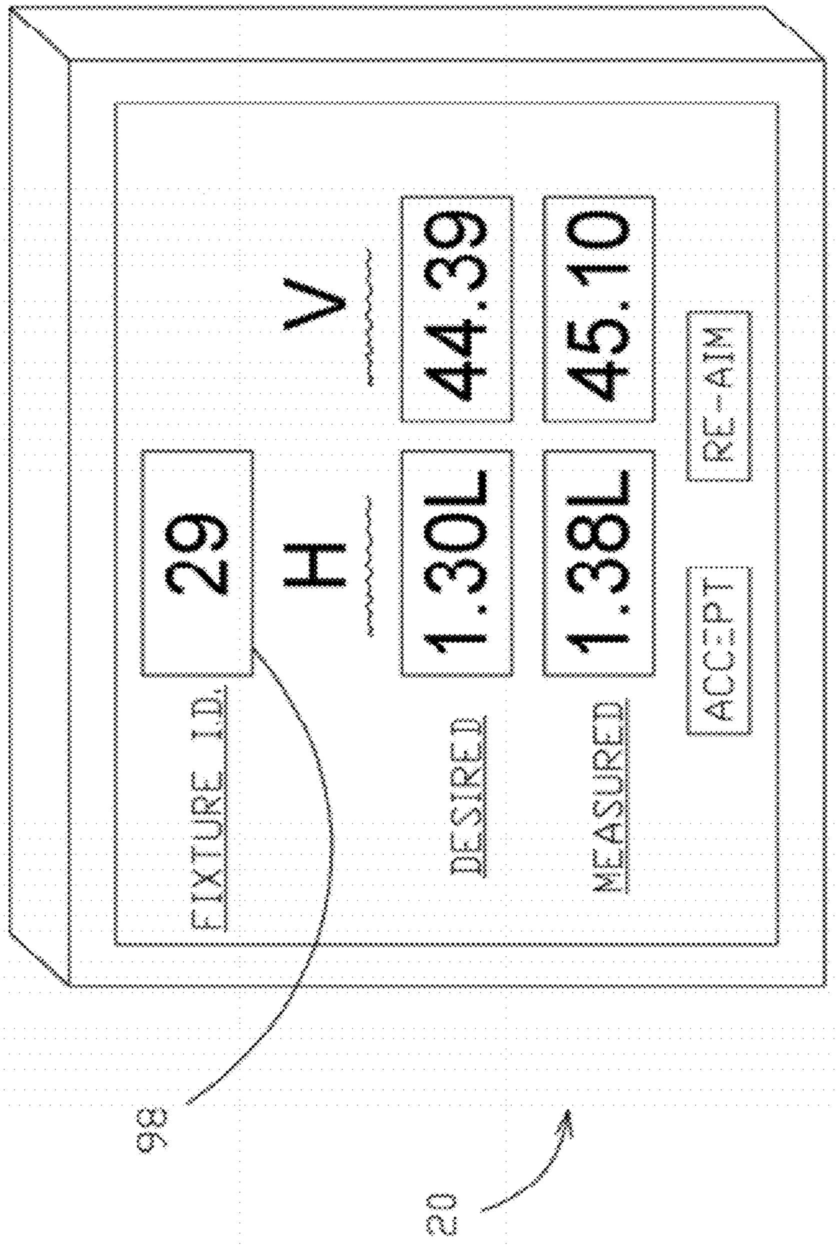

FIG. 6C is similar to FIG. 6B but shows how a worker may confirm a fixture has been aimed appropriately.

Figure 7A:
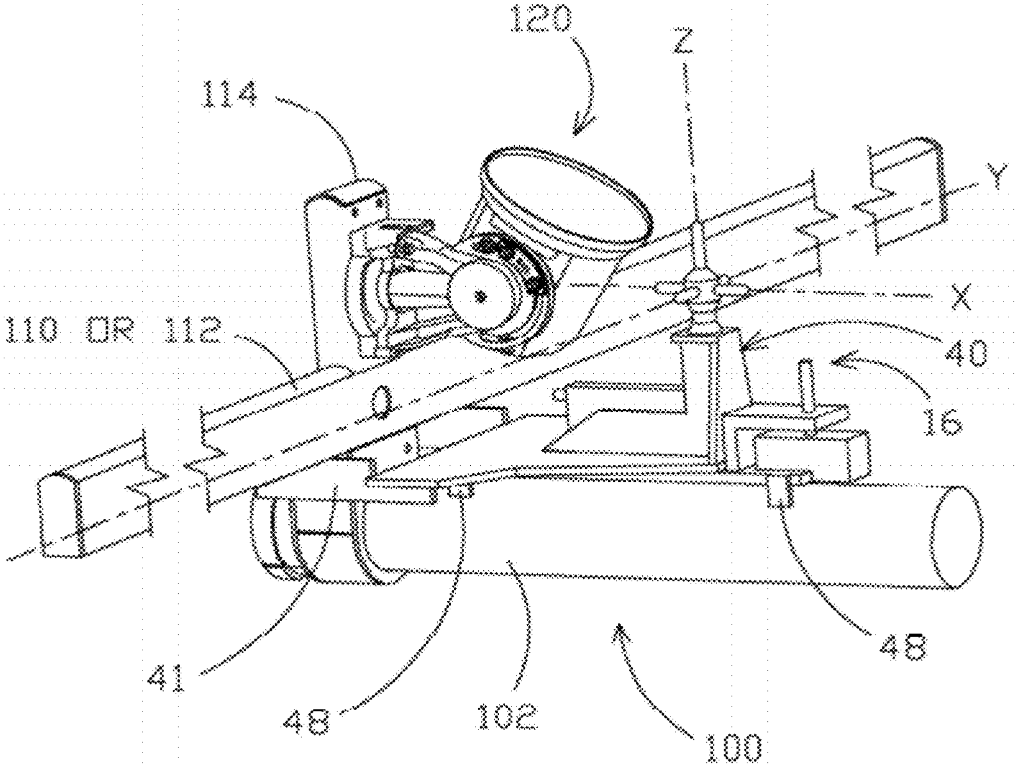

FIG. 7A is an isolated perspective view of a simplified pole fitter with the active marker of FIG. 3 mounted in operative position.

Figure 7B:
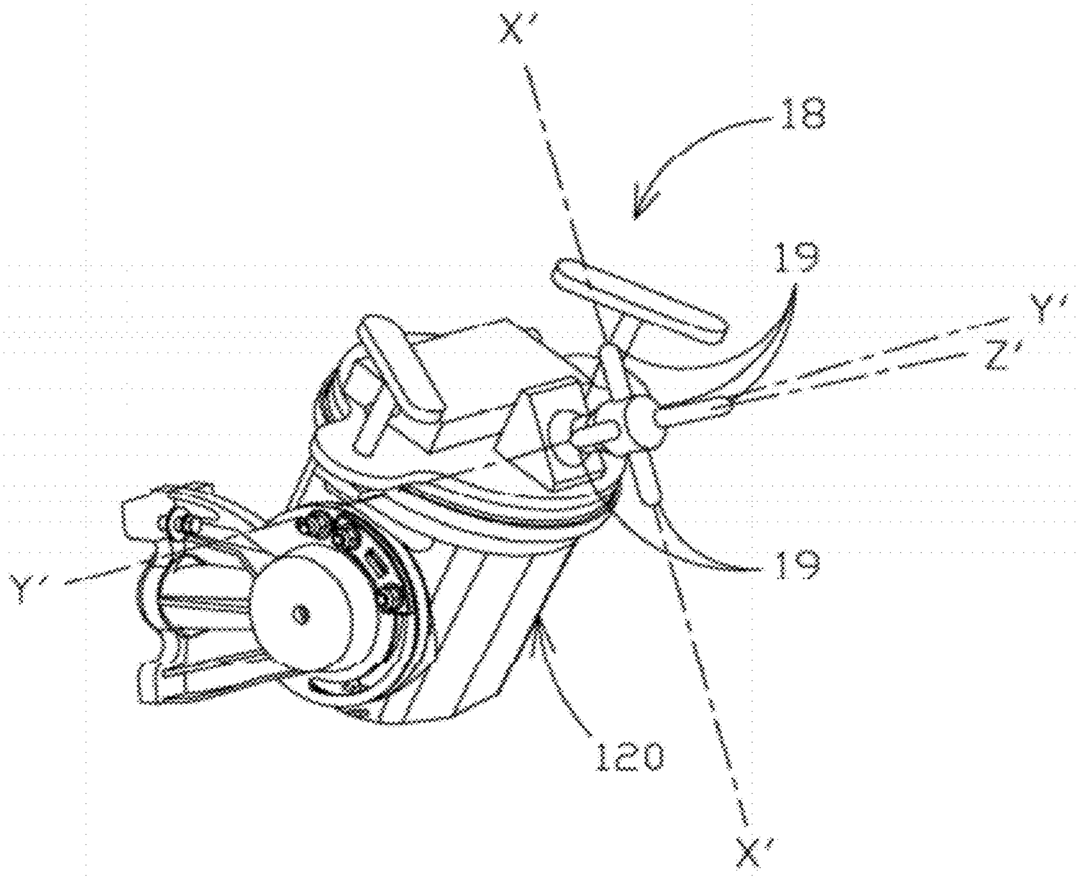

FIG. 7B is an isolated view of a lighting fixture or mount with active marker assembly of FIG. 4 in operative position.

Figure 2:
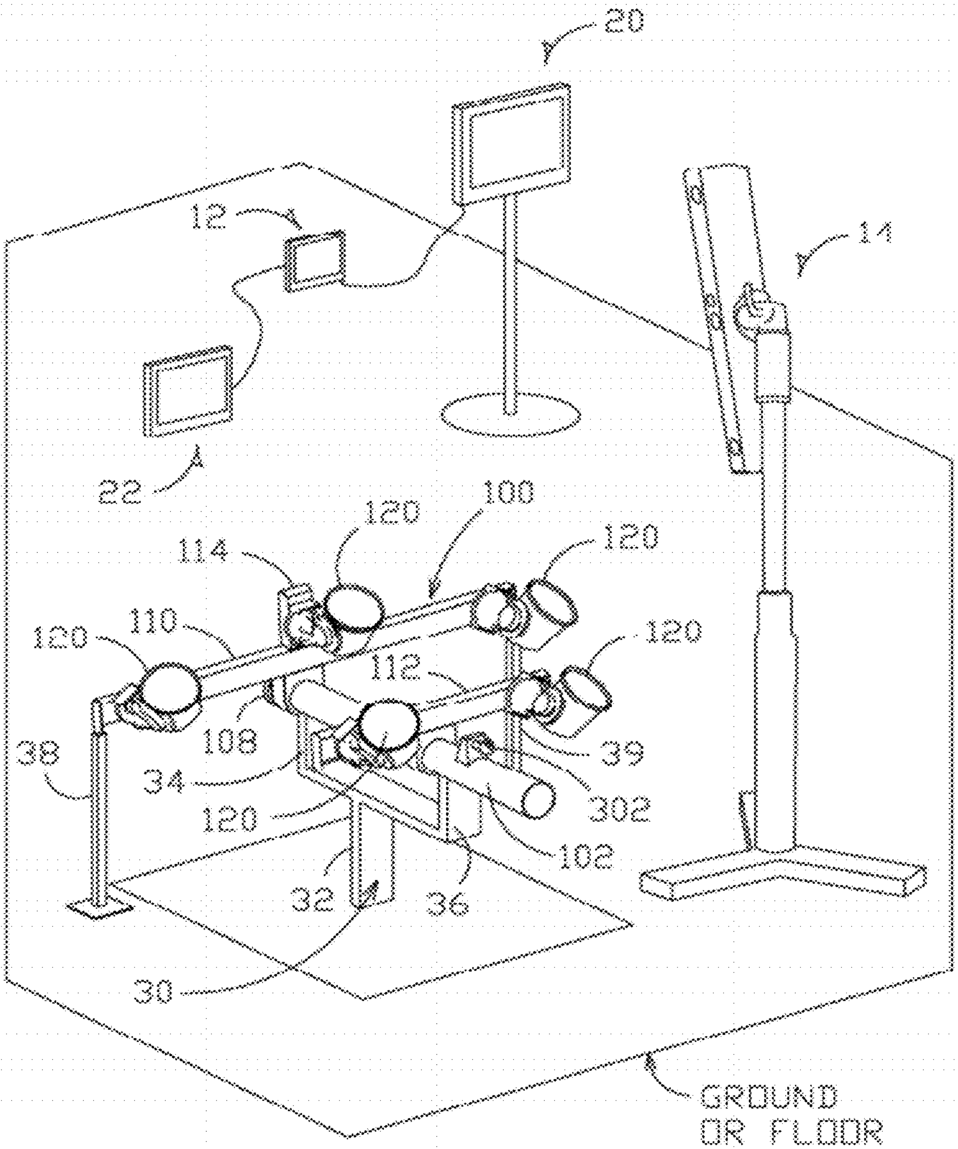
FIG. 2 is a perspective diagram of the system of FIG. 1 in position relative to a pole fitter with several light fixture mounts to be factory aimed.
Figure 8:
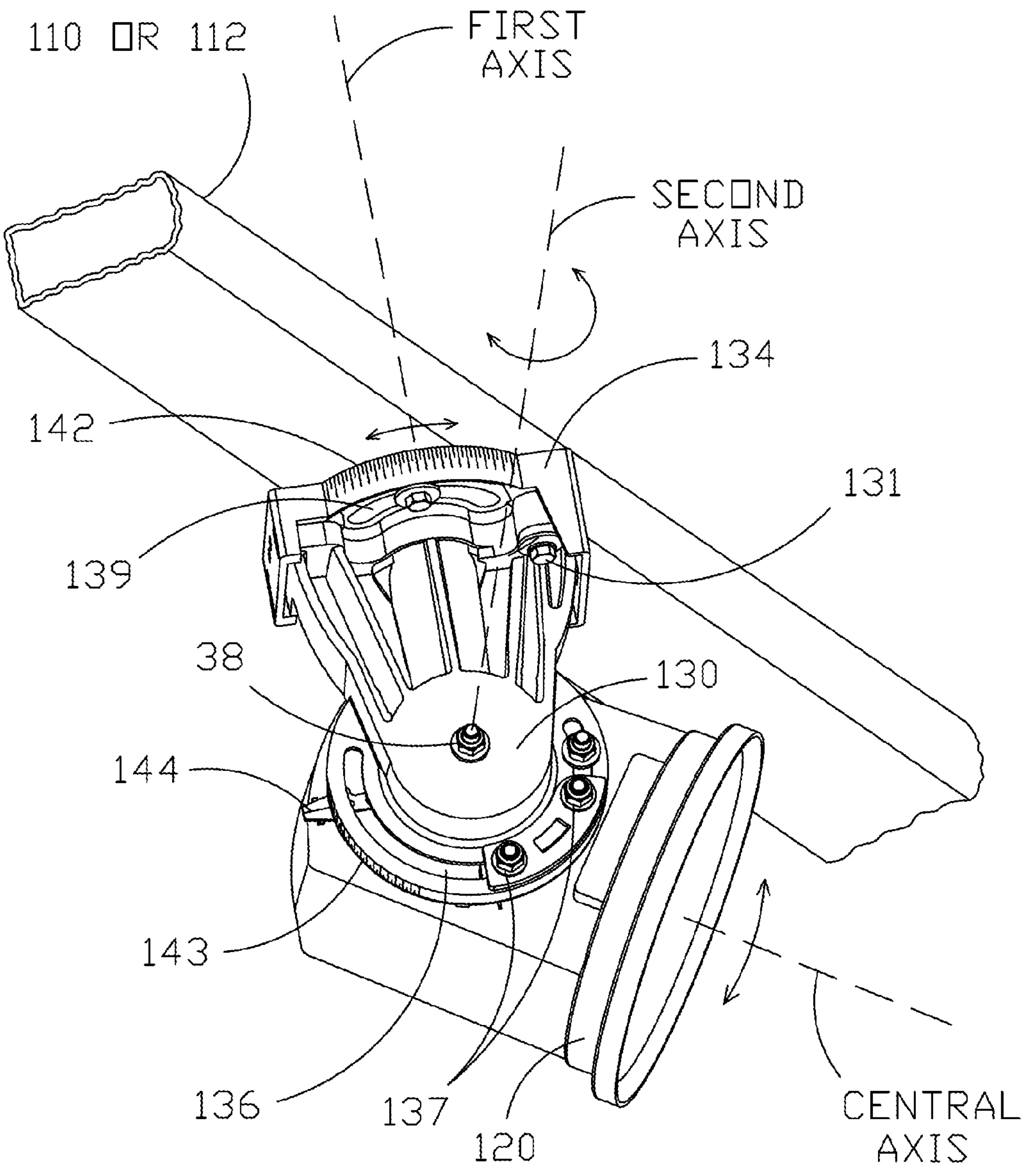

FIG. 8 is a perspective view of a fixture mount of the type of FIG. 2 showing in detail the different degrees of freedom of movement of the central axis of the mount relative to a cross arm and reference marks or scales relative to those different degrees of freedom of movement to allow a desired aiming orientation to be set and then marked or recorded so that the same aiming orientation can be recreated at an installation site regardless of whether the fixture mount is locked in the desired position at the factory or loosened and released from it.

Figure 9:
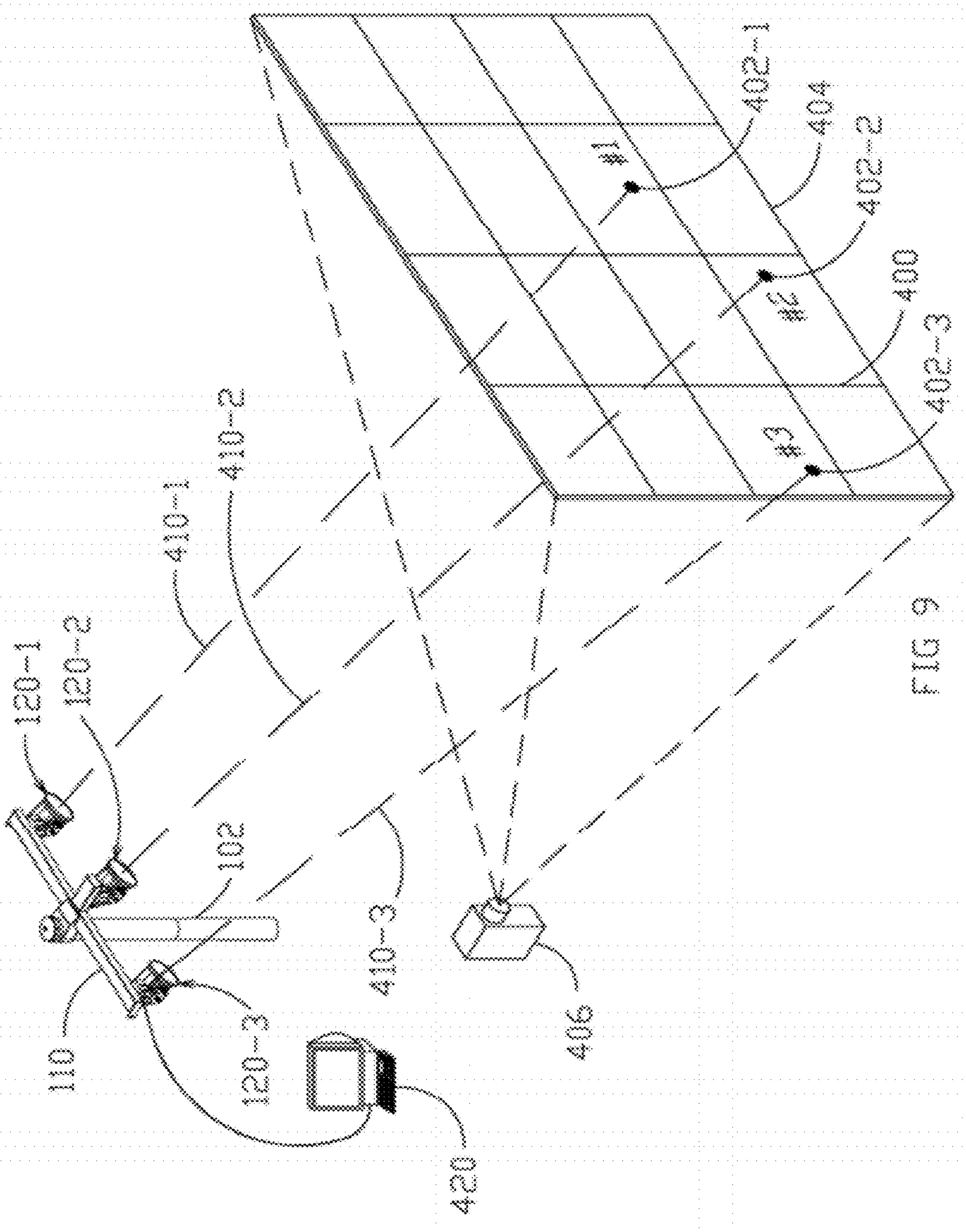

FIG. 9 is a diagrammatic depiction of an alternative fixture mount aiming system according to a projected aiming grid.

Figure 10:
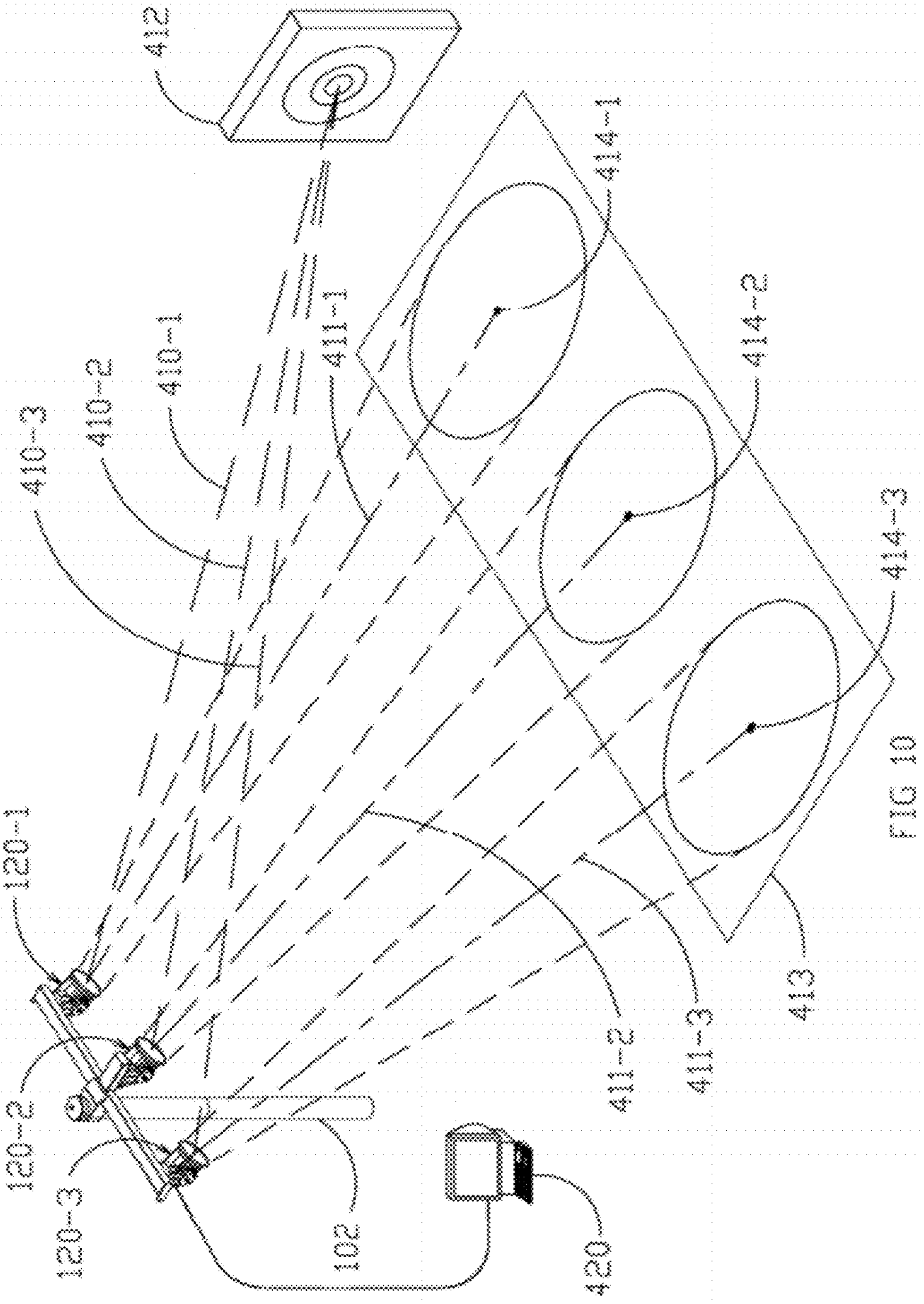

FIG. 10 is a diagrammatic depiction of a still further alternative fixture mount aiming system according to a common aiming target.

Figure 11:
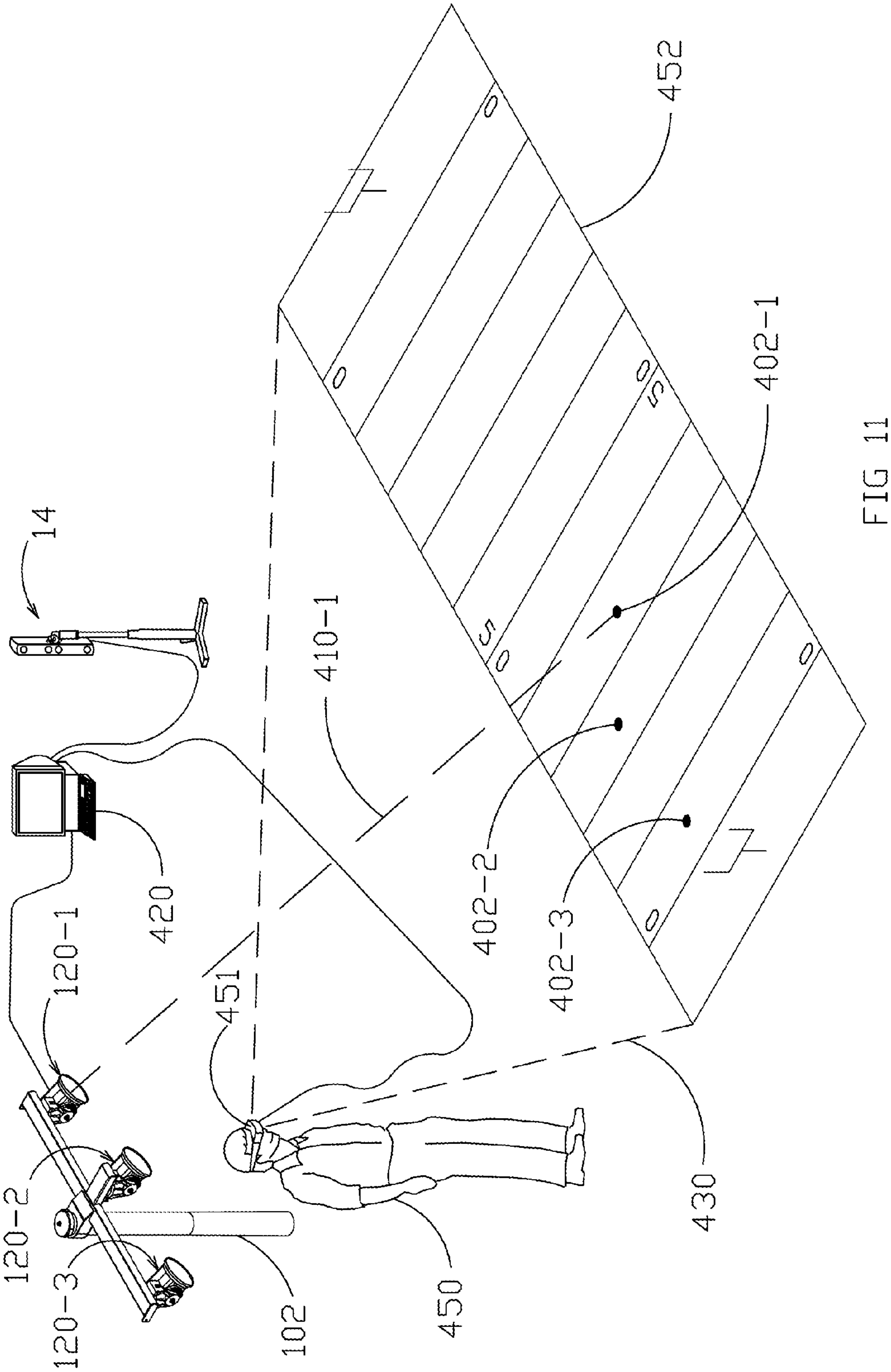

FIG. 11 is a diagrammatic depiction of another alternative fixture mounting aiming system according to a virtual reality system.

Figure 12:
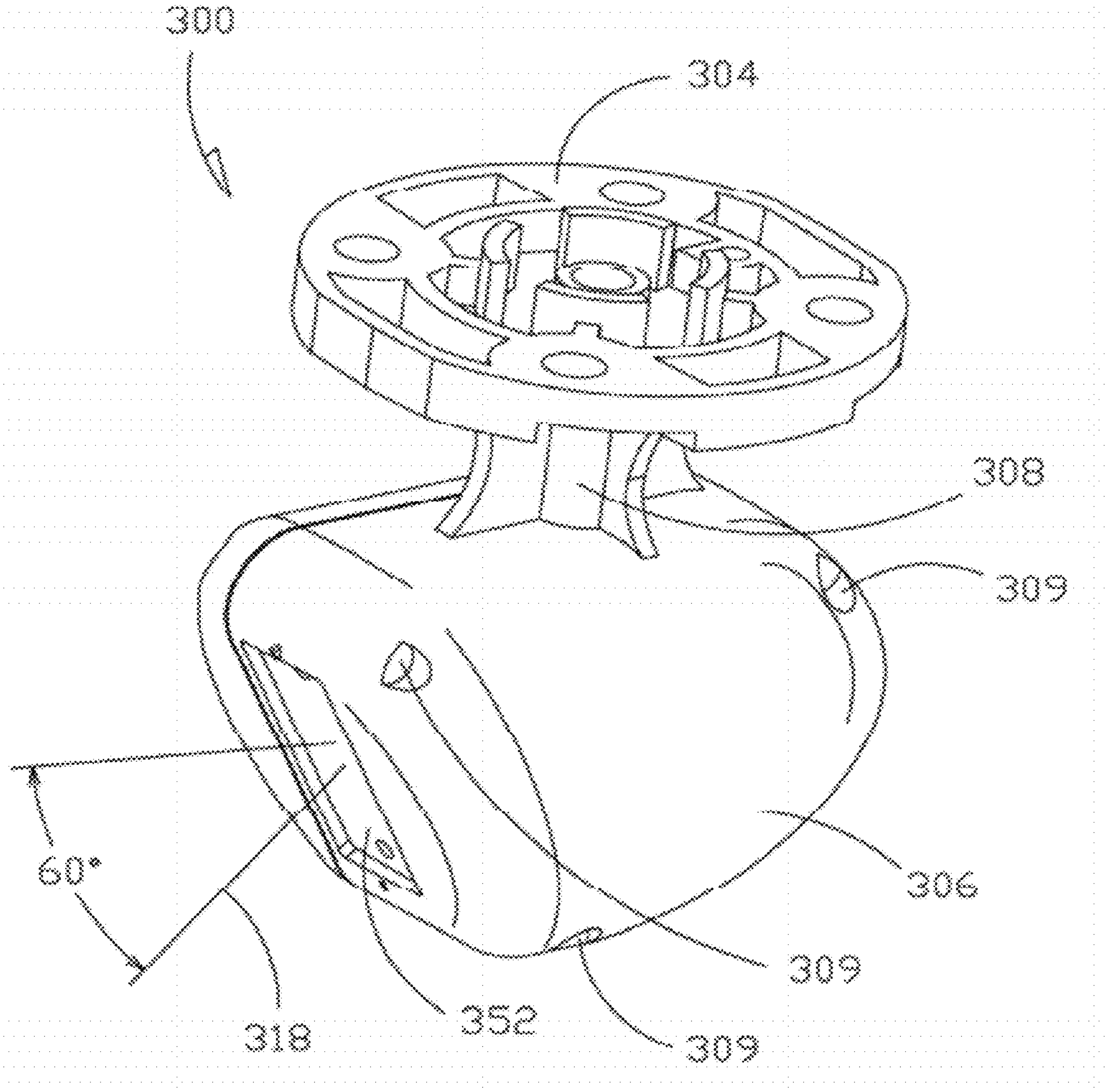
Figure 13:
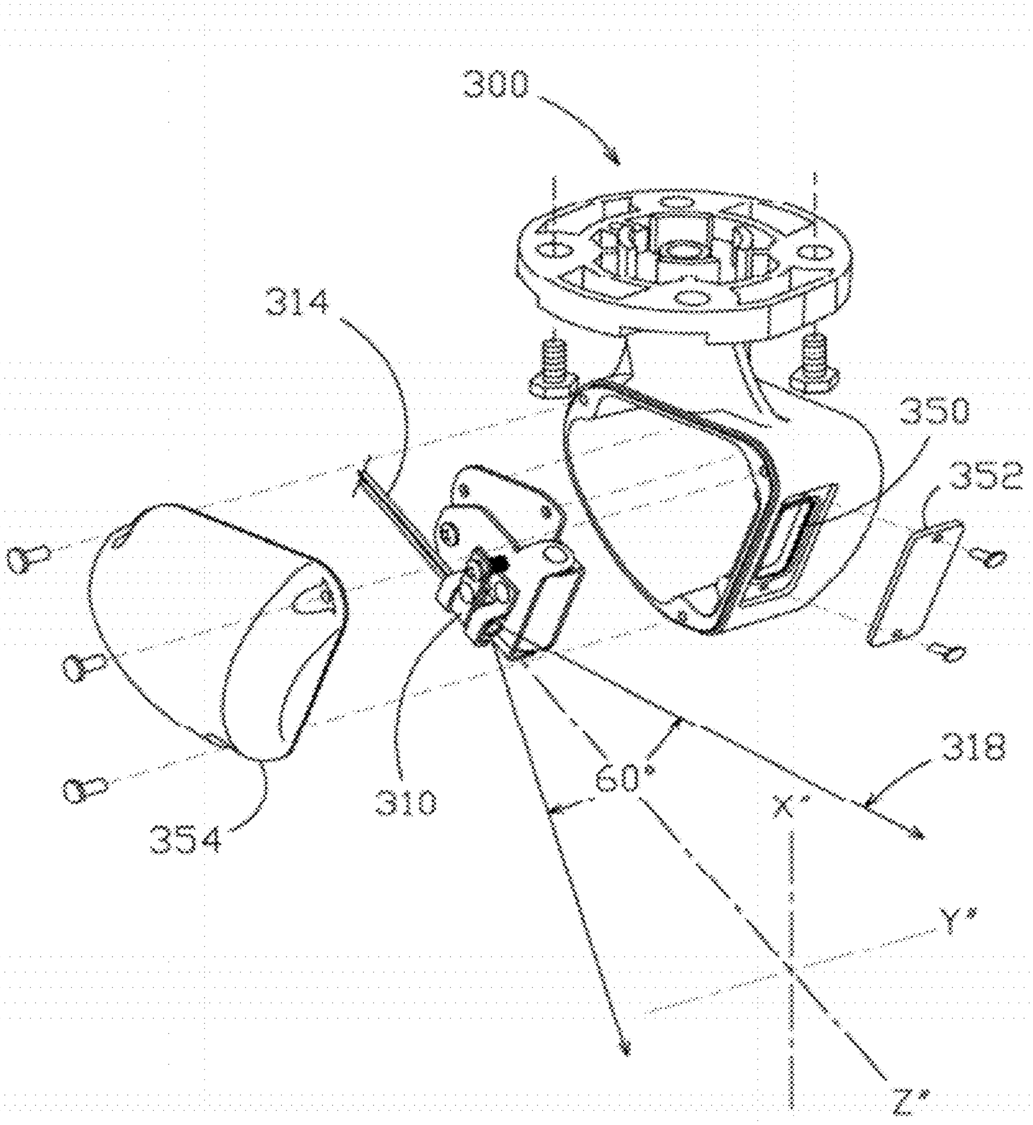
Figure 14:
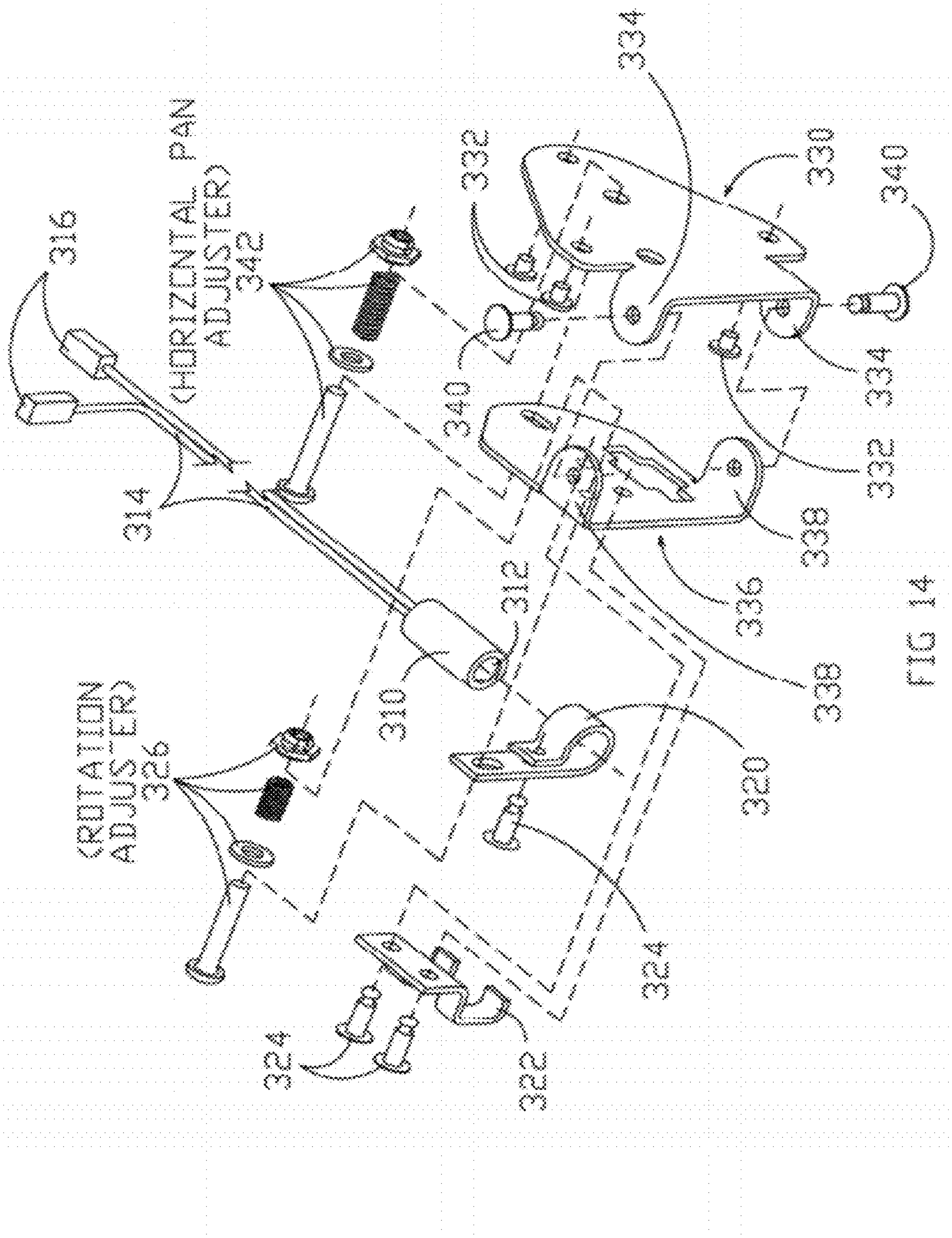

FIGS. 12, 13, and 14 are various views of an alignment beam assembly for confirming rotational adjustment of a pole according to another aspect of the present invention.

FIG. 12 is an enlarged perspective isolated view of an alignment beam assembly such that can be mounted to a device or pole.

FIG. 13 is a partially exploded view of the alignment beam assembly of FIG. 12.

FIG. 14 is an enlarged exploded view of a sub assembly of the alignment beam assembly of FIGS. 12 and 13.

Figure 15:
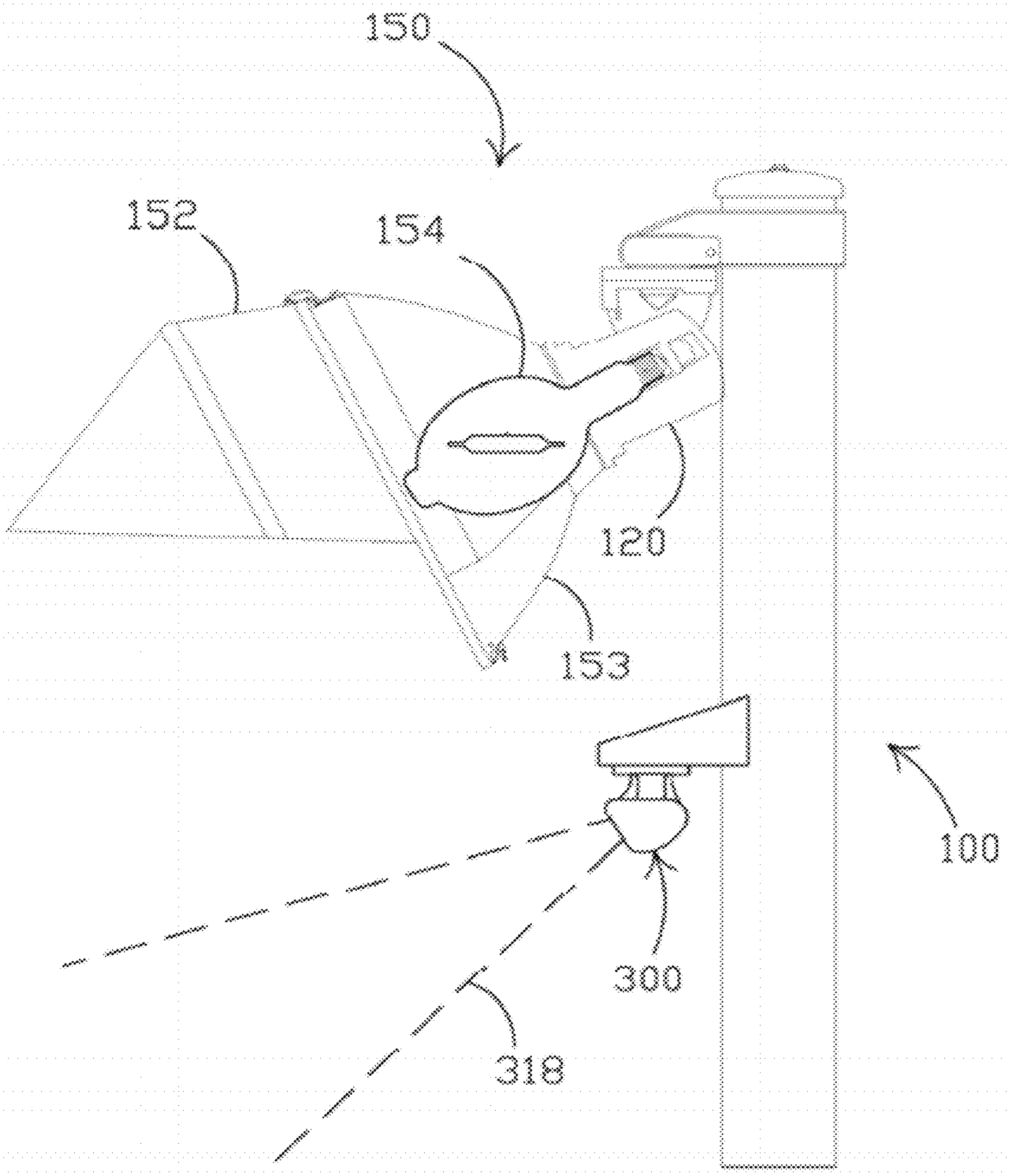

FIG. 15 is a side view of a pole fitter 100 with a light fixture 150 and alignment beam assembly 300 of FIGS. 12-14.

Figure 16:
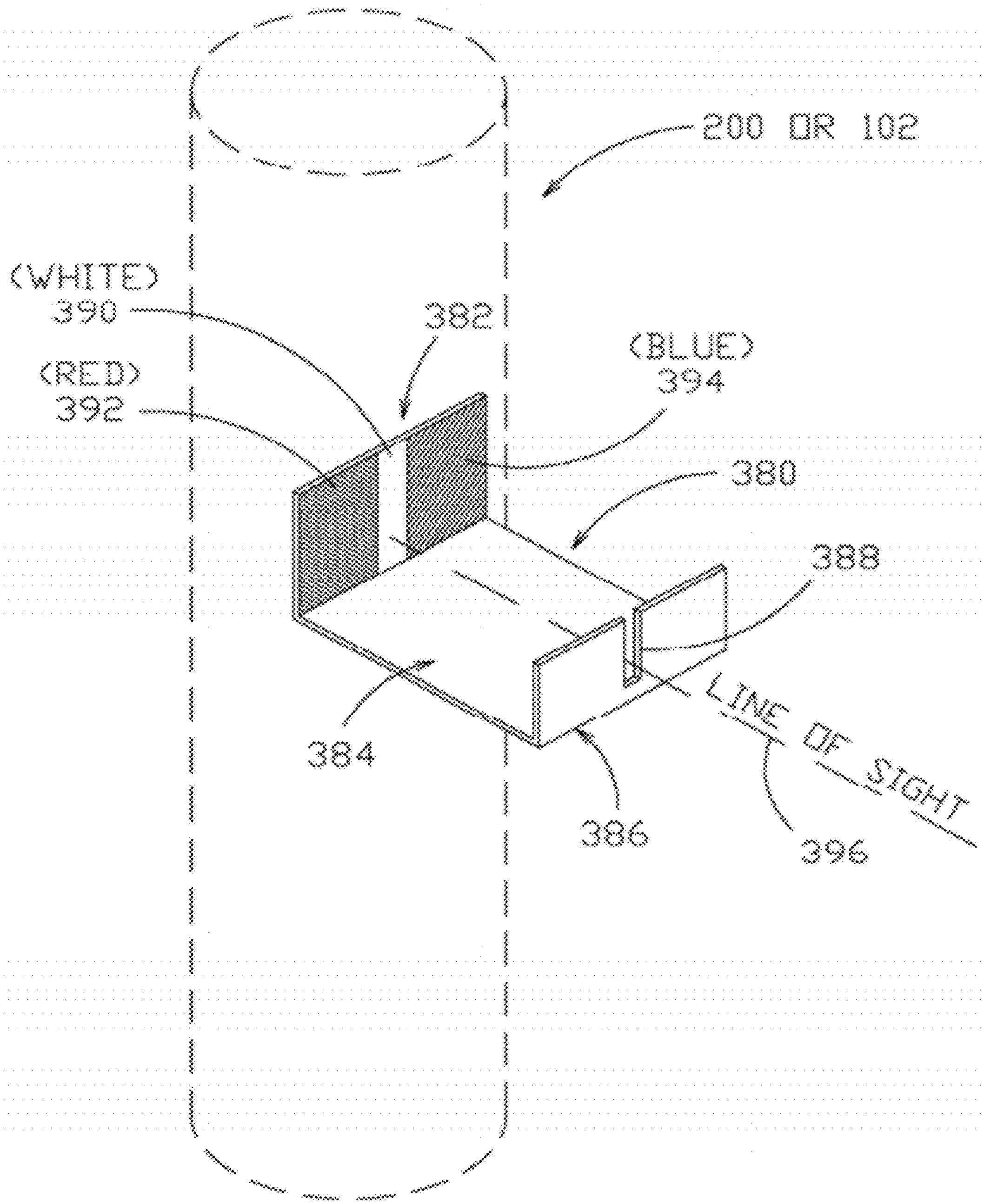

FIG. 16 is a perspective view of a mechanical sighting tool that can be used as an alternative to alignment beam assembly 300 of FIGS. 12-15 to confirm rotational adjustment of a pole according to another aspect of the invention.

Figure 17:
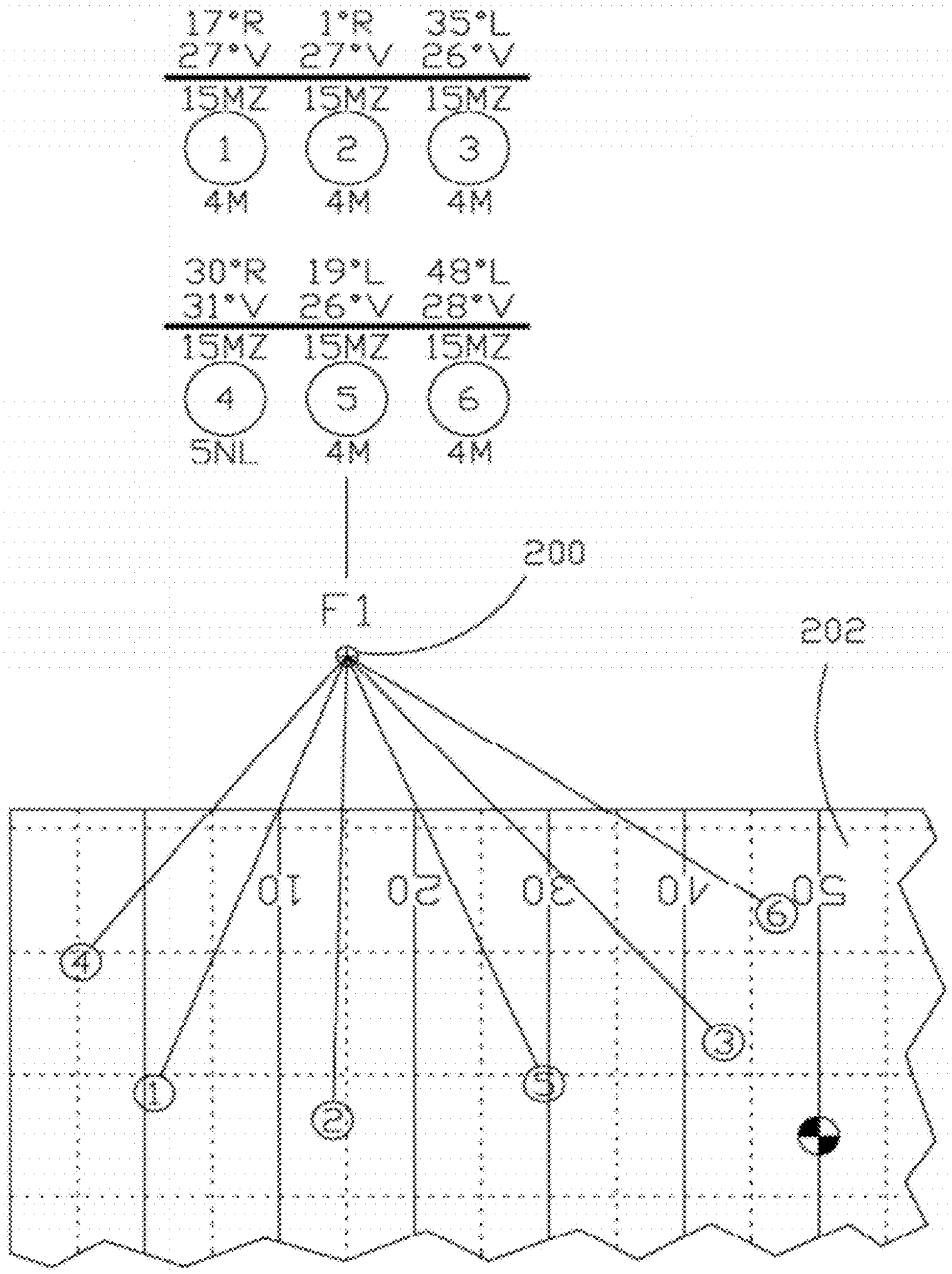

FIG. 17 is a plan view of a target area with locations of aiming points for aimed fixtures according to an aiming plan for light fixtures for an athletic field.

Figure 18:
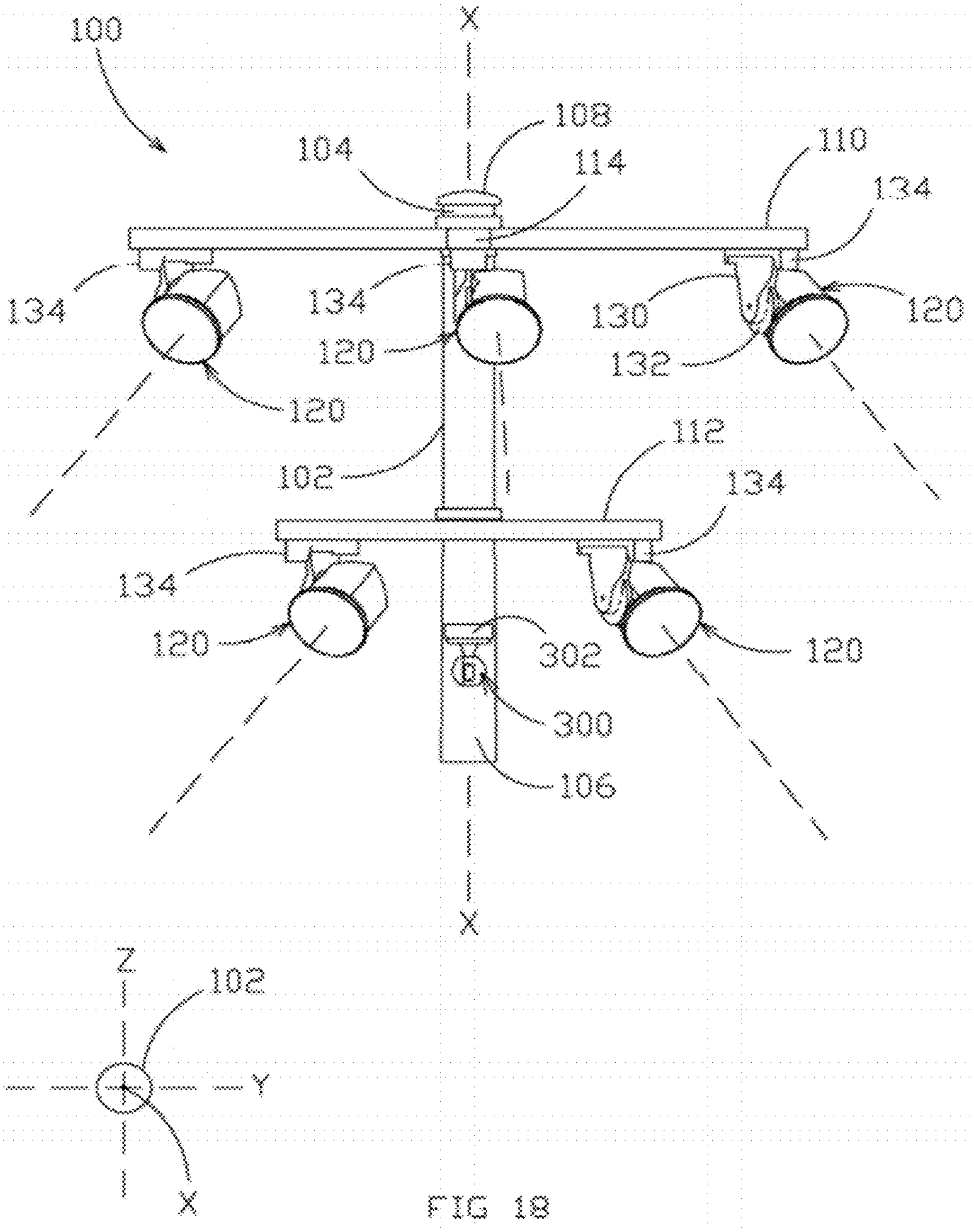

FIG. 18 is a front elevation view of pole fitter 100 of FIG. 2 when in vertical position with multiple pre-aimed lamp cones and alignment beam assembly 300 of FIGS. 12-14 mounted on it.

FIGS. 19A-D, 20, 21, and 22 are various views illustrating use of a pole rotation tool and method of rotating a pole on a base according to another aspect of the present invention.

Figure 19A:
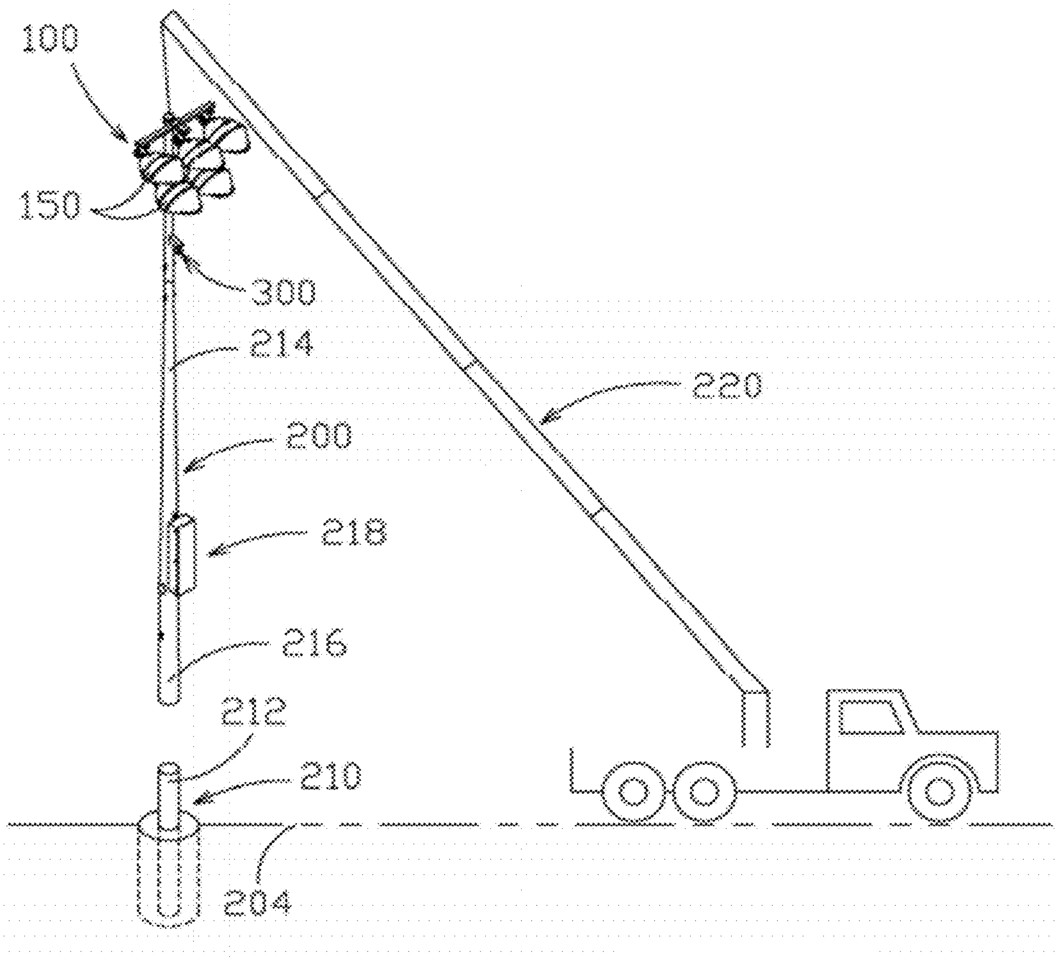

FIG. 19A is a diagrammatic depiction of the erection of a pre-assembled pole and pre-aimed lighting fixtures on a pre-aimed pole fitter of FIG. 18 onto a base that has been installed in the ground.

Figure 19B:
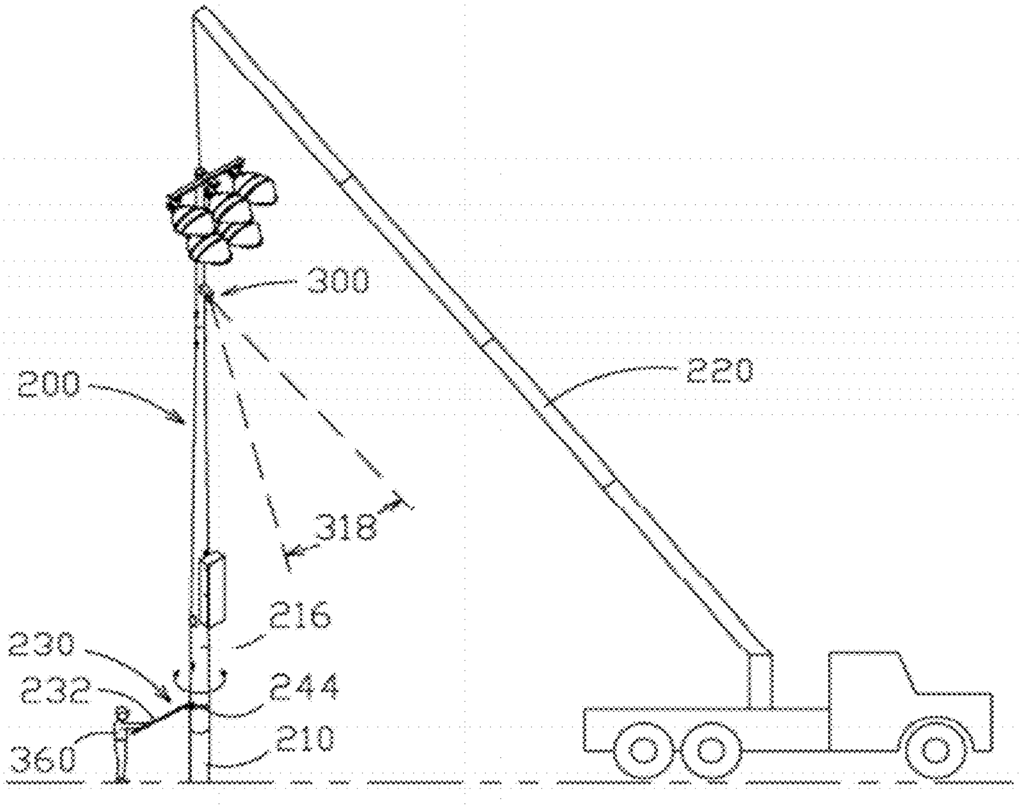

FIG. 19B is similar to FIG. 19A but shows use of an alignment beam assembly of FIG. 12 and a worker to rotate the pole and pre-aimed fixtures around the vertical axis of the pole once the pole is preliminarily seated on the base.

Figure 19C:
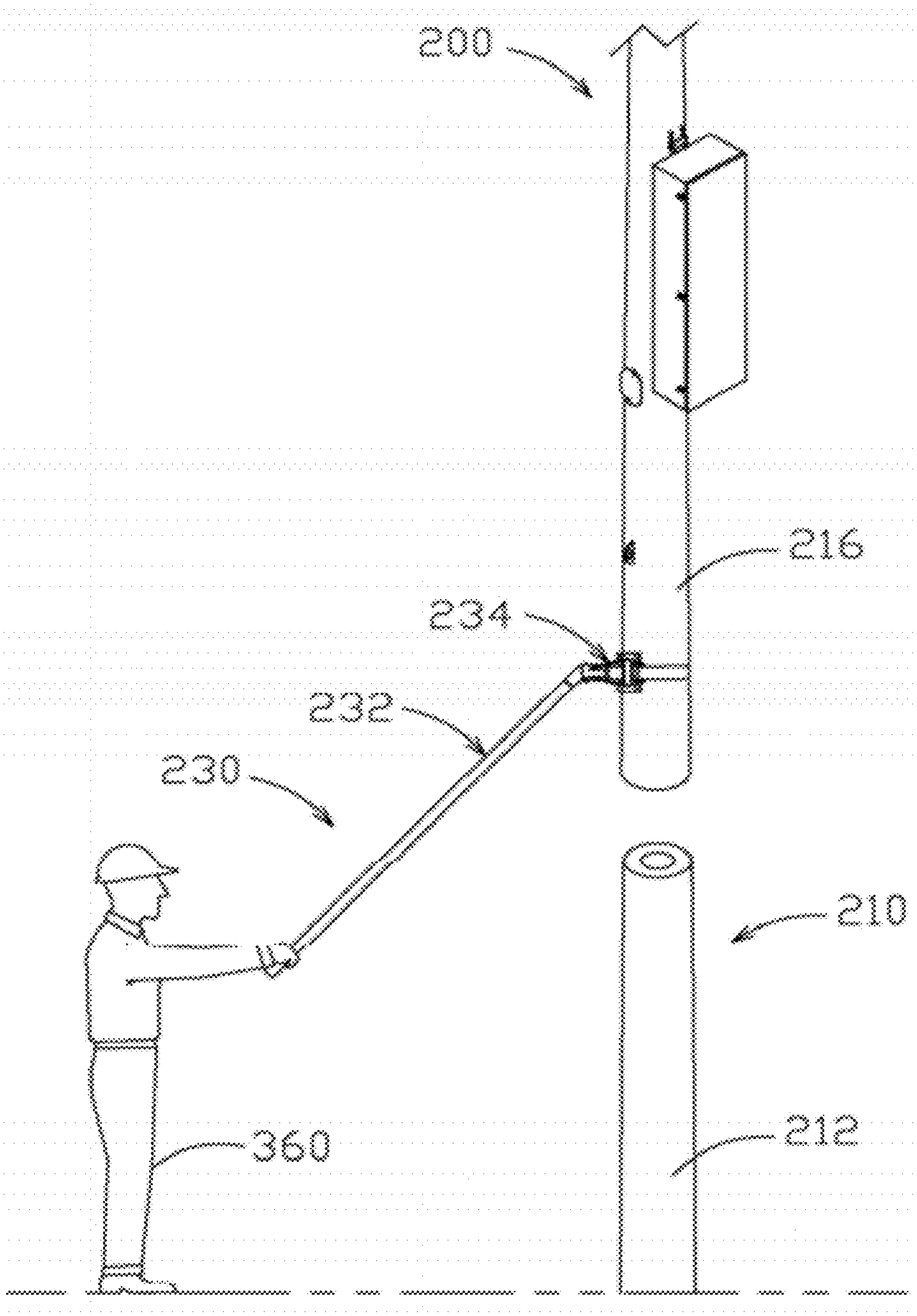

FIG. 19C is an enlarged diagrammatic view of a tool in use to guide and rotate the pole and pre-aimed fixture assembly, here attached near the bottom of the pole before preliminary seating on the base.

Figure 19D:
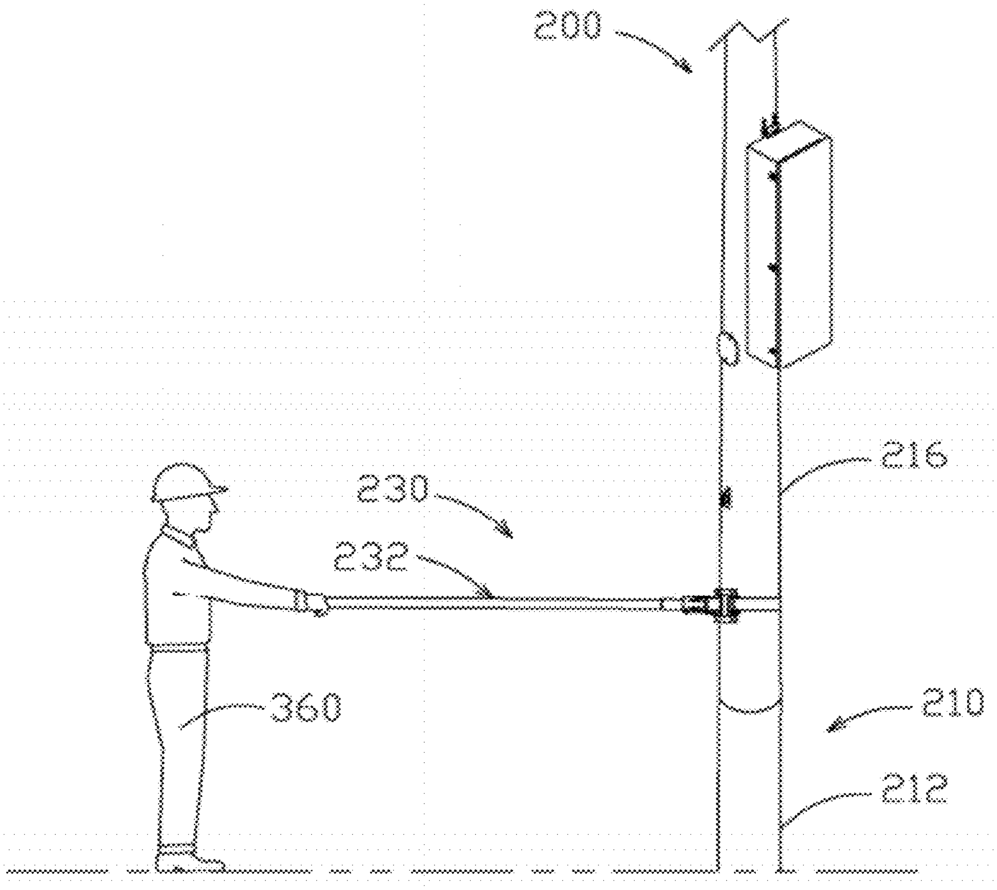

FIG. 19D illustrates in a similar view of FIG. 19C the ability of a worker to rotate the pole and pre-aimed fixtures when preliminarily seated on the base with the tool.

Figure 20:
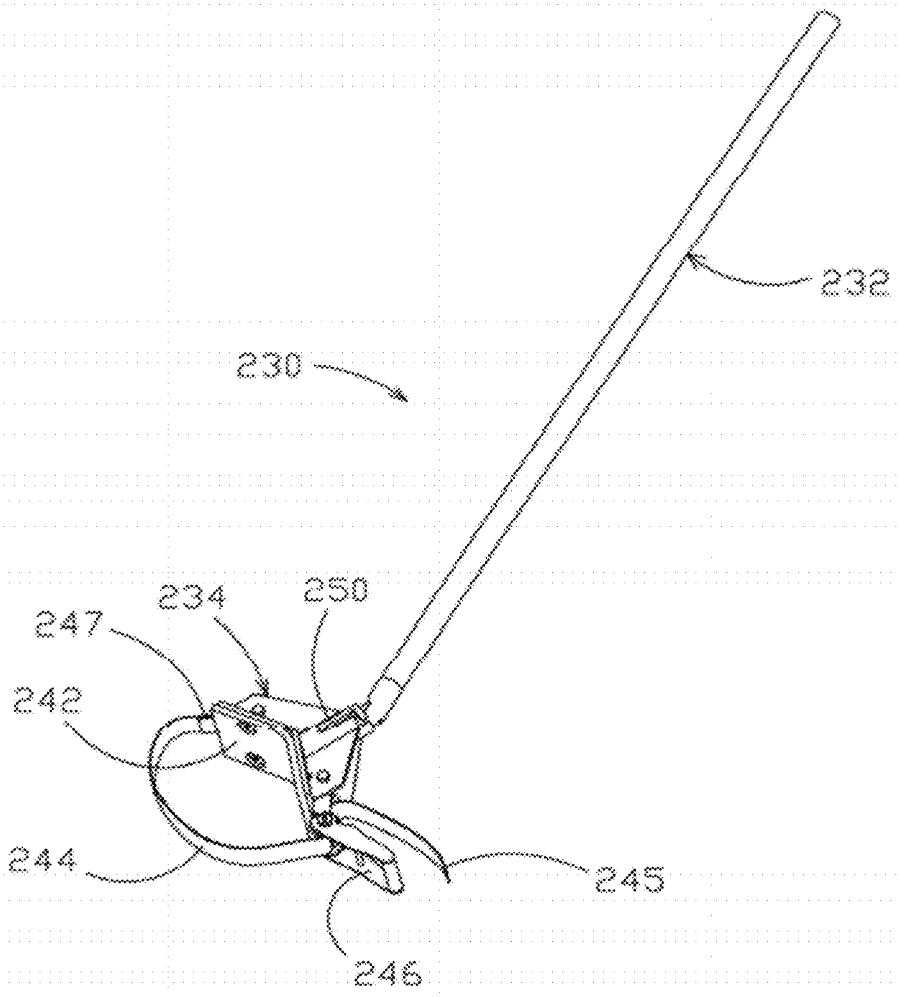

FIG. 20 is an enlarged perspective view of the tool of FIGS. 19B-D.

Figure 21:
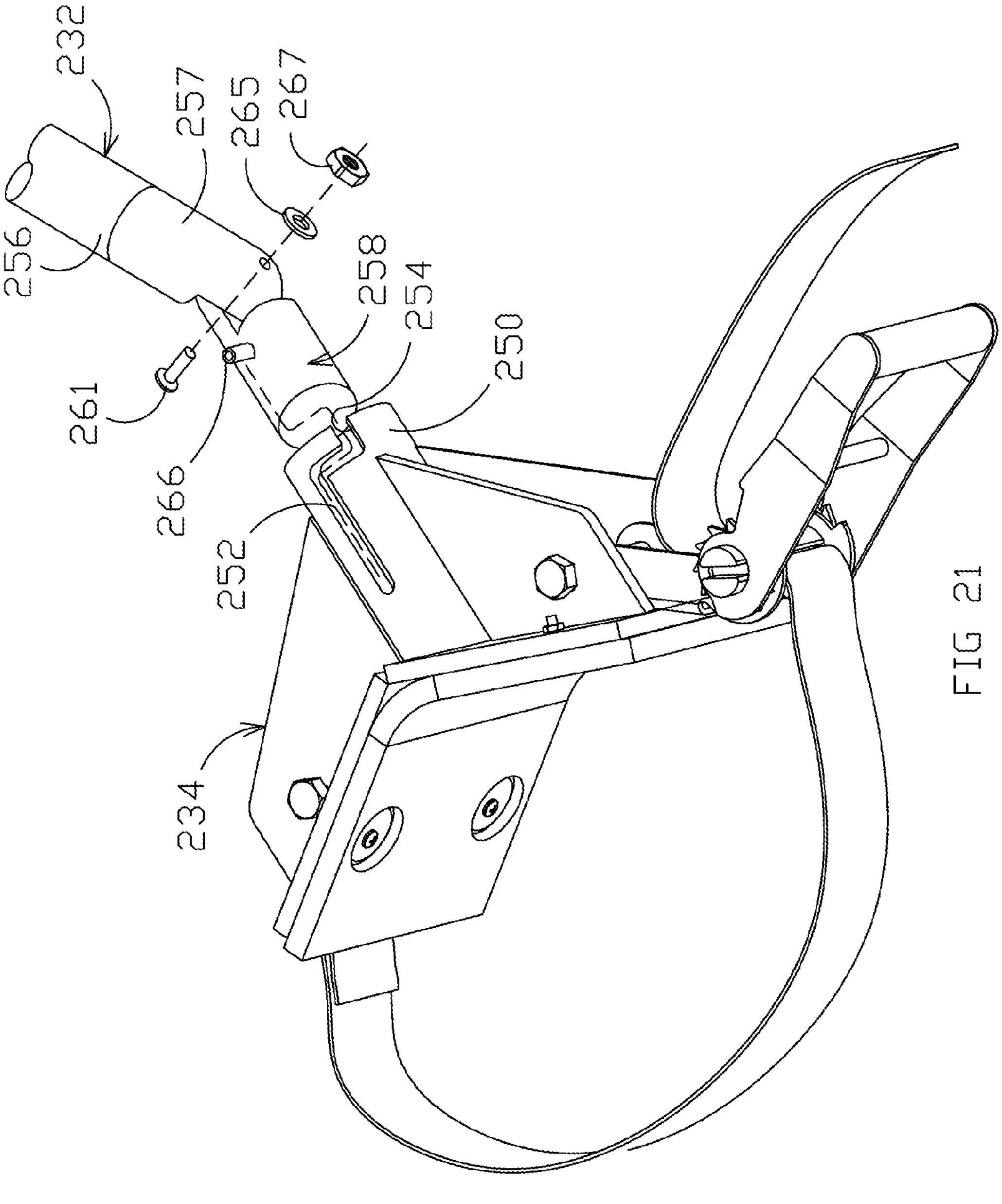

FIG. 21 is a still further enlarged perspective view of the clamping head of the tool of FIG. 20.

Figure 22:
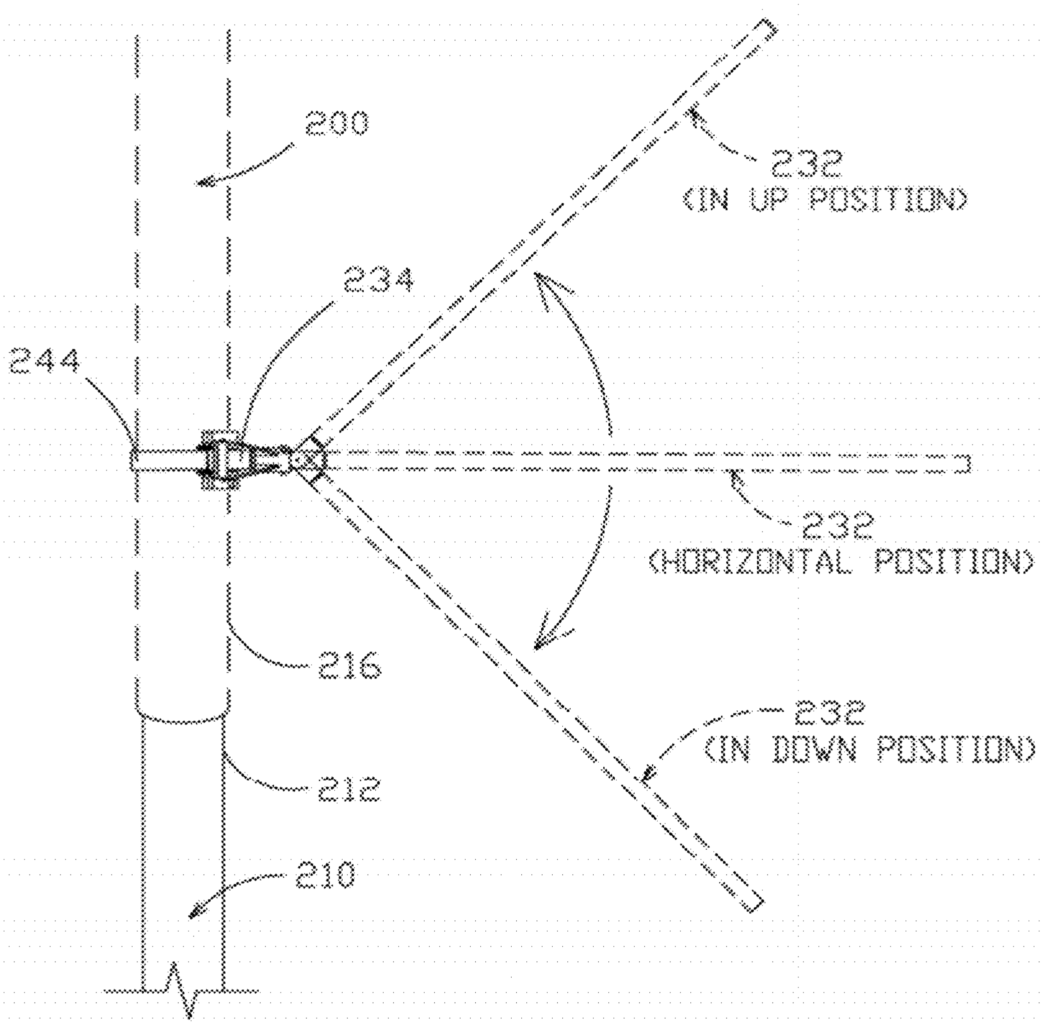

FIG. 22 is a diagrammatic view of the tool of FIG. 20 clamped to a pole such as in FIG. 19D, and showing adjustability of the handle in a generally vertical plane.

Figure 23:
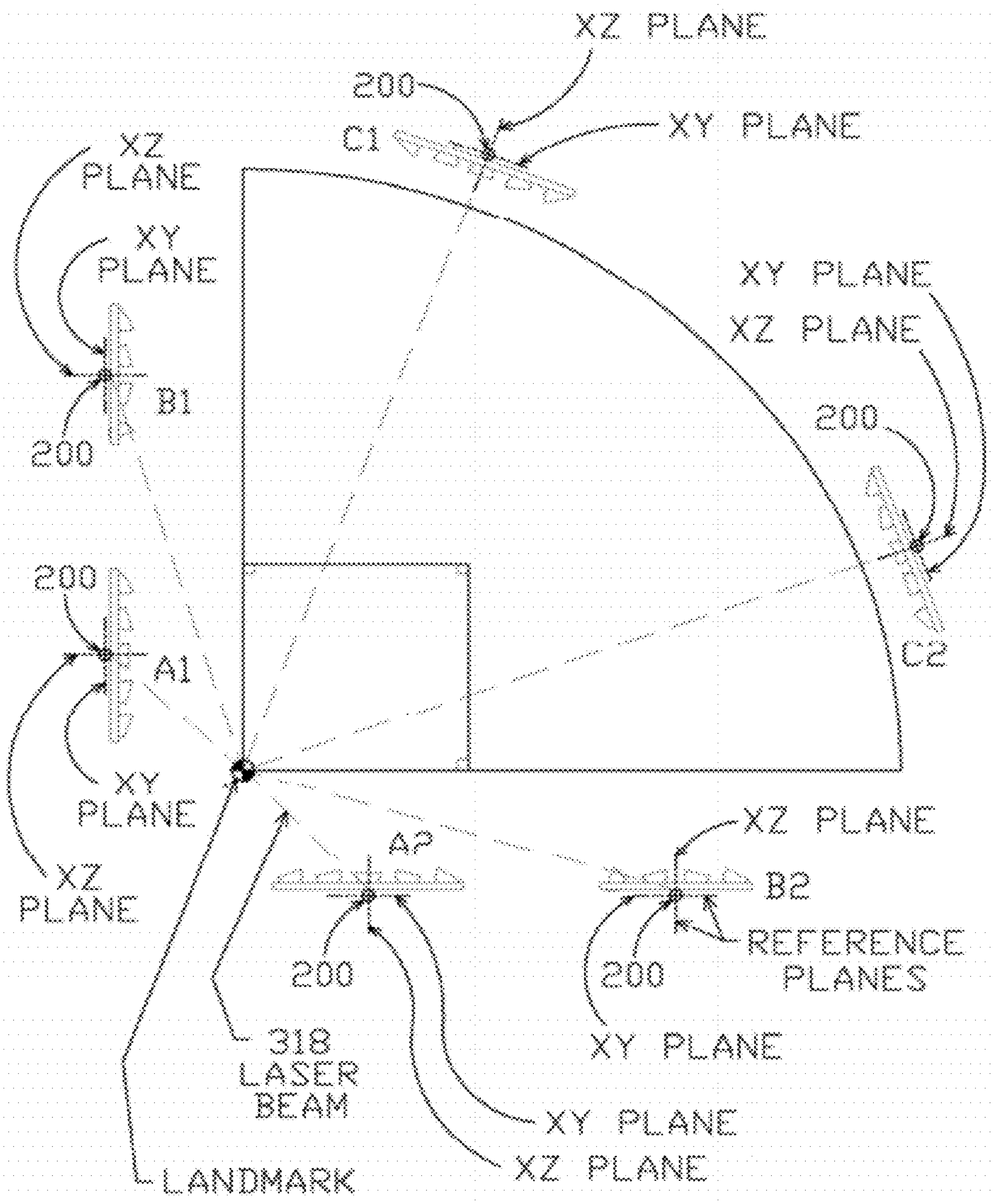

FIG. 23 is a top plan diagrammatic view of use of a common landmark as a reference for correct rotation of poles with pre-aimed fixtures prior to permanent seating of the poles on bases.

IV. DETAILED DESCRIPTION OF EXEMPLARY EMBODIMENTS

A. Overview

For a better understanding of the invention, a few embodiments of systems, apparatus, and methods according to aspects of the invention will now be described in detail. Frequent reference will be taken to the appended Figures. Reference numerals will be used to indicate certain parts and locations in the Figures. The same reference numerals will be used to indicate the same parts and locations throughout the Figures unless otherwise indicated.

The exemplary embodiments will be described in the context of sports lighting fixtures for illuminating a sports field. The context will be a lighting system having a plurality of substantial length poles (35 to 150 feet) of hollow tubular metal on the top of which a pole fitter is slip fit. See, e.g., U.S. Pat. No. 5,398,478, incorporated by reference herein for an example of such a pole and pole fitter. The pole fitter comprises a comparatively short hollow tube with one or more perpendicular cross arms. One or more lighting fixtures are mountable to each cross arm with adjustable mounting structure that allows at least two-degrees-freedom-of-movement of the fixture relative the cross arm. The number of poles and types of lighting fixtures for a given field are pre-designed according to a computerized lighting layout plan to produce a certain light intensity and uniformity across a sports field. Such computerized layout plans are well-known in the art. The lighting design includes specific aiming points for each fixture on the playing field to meet the light uniformity and intensity levels. This results in a specific aiming orientation of each fixture relative that aiming point. FIG. 17 is a hypothetical illustration of a portion of such a plan for a football field showing aiming points (circled numbers on the field) for pan and tilt angles from six fixtures (large circled numbers 1-6 on pole "F1"). The complete plan (not shown) would include a plurality of additional poles each with a plurality of additional lighting fixtures each aimed to a pre-designated aiming point on or near to the field.

It is to be appreciated, however, that the exemplary embodiments can be applied in analogous ways to a variety of other lighting applications. Examples might include but are not limited to parking lot lighting, street or roadway lighting, airport runway lighting, and all sorts of other wide area or specialty lighting. But further, as indicated earlier, the exemplary embodiments can be applied in analogous ways to a variety of non-lighting devices and applications. Non-limiting examples include cellular telephone towers and equipment, land mobile radio towers and equipment, and other wireless communication systems or antennas.

B. Over-all System According to First Exemplary Embodiment

Many of the Figures will be referred to regarding a description below of an overall factory aiming and installation system and method according to one aspect of the invention. This comprehensive system combines several components and methodologies.

1. Pre-Aiming with Position Sensor System

First, it utilizes a system to confirm to factory workers correct three dimensional orientation of each light fixture relative to a common reference plane(s) in space. The reference plane(s) are correlated to some feature of the lighting structure to which the fixtures or other devices are attached. This position sensor system, hereafter referred to as "aiming system 10" (FIGS. 1 and 2) allows very high accuracy in a controlled factory setting using optical motion capture technology to automatically measure angular or vector-based relationships in 3D. It is both quick and accurate. It is thus efficient. FIG. 23 illustrates these reference plane(s) diagrammatically for each pole fitter and their relationship to a target area. In this example, they are essentially the general orthogonal planes intersecting along the longitudinal axis of fitter tube 102 (see FIG. 18) for each pole 200. They are the XZ and XY planes in FIG. 18. As can be appreciated, having similar reference planes for each pole and then using a common reference (e.g. FIG. 23 landmark) on the target (e.g. field) allows all devices (e.g. light fixtures) to be factory aimed and then finally oriented in a manner which tied to a common point (landmark). Each reference plane XZ and XY is tied to common structure in each pole. Each plane XZ and XY is tied to a common reference (landmark).

In particular, a pole fitter 100 (see FIG. 18) comprises a relatively short (e.g. 6-8 foot long) hollow metal backbone or hydrasize tube 102 having an open bottom end 106 and an open top end 104 (that is closed by removable cap 108). One or more cross arms (here two cross arms 110 and 112 on the order of 4-20 feet in length) are fixedly mounted (e.g. by welding) as precisely as possible in an orthogonal manner to backbone 102. Lamp cones 120 (the light fixture mounts) are attached by articulatable mounting elbows 130 to the underside of the cross arms. The lamp cones 120 have an outer open end which is adapted to receive a high intensity lamp 154, a bowl-shaped reflector 153, and other components (see FIG. 15) to make up a complete sports lighting fixture. Note, however, that in this system, none of these components are assembled to the lamp cone 120 during pre-aiming. This makes it much easier for workers to manipulate and then lock in place relatively small and light weight cones 120 as compared to if all those other components were attached to cones 120. It should be appreciated, however, that other fixture components, or a complete fixture, could be assembled to cone 120 before aiming.

Each mounting elbow 130 can be mounted to the bottom of cross arm 110 or 112 via mounting plate 134 and adjusted over a substantial range (e.g. 0-120 degrees) of rotational positions around a First Axis (see FIG. 8) to provide panning adjustability for its cone 120 (the First Axis is substantially centered through elbow 130 between its proximal end at cross arm 110/142 and its distal end at slot 136). Two bolts in mirror-image curved slots 139 (one slot 139 is shown in FIG. 8; the other unshown slot 139 is on the opposite side of mounting plate 134) of mounting plate 134 allow this adjustable connection. Elbow 130 locks into mounting plate 134 and is secured by bolts 131. See, e.g., FIG. 8. Lamp cones 120 are also pivotally adjustable around a Second Axis (FIG. 8), orthogonal to the First Axis, over an angular range (e.g. 140 degrees) relative to elbow 130 to provide tilt adjustability (the Second Axis essentially is through and along bolt 38 in FIG. 8, the pivot axis between cone 120 and elbow 130). (See FIG. 8 for reference to First Axis and Second Axis). Bolt 38 through the pivot axis or Second Axis (FIG. 8) can allow this. Alternatively or in addition, a radially spaced curved slot 136 and bolt(s) 137 could also be used to allow adjustable tilting of cone 120 relative to elbow 130 or to adjustably lock the two in relative tilted position. See FIG. 8. An aiming direction or axis (labeled as Central Axis on FIG. 8) emanating out of the open end or face of each cone 120 can therefore be angularly adjusted in both pan and tilt directions to achieve three-dimensional angular adjustment of each cone 120 and its aiming axis when mounted on a cross arm.

System 10 provides many benefits. A lighting design for a sports field can dictate how many poles, how many cross arms per pole, and how many fixtures per cross arm are needed, as well as the aiming angle for each fixture relative the sports field, for each lighting application. System 10 allows pre-aiming of each fixture by pre-aiming just the relatively small and more easily manipulatable cones 120 on pole fitter 100, as compared with having to adjust fully assembled lighting fixtures on fully assembled poles whether horizontally disposed or erected vertically.

This relatively small pole fitter 100 with adjustable cones 120 is also much easier to transport to an aiming station 30 (FIG. 2) in the factory as compared to having to move it attached to a much longer and more cumbersome pole without or with full light fixtures 150 attached. The general steps of pre-aiming will now be discussed.

Thus, in a mass production factory environment, a factory worker moves the combination of pole fitter 100 with adjustable cones 120 (FIG. 18) to an aiming station 30 (see FIG. 2). A position sensor system 10 (FIGS. 1 and 2) that is capable of autonomously determining angular orientation of each cone 120 relative to a reference is actuated. In this embodiment, the first reference is a plane through the longitudinal axis of backbone 102 of pole fitter 100; and, more precisely, a plane that projects orthogonally to the cross arms 110 and 112 (the XZ plane of FIG. 7A). One or more cones 120 could be mounted on an extension 114 from a cross arm 110 or 112 (see FIG. 2). As will be further discussed, this XZ plane would also be a vertical plane that is orthogonal with the ground when the pole fitter is erected on a pole that is vertically positioned. The second reference is a plane also through the longitudinal axis of backbone 102 of pole fitter 100 and orthogonal to the first plane (the XY Plane of FIG. 7A). It could also be described as a plane through the pole axis and generally parallel to fixture mounting cross arm(s) 110/112.

Figure 1:
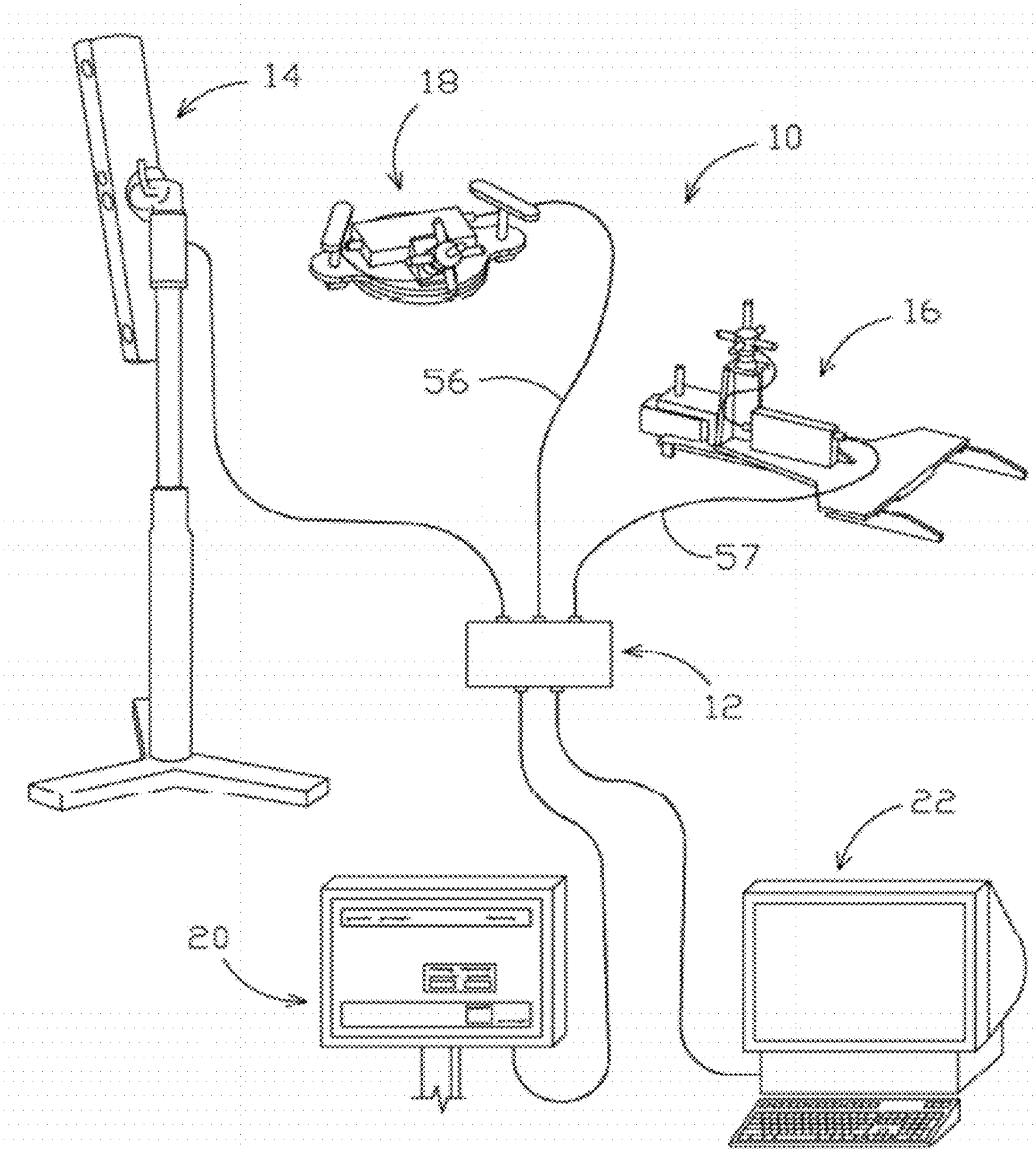
FIG. 1 is a perspective view of components of the active marker optical motion capture system according to an exemplary embodiment of the present invention.

In this embodiment, the position sensor system comprises an optical motion capture system. FIGS. 1 and 2 are diagrams of the same and will be discussed below.

A controller 12 for the optical motion capture system has the following inputs. A three-dimensional camera vision system 14 is elevated on a stand that can be moved into position to view the aiming station 30 in the factory (see FIG. 2). A first set of active optical markers 17 (e.g. infrared LEDs) (FIG. 3) is mounted on a rigid body that is secured to a jig that can be placed on the top of tube 102 of pole fitter 100 near the bottom cross arm 112 of pole fitter 100 (FIGS. 7A). This jig with the optical markers is referred to as reference plane device 16. Reference plane device 16 is adapted to sit on top of and along the pole fitter backbone 102 and when horizontal at the aiming station 30 (see FIGS. 3 and 7A) will establish the reference planes XZ and XY in camera space created by optical motion capture system cameras 14 (see FIGS. 3 and 7A).

A second set of active optical markers 19 (e.g. infrared LEDs) is mounted on a rigid body that is secured to a jig that can be removably attached on the face of a cone 120. This jig with the optical markers 19 is referred to as aiming sensor device 18, as its function is to be placed in a consistent position on each cone 120 to establish the aiming axis (i.e. central axis) of each cone 120 by the position sensor system. The aiming sensor device 18 establishes a vector perpendicular to the cone face and then projects that vector onto the planes X'Z' and X'Y' established by the reference plane device 16 (see FIGS. 4 and 7B).

By methods well known with respect to optical motion capture technology, optical system 14 captures in its camera space multiple concurrent images of the markers of reference plane device 16, and aiming sensor device 18 from different viewing angles for one cone 120. The active markers are strobed LEDs accurately positioned to mark out with those lights an XYZ axis for each of reference plane device 16 and aiming sensor device 18 (see FIGS. 3 and 4). The strobed infrared (IR) LEDs stand out from and are very distinct in the images digitally captured by cameras 14. The software for the optical motion capture technology analyzes the digital images of cameras 14 and can distinguish the markers. Controller 12 receives these inputs and the software calculates in 3D space the angular relationship of the central or aiming axis of that cone 120 relative the reference plane(s) for reference plane device 16 and aiming sensor device 18. The reference plane device 16 and aiming sensor device 18 have a known relationship to fitter tube 102 and cone 120 respectively. The active markers 17 and 19 have a known relationship to their respective reference plane device 16 and aiming sensor device 18. The active markers 19 and their reference planes X'Z' and X'Y' have a known relationship to the central aiming axis of its cone 120. Therefore the 3D relationship of the reference planes (X'Z' and X'Y' active markers of aiming sensor device 18 is straight forward with reference planes XZ and XY of reference plane device 16.

Computer 22 can communicate with controller 12 to provide it with the set of desired aiming angle orientations for all cones 120 of a particular lighting application. Controller 12 can communicate to a display 20 visible by the factory workers a set of information or graphics that automatically show when a particular cone 120 is adjusted so that the aiming sensor device 18, which represents the central axis of cone 120, is in a very close correspondence with the pre-designed desired angular orientation for that cone 120 relative the references defined by the reference plane device 16. The worker can receive a visual, audible, or other perceivable signal or indicia of correct alignment for that cone 120 and then lock that cone 120 and mounting elbow 130 in the correct pan and tilt angular orientation. This is a highly precise way to help the worker accurately pre-aim the mounting cone 120 for each fixture location on fitter 100 relative to a, e.g., vertical reference plane. It is to be understood that confirmation of correct aiming orientation of each cone 120 is relative to the same reference plane(s), not individually to some aiming point on the field to be lighted and not individually to its mounting elbow 130, cross arm 110 or 112, or some other structural feature of fitter 100. Each aiming orientation is relative to the same, consistent references, as captured and analyzed in camera space. The references are correlated to the backbone 102 of fitter 100, which in turn is correlated to the entire pole (200 FIGS. 19A-D), which in turn is assumed to be vertically plumb when erected. In this way, a highly controlled and accurate pre-aiming of cones 120 at the factory relative to references correlated to pole fitter 100 and pole 200 can be created or maintained at the installation site, with the only remaining issue for final accurate aiming relative the field being the correct rotational alignment of pole 200 relative the field.

As can be appreciated, this factory pre-aiming correlated to a reference eliminates a number of potential causes of aiming error. Each cone 120 is aimed relative to the reference(s) correlated to the vertical backbone 102 of fitter 100. This backbone 102 would slip fit down onto the top of a long vertical pole 200. The slip fitting provides a quite accurate and easy way to connect fitter 100 and pole 200, but also align the longitudinal axis of backbone 102 with that of pole 200. Thus, the references based on backbone 102 essentially become a reference based on the longitudinal axis of the entire pole 200. This eliminates any potential error that might exist if the angular orientation was instead referenced to a cross arm 110 or 112. For example, a cross-arm can sometimes be warped so that it is bent or twisted. This can be caused by uncertainties in manufacturing or assembly processes. This can interject substantial and material error or offset in aiming of one or more fixtures.

Therefore, pre-aiming each mounting cone 120 to the same reference(s) avoids such issues. It is assumed that fitter backbone 102 will fit and be aligned with the longitudinal axis of the long pole 200, which in turn will be slip fit on a base 210 (FIG. 19A) that has been plumbed. The only adjustment left to ensure the fixtures on pole 200 are correctly aimed when installed is to correctly rotate pole 200 on base 210. One way to do so is to rotate the pole such that the vertical plane of alignment (e.g. with an alignment beam) is accurately in position relative to a target area's landmark. Alternate aiming systems or variations of the previously described system are possible and will be described in more detail later in the specification.

2. Pole Rotation Tool

Once the cones 120 have been aimed, the whole fixtures 150 (see e.g. FIGS. 15 and 19A) are assembled to them, fitter 100 is attached to pole 200, wiring and other components are added, and pole 200 is preliminarily raised and placed in a position over the base 210. Controlled rotation of pole 200 is easily accomplished with a specialized pole rotation tool 230 (see FIGS. 19B, C, and D, and 20, 21, and 22). Tool 230 has a ratchet strap assembly, such as are commercially available, including a strap 244 (e.g. nylon) that has a free end that can be quickly wrapped around the pole by a single worker (especially easy when the pole 200 is horizontal on the ground). The other end of strap 244 is fixedly attached to tool head 234 (e.g. usually just a few feet from the bottom of pole 200—such as 1-3 feet—see FIG. 19C). Once wrapped completely around pole 200, the free end of strap 244 can be threaded into a ratcheting mechanism of the ratchet strap assembly and operated to secure head 234 along the side of pole 200.

Head 234 has a V-shaped side (FIGS. 20 and 21) that automatically centers on pole 200 when cinched in place. A rubber or similar pad can be fixed to the pole side of the V-shaped side of head 234 for a high co-efficient of friction to deter slippage of head 234 relative to the exterior of pole 200 and to protect the exterior surface of pole 200 from damage. Alternate designs or shapes other than a V-shape for the head are possible to allow the head to conform to the pole structure shape.

Once the pole 200/fitter 100/fixtures 150 have been assembled on the ground and then raised (e.g. by a lift truck, crane, or other machine), a handle 232 (e.g. 5-6 feet in length) is removably attached to head 234 but is articulatable relative to the pole as shown in FIG. 22. It can be raised or lowered in a vertical plane but when moved horizontally would cause rotation of pole 200. The ability to have the articulatable handle, the quick cinch to and release from pole 200, the mechanical advantage and leverage by the long handle 232, cooperate to provide needed advantages to a worker trying, by him/herself, to accurately rotate a pole 200 to the desired orientation. When head 234 is attached to a typical pole 200 about 2-3 feet above its bottom, head 234 would be about 5-6 feet off the ground when pole 200 is preliminarily seated on base 210 of the type shown. This would allow the worker to easily reach up and attach handle 232 to head 234 and then pivot handle 232 in the vertical plane to the worker's preferred position to rotate pole 200.

3. Pole Rotational Alignment Unit

Third, a pole rotational alignment unit can be utilized by a worker on the field or target area to confirm correct rotational position of the pole relative to some predetermined landmark or location. As noted above, this is the only and final adjustment requirement for final aiming and installation of the lighting assembly on base 210. In other words, if cones 120 are factory pre-aimed as described above, once pole 200/fitter 100/and fixtures 150, and other related components are assembled for a pole 200, and that assembly is raised to vertical (FIG. 19A) and its lower end placed preliminarily on base 210 (FIG. 19B), all that is left is to rotate pole 200 so that its reference plane is accurately (within an acceptable range) rotated to a confirmable pre-designed orientation. No individual aiming of fixtures or cones is needed. No confirmation of correct aiming of individual fixtures is needed. Once correct rotational position of pole 200 is confirmed, it is assumed with high confidence that the pre-aimed fixtures are correctly aimed to their individual aiming points on the field and pole 200 can be secured in that rotational position to base 210 or other mounting means.

One form of the pole alignment unit is an alignment beam assembly 300 (see FIG. 19B) that is mounted on pole 200 to project a vertically fan-shaped or diverging (but narrow horizontal width) alignment beam that is in accurate correspondence with the reference plane. Correctly calibrated to correspond with the vertical reference plane, the inexpensive fan-shaped alignment beam unit is mounted on and calibrated to pole fitter 100 to essentially project the vertical reference plane from pole 200. One way to do so is to mount assembly 300 and calibrate it so that its beam spreads out essentially in the X"Z" reference plane. However, the beam can be referenced or associated in other known relationships. A worker on the field can find the reference plane by finding the alignment beam. Because it is spread vertically, the beam will essentially project a thin vertical wall of alignment beam light across the field. The lower part of the beam will essentially intersect the ground along a line across the field.

By the same principal as occurs when a person perceives a flash when the highest intensity center of the beam of a conventional flashlight moves past or intersects a human eye, the worker will perceive a flash when his or her eye enters or passes through the vertical plane of the alignment beam (see, e.g., reference numeral 318 in FIG. 13). Note how beam 318 spreads out in plane X"Z". In one aspect of this system, the alignment beam assembly is mounted and aimed within a small margin of error so that, when the pole is in correct rotational position so that all fixtures are accurately aimed to their aiming points on the field, the alignment beam of assembly 300 would intersect with, for example, what will be called a "landmark" on the field or target lighted area, or in close proximity thereto (e.g. FIG. 23). Thus, a worker merely stands on, in front of, or behind the landmark, and waits until he/she perceives the "flash" of the alignment beam to confirm when the pole is correctly rotated.

Pole 200 can be what will be called preliminarily mounted on a slip fit base such as base 210 in a rotational position that tries to aim the alignment beam assembly 300 to the known, visibly or otherwise perceivable landmark on or near the field. From experience, correctly mounted alignment beam assembly 300 (see FIGS. 12 and 18) on a pole with pre-assembled and pre-aimed fixtures can be elevated and partially lowered onto a base 210 to approximate the correct rotational position.

Normally this would place the alignment beam 318 within perhaps a few degrees (e.g. approximately +/−10 degrees or less) from the correct rotational position. A worker on the field could then quickly and efficiently walk laterally to the pole being erected until he or she finds the alignment beam by the flash. The worker will then note any offset from the correct alignment of the beam relative to the design of the field and communicate directly (e.g. by voice or other communication method) to a worker at the pole to rotate the pole in the direction to bring the beam towards the landmark, to correct alignment of the fixtures in relation to the target area.

Alternatively the worker could use radio or other communication apparatuses or methods including hand signals or non-verbal communication. The on-field worker would then move to and stand at the landmark (e.g. FIG. 23) and confirm when the pole 200 has been rotated to correct position. Because the alignment beam is quite narrow in width horizontally, confirmation of correct rotational position by using the "flash" usually results in accuracy within +/−1/2 degrees or less of rotation, which can be acceptable for many applications. The on-field worker and pole-rotating worker can use methods, such as double-checks, to try to achieve high accuracy. A benefit of the landmark is that the on-field worker can know exactly where to stand to confirm rotational positioning of pole 200, and does not have to hunt, measure, or otherwise take additional steps to locate such a reference point or multiple points. The landmark is usually highly visible or perceivable to the worker. It can even be visible or perceivable to the pole-rotating worker.

Alternatively, correct rotational position of the pole can be confirmed as follows. The pole-rotating worker could use a tool such as tool 230 to rotate pole 200 back and forth over a range (e.g. 90 degrees) while the on-field worker stands on the landmark. The on-field worker would signal the pole-rotating worker when he/she perceives the "flash" of the alignment beam. This would be an initial gross positioning of rotation of pole 200 relative the landmark. The pole-rotating worker would then rotate pole 200 over a much narrower angular range (perhaps roughly 10 degrees or so) as slowly as possible. The on-field worker would fine-tune the correct rotational position when perceiving the flash and communicate to the pole-turner to stop rotation. The on-field worker could move his or her head back and forth to double-check correct alignment, if necessary. Alternately, a sensor (e.g. laser sensor), as described elsewhere herein could be used. If any fine tuning is needed, it could be done by communication between the workers and small incremental rotation of the pole. After pole 200 is secured to base 210, the orientation could be verified prior to moving the lifting equipment to the next location. This allows for adjustments to be made without additional crane setup.

4. System Advantages

The system therefore provides accurate pre-aiming of each fixture at the factory to eliminate manufacturing tolerances, and other uncertainties and potential human error of aiming in other manners. It provides a very efficient and adaptable tool for rotation of the pole before final seating or fixing. And, it provides for an efficient, economical, but remote (from the pole) method of determining the correct rotational orientation of the pole relative the target area.

As can be appreciated, this minimizes labor and time with the added advantage of high accuracy to meet the light aiming design. As mentioned, the accuracy has been found to be within an improved margin of error over many other methods.

The system utilizes an alignment beam to assist in light fixture array aiming, but has at least the following differences over the previously incorporated by reference U.S. Ser. No. 12/323,838.

First, the alignment beam assembly 300 (FIG. 12) is mounted on the pole (FIG. 15), not on a fixture. The mount accurately corresponds the alignment beam 318 with the longitudinal axis of the pole (established as a plane (e.g. XZ in FIG. 3) by the camera aiming system), not a cross arm or an individual fixture. Instead of checking if the alignment beam falls on a fixture aiming point on the field (which can be difficult to locate), the pole-mounted alignment beam is checked to see if it falls on a landmark or known visually perceptible feature of the field. An example is home plate or second base (or a point on those bases—e.g. the back point where the first and third base paths intersect on home base, or the center of second base) on a baseball field (FIG. 23). This eliminates having to measure to a fixture aiming point on the field and all of the structures for the system can use the same landmark for improved accuracy and to maintain the relationship between the fixture arrays. Using a common point allows the fixture arrays to maintain their relationship, providing an overall composite beam or composite lighting system.

Second, by factory pre-aiming the cones 120 relative the pole 200/pole fitter 100, and then knowing the relationships between the alignment beam 318 and the pole 200/100, if the alignment beam 318 lines up with the landmark, it is assumed each of the fixtures 150 of the array are correctly aimed. The only step to line up the alignment beam 318 with the landmark is correct rotation of the pole 200. This can be done efficiently with sensing the "flash" of the alignment beam 318 when standing on the landmark. The pole rotation tool 230 can efficiently be used to rotate the pole 200 into correct position. The result is quicker and more accurate aiming.

Sub-systems or components of the above-described system are described in additional detail individually later in this description.

C. Composite Lighting System

The apparatus, method and system described herein also relates to any system that could benefit from precise control of the alignment of the devices in the system to ensure the devices function as a composite or aggregate system or the composite aggregate system functions essentially as a single unit.

Computer modeling or other design methods are often used to determine the location and precise orientation of devices that function together to create an overall system. Often times devices, including but not limited to lighting fixtures, are grouped together on a single mounting structure or on multiple structures or are designed for coordinated operation as an aggregate, coordinated system. The model or design of the system creates a pre-planned layout and aiming of the devices to ensure each device contributes to the overall system in the desired manner and the system functions as intended. Often times the model or design is used to provide the customer information on performance of the final product/system. Given an accurate model or system design, the provider may guarantee the system performance illustrated in the model. The challenge for the system provider is controlling the various aspects of manufacturing and installation to ensure the final operating system closely matches the model or design. In other words, the model or plan provides an ideal aiming for the devices, but the challenge is to install the devices accurately according to the plan.

The problems in the art that are solved by the apparatuses, methods and systems discussed herein are the precise orientation control of devices that are part of an aggregate system. While methods and systems exist to attempt to precisely control the orientation of individual aimed devices, typically a function of the manufacturing process, the devices must then be installed in the desired orientation so that the collective group of devices acts as a composite unit. The apparatus, method and system discussed herein provides for a composite unit, aggregation or coordination of devices by precise control of the installed orientation of the devices or arrays of devices.

Further objects, features, advantages, or aspects of these aspects of the present invention include an apparatus, method, or system which;

a. provides for precise control of orientation of devices to allow for separate devices or groups of devices to more effectively function together as a single unit;

b. improves performance of such a system by controlling aspects of the field installation.

A method according to one such aspect comprises controlling the orientation of the installed devices by referencing from or to a common point. In one example, the devices are light fixtures that make up a lighting system. The light fixtures may be individually mounted to an elevated structure or pre-mounted on a mounting frame as a pre-aimed array that is mounted to an elevated structure or pole as have been previously described. The methods, systems and apparatuses discussed herein assist with the pre-aiming of devices, such as sport lighting light fixtures, and field orientation of the pre-aimed devices as part of the installation. One embodiment uses an alignment beam to aid the installer with positioning the devices in the correct aiming orientation. This simplifies the installation process for the contractor and generally improves accuracy of the orientation. One additional benefit is that this method of controlling the orientation of the aimed devices is suitable for creating a composite system. In the example of a lighting system, each light fixture contributes to a portion of the overall system since no one single light fixture can effectively cover the entire area to be illuminated. Computer modeling and other tools are used by the lighting designer to determine the type of light fixtures required, and their quantity, location and orientation. The light from each light fixture is directed to a specific area to achieve the desired lighting results. Many times, groups or arrays of light fixtures are mounted together on a common frame. Each light fixture in the array is assembled and orientated in relationship to the other light fixtures in the array. By using controlled methods to orientate the light fixtures, the collective light beams from the array essentially produce a single composite beam. The composite beam from the array of light fixtures usually contributes light to a portion of the target area. In this example regarding light fixtures, referencing the aiming of each fixture to a common reference (e.g. reference plane XZ and/or XY), facilitates this composite functioning of the entire array. Light from additional arrays of light fixtures contributes to the remaining portions of the target.

Since it is not generally practical to illuminate a whole target with a composite beam from one unified array, controlling the installation of multiple arrays or individual devices is usually important to achieve desired results. By using a common or central reference point (e.g. landmark, see FIG. 23) for proper orientation of all the arrays or devices, the light beams from the multiple locations does produce what can be considered an overall composite beam from plural devices or arrays of devices on different elevating structures. The result of this overall composite beam is performance from the lighting system that more closely matches the predicted results, e.g. such as calculated by a computer model or plan. In other words, some prior installation methods result in a rough approximation of the predicted results from a computer-generated model or plan that assumes quite accurate device aiming, because of variances from exact aiming during installation. Another example of an earlier attempt to produce a type of composite lighting is U.S. Pat. No. 4,450,507, incorporated by reference herein. It aims fixtures relative to cross-arms and then the whole array to a target. There is no common reference plane. Aspects of the invention can reduce such variances, which in turn can better meet the predicted results of the model or plan. In some cases, this results in better operative results from the devices. It can also allow a manufacturer or installer confidence in meeting the strictures of the model or plan. This can be important, for example, if a private contract with the end user or government regulations require the manufacturer or installer to meet certain requirements of the model or plan. This can also allow a manufacturer or installer to optionally offer a level of assurance to the end user that those requirements of the model or plan will be met.

More specifically, using the wide area lighting embodiments described earlier as an example, the fixtures 150 of the lighting array on the pole 200 are pre-aimed in the factory per the pre-defined lighting design using the type of reference described. The light output from the array of this method produces a composite beam of light from the array. Each fixture of the array contributes to a portion of the composite beam. Since the orientation of each fixture in the array is precisely controlled, the composite beam of light may closely replicate the beam shape, intensity and other characteristics used by the lighting designer for the computer generated lighting model. The addition of controlling the alignment of the pole or light array as a composite beam to a common or single landmark reference point allows the composite beam to function together with other such composite beams, as a coordinated, composite beam, so to speak, for the entire target area, or as a composite lighting or illumination system.

Additional description of examples of components that can be used for various aspects of the exemplary embodiments will now be set forth. Analogous results are possible with devices other than lighting fixtures. For example, there may be a need to aim directional antennas each in different pre-designed directions to provide composite coverage of an area. Another example is aiming of plural audio speakers for composite coverage (e.g. in an arena). Other non-exclusive examples are mentioned herein. The devices might be elevated each on its own pole or elevating structure, or as sets or arrays of plural devices on each pole or elevating structure.

In one aspect of this idea of composite coordination, plural arrays of devices are in different locations relative to one another. A reference (e.g. XZ plane of FIG. 3) for each of the arrays is created. Each device on each array is aimed relative to a single or essentially single landmark (e.g. see FIG. 23). This ties all of the devices to the same landmark for accuracy and provides the benefit of a composite coordination for all devices. The subtlety is that there is a common landmark for aiming all arrays and a common reference for devices on each array. Each array may have between one and plural devices. Prior attempts did not have a single point of control or reference for all arrays. They also did not use the type of common reference for all devices or an array described herein.

Consider the case of sports lighting. Most lighting systems for a sports field include at least several poles each elevating an array of at least several lighting fixtures. If individual lighting fixtures are aimed to individual points on the field, there is no single unified point of reference for such aiming. If individual fixtures in an array on one pole are aimed relative a common reference point, but not any other fixtures on any other pole, there is still a gap in this unified single reference. The aspect described herein does use a single unifying reference point or landmark which at least each array on a separate pole is referenced to promote this composite coordination.

D. Position System Sensor Component—Aiming System

1. Optical Motion Capture Based System

The Figures, particularly FIGS. 1-5A-C, 6A-C, 7A-B, and 8, illustrate and provide additional details regarding an aiming system 10 according to one aspect of the exemplary embodiments. System 10 uses a position sensor system. An example of such is an optical motion capture system such as the OPTOTRAK PROseries Optical Tracker, Model 2000 system commercially available from NDI (Northern Digital, Inc.) of 103 Randall Drive, Waterloo, Ontario CANADA N2V IC5. The system includes the NDI Optotrak software package with customized features to fit the needs of the devices to be aimed. It includes optical active markers, a position sensor imaging sub-system having multiple cameras, a system control unit of s-type, and a computer interface (PCI, Ethernet 10-1000 Mbps, SCSI). Its cameras are elevated on a portable stand that can be adjusted in height and orientation (see FIGS. 1 and 2). Details about the system can be obtained from the manufacturer and from its website www.ndigital.com. Other similar systems are available and may be adapted to suit the needs described herein.

Accuracy of these types of systems is a fraction of an inch with appropriate setup, operation and calibration. This translates to within a small fraction of a degree for angular relationships. It can simultaneously track up to a relatively large number of markers.

The aiming system 10 digitally records movements and computes relative position and angular orientation between its markers. The software records the positions, angles and, if needed or desired, such things as velocities, accelerations and impulses of markers relative to one another or to a reference.

The aiming system 10 triangulates the 3D position of a marker or what is sometimes called a “target” on a rigid body (each “rigid body” can have one or more markers or targets) between one or more cameras calibrated to provide overlapping projections. The system produces data with three degrees of freedom for each marker. Rotational information is inferred from the relative orientation of three or more markers. An analogy is shoulder, elbow, and wrist markers on a human could provide the angle of the elbow. With the aiming system 10, after processing the software exports data in near real time, e.g., provides calculated 3D angular orientation of, in one example, a measured cone 120.

In this embodiment, the active markers are LEDs which illuminate one at a time very quickly (e.g. by strobing one marker one at a time or tracking multiple markers over time and modulating the amplitude or pulse width to provide marker identification). The system can produce unique marker identifications to reduce turnaround and eliminate marker swapping and provide cleaner data. Marker swapping can occur if one marker passes over another.

It is to be understood, however, that other types of position sensor systems could be utilized. One example would be a passive optical system with markers coated with a retro reflective material to reflect light back to position sensors. Camera sensitivity can be adjusted to identify only the bright markers and ignore background or anything else in the field of view. Still further types of position sensors are possible. One example is a semi-passive imperceptible marker system wherein photosensitive markers are used to receive an emitted optical signal and determine positions and orientation. Even markerless systems are possible wherein the camera detects features of the aimed device and determines the device’s position and orientation. Examples are object identification or image identification systems that can be programmed or trained to identify a shape or pattern in, e.g. camera space. All these alternative examples of position sensor systems are commercially available. Others are possible.

Non-optical systems are possible. Inertial motion capture is based on miniature inertial sensors, biomechanical models and sensor fusion algorithms. Mechanical motion capture directly tracks angles with rigid structures of jointed, straight metal or plastic rods linked together with potentiometers. Magnetic systems calculate position and orientation by relative magnetic flux of three orthogonal coils on both transmitter and each receiver. RF (radio frequency) positioning systems are becoming more viable as higher frequency RF units allow greater precision than older RF technologies (50 GHz or higher are desirable for higher accuracy).

Other details about the aiming system 10 of the exemplary embodiment are as follows.

(a) It can provide a 20 $m^3$ volume for measuring quite large parts and assemblies, including of the size of the assembly shown in FIG. 18.

(b) It may be relatively portable and easy to set up or move (FIG. 2).

(c) The system computer runs software from motion capture manufacturer and third-party software utilities and is readily programmable for custom application.

(d) It is a real-time optical measurement system designed to track 3D locations of “targets” or “markers”. By attaching three or more targets to a rigid body, the system can return both the position and the orientation of the object. In turn, the rigid body with its markers is configured to mount on fixtures or jigs which can be removably mounted to (1) a light cone 120 using aiming sensor device 18, (2) along the pole fitter and against a cross arm using reference plane device 16, respectively, as previously described. Thus, the system has the ability to measure the orientation of a light cone 120 relative to pre-defined planes established by the rigid body on reference plane device 16.

(e) The system comes with a computerized system control 12 responsible for data processing and controlling targets and computer (see FIGS. 1 and 2).

(f) When mounted in operating position (FIG. 7A), the reference plane device 16 with its support frame, fixture, or jig 40 (FIG. 3) is aligned to identify a flat plane that represents the longitudinal axis of tube 102 of the pole fitter.

(g) The reference plane device 16 will provide enough information to determine (1) a plane orthogonal to the reference plane device (established by the reference plane device 16), and (2) a plane parallel to reference plane device 16. The reference planes orthogonal and parallel established by the reference plane device also establish the planes relative to the pole fitter 100.

(h) When mounted in operative position on a lamp cone 120 (FIG. 7B), the aiming sensor device 18 will be aligned in such a manner as to determine a normal vector to the plane or planes (e.g. plane X'Z' and/or X'Y' in FIG. 4) in which the fixture or jig 50 (FIG. 4) with aiming sensor device 18 mounts on the cone 120. The aiming sensor device 18 may have a number of possible mounting positions and/or orientations on the light cone 120 to permit visibility of the sensor 18 when aligning light cones 120 at the ends of the cross arm 110 or 112.

(i) The camera vision system 14 has a fixed field of view (see, e.g., www.ndigital.com/industrial/optotrakproseries-models.php). Camera vision system 14 could also be re-oriented for two measurements to cover a larger number of cones 120 than might be in a single field of view for camera vision system 14.

(j) Software will assist assembly workers in the alignment of light cones 120 (FIG. 2) relative to the tube 102/reference plane device 16 and aiming sensor device 18 as follows:

(1) Determine the horizontal and vertical planes of interest using information from the reference plane device 16 and aiming sensor device 18.
(2) Determine the angle between the light cone normal vector (as established by the aiming sensor device 18) and the horizontal and vertical planes.
(3) Accept light fixture assembly information from a barcode or machine readable label or similar unit (FIG. 5B).
(4) Retrieve light cone information from a database (e.g. of specific aiming information for cones 120 of a specific assembly I.D. as usually kept by the lighting system designer/assembler company).
(5) Display a graphical view of all the cones 120 for the current assembly (FIG. 5C).
(6) Display assembly ID with the list of cones (FIG. 5A).
(7) Worker may confirm the assembly ID (for quality control and accuracy) through a keyboard or graphic user interface (GUI) (e.g. touch screen) associated with system 10.
(8) On a graphical "cones list", display cones 120 that have been locked down (i.e. which have been aimed with the system and then hardware tightened to lock it in place).
(9) Determine which cone 120 is currently under work based on (a) the position of the light aiming sensor device 18 and (b) information taken from the designer database.
(10) Once a specific cone 120 is identified as the one currently under work, display the cone information immediately (FIG. 6A).
(11) Display a summary of completed cones.
(12) Real-time display of current and desired cone rotations as text in Euler angle format (or some other format) (FIGS. 6A-C).
(13) Provide a detailed view which displays a graphical view to help the user approach the target rotations for the cones 120 when making gross movement (FIGS. 6A-C).
(14) In detailed view, display red/yellow/green bars (or with other visual indicators), for fine-tuning cone angles (e.g., one bar for cone relative to horizontal plane, one for cone relative to vertical plane—see FIGS. 6A-C).
(15) In detailed view, a large indicator would show red/yellow/green depending on the current state of the cone angles (e.g. see green circle in FIG. 6B indicating correct positioning of a cone within an acceptable margin of error).
(16) In summary view, display in text format the lock-down cone angles.
(17) Allow a user to hide the graphical representation.
(18) Provide lock down verification when overall status is green (FIGS. 6A-C).
(19) Perform lock down verification when user presses trigger.
(20) On lock down verification, test cone rotations (as a quality control).
(21) On passed (verified) lock down, record measured cone rotations, connect to designer database and store values.
(22) On failed lock down (fails verification), provide error information.
(23) Generate "audible cue" when lock down verification is successful.
(24) Include "supervisor mode" that will permit supervisor to modify (a) cone angle tolerance, (b) lock down verification tolerance, and (c) current cone location tolerance.

As can be appreciated, other or different features could be included and used.

Aiming system 10 according to the optical motion capture system in this embodiment can be applied to factory aiming of fitter 100 of FIG. 18 as follows.

The camera vision system 14 can be moved on its portable stand so each camera's field of view captures the area around the factory aiming station or jig 30 (see FIG. 2) in the factory. Station 30 includes a base leg 32 extending up from the floor and a forked receiver (see FIG. 2) with spaced apart arms 34 and 36 that can receive and support fitter 100 in a horizontal or laid down position (see FIG. 2). Arms 34 and 36 can have a geometry at their distal top ends to cradle hydrasize tube 102 of fitter 100. Adjustable stands 38 and 39 can support opposite ends of cross arm 110. Other structures to accomplish this support of fitter 100 in a horizontal position are, of course, possible.

Once fitter 100 is held by jig 30 in generally horizontal position (FIG. 2), vertical stays 38 and 39 can be moved over or used to support (and clamp) opposite ends of cross arm 110 to prevent movement. It holds fitter 100 in a secured position.

Reference plane device 16 (FIG. 3) is essentially a plurality of strobing LEDs (markers) mounted at the ends of an X-Y-Z array of arms at the top of arm 44 of a support frame or jig 40. Support frame 40 has a base 42 from which arm 44 extends. A power and control source 46 is on-board support frame 40 to power the markers. As can be seen in FIG. 3, the markers are at ends of each of the arms of the rigid body. This produces X, Y, and Z direction optical markers or targets which define the reference plane or planes (see planes defined by axes X, Y, Z in FIG. 3).

As shown in FIG. 7A, frame 40 is configured so that it can be moved over and placed on the top of backbone 102 of fitter 100 when in the horizontal positional of FIGS. 2. It has two pair of feet 48, one pair towards one end, the other pair towards the other end, (see FIG. 7A) that allow it to sit in a stable manner on the top of that curved surface. FIG. 7A only shows one foot 48 of each pair: the other foot 48 could be aligned with but on the opposite side, and the spacing between each pair of feet is pre-designed to essentially be less than the greatest outside diameter of fitter tube 102 so that frame 40 is essentially automatically centered along tube 102. Frame 40 also includes a pair of spaced apart arms 41 each with an angled top face 41 which mate against the lower edge of the cross arm (see FIG. 7A). The two arms 41 have the angled faces that come into abutment against the lower side or edge of the cross arm when frame 40 is slid along the top of tube 102 towards cross arm 112. The size, shape, and position of arms 41, particularly those sloped surfaces, are coordinated with the size, shape, and position of legs 48 on frame 40, so that legs 48 align frame 40 along the top of tube 102 and the sloped surfaces align the top of frame 40 with the general plane defined by cross-arm 112. Sloped surfaces 41 act as mechanical stops so that the worker places frame 40 on the top of tube 102 away from lowest cross arm 112 so that the two pairs of feet 48 support and align it along tube 102. The worker then just slides frame 40 towards cross arm 112 until the sloped surfaces of arms 41 first pass under the cross arm 112 and then stop further sliding of frame 40 in that direction. Frame 40 is then generally aligned along the long axis of tube 102 and the long axis of cross arm 112. The reference plane device 16 does not need to be level to function correctly; it just needs a common reference plane. This references the mount in the correct plane with the cross arm. Alternatively, or optionally, a leveling apparatus (e.g. audible or electronic level) can be used to ensure that the base 42 is level so that the active markers are directly aligned in an appropriate manner to a vertical plane through the longitudinal axis of backbone 102 of fitter 100.

FIG. 4 shows in enlarged detail an aiming sensor device 18 that can be mounted to one cone 120 at a time. Releasable mount 50 has a circular base 52 that fits into the open end of a cone 120 and can be secured in place. Wire(s) 56 can connect power circuit 58 to electrical power. Spring-loaded or otherwise adjustable handles 51 can expand members outward or otherwise translate structure to hold fixture 150 in place regardless or orientation of cone 120 (whether cone 120 is hanging straight down or extending horizontally or at any angle). The base 52 mates with a recessed surface of cone 120 that receives the reflector shell for the fixture (e.g. bowl-shaped reflector shell 153 of FIG. 15). An arm 54 extends outwardly from mount 50 and holds a similar X'-Y'-Z' array of strobing LEDs, markers (see the X-shaped arms for the X'-Y' plane and the orthogonal arm for the X'Z' plane) to those of frame 40. Aiming sensor device 18 can be used to define the aiming direction of the cone 120, when aiming sensor device 18 is correctly installed on cone 120 by defining the plane of the distal opening to cone 120 and then mathematically defining the aiming direction of the cone (and thus the aiming orientation for the fixture when assembled later). These aiming axes or directions are illustrated diagrammatically by the broken lines emanating from the middle of each cone 120 in FIG. 18. That aiming direction or axis is the same as the aiming direction or axis for the entire fixture 150 when mounted with its cone 120 at the installation site (see FIG. 15). Therefore, by defining the aiming axis of cone 120 with marker 18, the aiming axis of the associated fixture 150 to the pre-designed aiming point on the athletic field for that fixture is also defined. As illustrated in FIG. 4, handles 51 could lock jig 50 over the front opening of a cone 120 as follows. The peripheral edge of the cone opening has a shouldered lip (see e.g., FIG. 7A). The upper ends of handles 51 are T-shaped so a worker can easily rotate them around the axis of the shaft 53 that extends through an opening in the opposite ears of jig 50. Shafts 53 can not only be rotated around their long axis relative to jig 50, but also move a range of distance along that long axis. A spring or biasing means can resist that axial movement and constantly urge the eccentric ends towards the ears of jig 50. The lower opposite ends 55 are eccentric about the axis of the shaft of handle 51. When rotated to a first position, the eccentric ends 55 pass by the shouldered lip of cone 120 when plate 52 is inserted into and across the opening into cone 120. But when handles 51 are then rotated to a second position, the distance between facing edges of eccentric ends 55 is less than the outer diameter of the shouldered lip to lock jig 50 in place and prevent it from moving out of a seat inside the opening to cone 120.

As illustrated in FIGS. 7A and B, system 10 therefore has markers or targets that represent an X, Y, Z coordinate system aligned with the vertical reference plane of fitter 100, and an X', Y', Z' coordinate system aligned with the aiming or central axis of a cone 120. The camera vision system 14 captures overlapping images of the reference plane device 16 and aiming sensor device 18 and the software evaluates those markers in 3D camera space to determine 3D angular position of the aiming axis of cone 120 relative a reference(s) relative to, e.g. the fitter 100 or some other reference related to the fitter or its parts. This angular position can be determined very quickly (almost in real time) with high speed cameras and processors, and can be displayed in a manner that a worker can view a display 20 which informs the worker of present angular position of cone 120. The display 20 can also indicate the desired angular orientation for the lighting design for that particular cone 120 and inform the worker how far off the cone 120 presently is, and in what direction, from desired orientation. This allows the worker to quickly and automatically be informed of how to bring that particular cone 120 to correct orientation.

The designer/assembler database would have relevant information of this type correlated to the job assembly ID number that would be communicated to the system.

The factory worker would start aiming system 10 and input operator or worker identification number (ID) and the lighting system job that is to be factory pre-aimed (Job Assembly number or ID) (see FIG. 5A). Information could be displayed to the worker on display 20.

The desired aiming angles for each cone 120 for a given fitter 100 would be accessed by the system by scanning a barcode 101 on a document attached to or correlated to the fitter 100 (FIG. 5B). The document could have relevant information about the whole lighting job and, specifically, the aiming angles for each cone of each pole of the job. The bar code could cause that information to be sent to the software of the position sensing system 10 or computer 22.

Once the barcode is scanned, display 20 shows a Job Number and what the job should actually look like (e.g. gives a graphical representation of the number of cones per cross arm, and a cone number for each cone) (FIG. 5C).

As indicated at FIGS. 5A and C, the software of aiming system 10 would call up a display screen requiring a user identification and an assembly identification that are correlated to a specific fitter 100 with pre-programmed aiming directions for multiple cones 120. Display 20 can inform the worker that none of the five cones have been aimed by displaying the graphic representations of each and showing them gray in color or otherwise visually notifying the worker of that status.

Fitter 100 would be taken to aiming station 30, placed in horizontal position (see FIG. 2). Fitter 100 is positioned on stand 32 and active markers 19 and 17 are hooked to system 10 (e.g. by wires 56 and 57).

Reference plane device 16 would be placed on backbone 102 of fitter 100 (FIG. 7A).

Aiming sensor device 18 would be operatively mounted on a first cone 120 of the array of cones 120 on fitter 100 (FIG. 7B).

Camera vision system 14 would be turned on, as would the strobing active markers 17 and 19 mounted on reference plane device 16 and aiming sensor device 18 respectively. The round circle to the right of the word “Reference plane device” in FIG. 5C would turn green to confirm to the operator that the cameras of the aiming system 10 have good line-of-sight of reference plane device 16. The software would similarly indicate that aiming sensor device 18 is also in direct line-of-sight for the cameras. Thus, the worker is given explicit confirmation that the cameras “see” both the markers of reference plane device 16 and of aiming sensor device 18. The cameras are portable and can be moved as necessary to view the markers. On larger assemblies, the fitter 100 may need to be aimed in sections with the camera moved after completion of each group.

Once the aiming sensor device 18 and reference plane device 16 are in good sight of the cameras, the display 20 automatically displays the information the operator needs to aim the cone 120. An aiming assistance display could appear on display 20 (see FIG. 6A). Display 20 also shows the current status of the aiming sensor device 18 relative to reference plane device 16 (see FIG. 6A). In FIG. 6A, this is indicated by a white target circle 90 (with center-of-target cross-hairs in middle) and a red circle 92. White circle 92 represents the desired aimed position from the program for that cone. Red circle 92 represents the current position of that cone relative the desired aimed position as measured by system 10. This provides one way for the worker to visualize how close or far the cone 120 is from the correct aimed orientation. In FIG. 6A, for example, display 20 can also show that for this job assembly or ID, cone #29 needs to be aimed 1.30 degree Left relative to the Horizontal reference plane and 44.39 degrees down relative the vertical reference plane. The numbers below the desired angles show the current status of the aiming sensor device 18 and are highlighted in red to show the operator that their current aiming angles are out of the desired range.

The operator/worker would have previously released or loosened the cone 120 so that it can be manually angularly manipulated or adjusted, and would watch display 20 as a guide as to how to pan and tilt cone 120 into correct position.

Using the camera images, the software of aiming system 10 would calculate the angular offset of the aiming axis of that particular cone 120 relative to the pre-programmed desired aiming orientation (vertical/tilt and horizontal/pan) relative to the reference planes established by reference plane device 16. It is to be remembered this pre-programmed orientation is pursuant to a lighting design that has desired aiming angles for all cones 120 of fitter 100.

In the example of FIG. 6A, Job Number (indicated generically as XXXX-XXX) shows that the fixture ID designated as #29 (e.g. its corresponding cone 120) needs to be aimed 1.30 degree left for the Horizontal or pan direction, and 44.39 degrees down for the Vertical or tilt direction relative to reference planes established by reference plane device 16. The numbers below the desired angles show the current status of the aiming sensor device 18 relative those same reference planes and can be highlighted (e.g. in red) to show the operator that their current aiming angles are out of range. Specifically, in this example, fixture ID #29 (reference numeral 98) is measured by position sensor system 10 to be 0.04 degree to the right instead of the desired 1.30 degrees left (a total difference of 1.26 degrees), and 29.72 degrees below vertical instead of the desired 44.39 degrees (a total of 14.67 degrees) (FIG. 6A).

Thus, display 20 may provide one or several visually perceptible indicia of the status of cone 120 relative to its desired, pre-programmed orientation. In this example there are several. First, the actual numerical desired and measured horizontal and vertical angles are shown in the boxes in the upper right-hand corner (FIG. 6A). The specific fixture ID may be shown so the worker knows which fixture he or she is working with. Secondly, at the lower left-hand side (FIG. 6A), the lighter (white) circle 90 is centered within the black box but the darker (red) circle 92 is offset slightly to the right and substantially up vertically from being concentric with lighter circle 90. This is a visual representation that cone 120 is slightly too far right and substantially not vertically tilted down enough from correct position. Third, the round button 95 in the center of display 20 is red so long as there is an offset of measured from desired. It turns green when there is no offset within a close margin of error (e.g. on the order of 0.1 degree). Fourth, the set of two side-by-side vertical rectangles (labeled "H" and "V") at the lower right-hand corner of FIG. 6A are another visual indicator to help detect alignment. A black arrow or thin black bar 94 and 96 (FIG. 6B) moves vertically along each rectangle respectively, and indicate to high precision how close each of horizontal and vertical angles of cone 120 are to desired angles. The center of each rectangle is green, and represents a small range of acceptable angles. A thin yellow region exists on opposite sides of the center green region to indicate acceptable angles at a greater range than the green region. The top and bottom red regions indicate the measured angles are well outside acceptable. As noted in FIG. 6A, both the 0.04 degrees and 29.72 degrees measured orientations are considered too far from acceptable and the black arrows 94 and 96 are in the red zones.

As circle 92 is brought closer to being coaxial with circle 90, the operator is given gross or coarse visual confirmations that measured angle in both horizontal and vertical directions is closer. The operator can use one, some, or all of the visual indicators. In this example, bars 94 and 96 (see FIG. 6B), as well as the actual angle numbers could be used to confirm fine positioning of cone 120 within a very small acceptable range from desired angles. When than occurs, the black bars or arrows 94 and 96 would rise into the green center sections of the vertical rectangles underneath the indicia "Horizontal" and "Vertical" (or "H" or "V") as shown in FIGS. 6B). As it would be difficult to tell from several feet away exact alignment of circles 92 and 90, bars 94 and 96 help show very close alignment with the mid-point of the "H" and "V" bars indicated by the arrow heads on the display just to the right of them. In other words, circles 90 and 92 can be used for quick visual indication of being close to aligned. Bars 94 and 96 can be used to make sure there is very close alignment. View of the measured angle numerical values versus desired numerical values could be used, but the target 90 and "H" and "V" bars can sometimes be more effective. In most cases acceptable alignment would be within 0.25 degree or less. Still further, the worker can visually tell alignment is within an acceptable margin of error when the round button 95 above the "lock down" button turns from red to green.

As the operator approaches the correct aiming angles, the highlighted backgrounds of the current measured angle numerical values position switch from red to yellow to green. The bars below are another visual for the operators to use, showing their current position by way of the black marker lines 94 and 96. The yellow-green region is the tolerance set by the manufacturer, operator, or the software.

It can be appreciated that not all of these different visual indicators are required. However, the combination can promote higher accuracy by providing more visual indications of alignment within an acceptable margin of error. Display 20 can be in the proximity of fitter 100 and positioned conveniently for clear view and perception by the workers. The workers can glance up at the screen and even if they cannot see circles 90 and 92 precisely or even read the numeric numbers, the red and green indicators can provide the feedback of confirmation of alignment within acceptable margin of error.

The yellow-green region is the tolerance set by the manufacturer or the software. Once the operator lands both angles in the acceptable region, he/she tightens the relevant nuts on cone 120 and elbow 130 to fix those parts in place, and then uses what is called the "lock down" feature of system 10.

As can be appreciated, when correct alignment of a cone 120 is indicated on display 20, workers tighten the appropriate hardware relative cone 120 and mounting elbow 130 to the lock it into position. As indicated at FIG. 8, pan and tilt adjustability over a range of angles of cone 120 and mounting elbow 130 allow vertical and horizontal angular adjustment and then securement. Indexing, such as angular scales 142 and 143 on elbow 130, can indicate aiming angles, if desired. For example, once locked into position, a pen or permanent marker could be used to mark on cross arm 110 or 112 the correct angular rotational position of mounting plate 134 of elbow 130 relative to, e.g., the longitudinal axis of the cross arm or some other reference. A bolt in slot 139 allows lock-down of plate 134 over a range of rotational positions around the first axis. The same could be true for the angular adjustment of cone 120 relative to elbow 130 (e.g. around the second axis through mounting bolt 38). This would allow those components to be moved out of correct position and then back to the correct position. One example would be if cone 120 needs to be released to hang vertically down for maintenance purposes. The maintenance worker would have markings to show what angle to return the cone to after maintenance. Alternatively, it may be that the cones 120 are released from their pre-aimed position for transport. When prepared for erection of the poles at the installation site, the cones could be moved to correct pre-aimed position by using the markings and locked down, such as by tightening bolts. FIG. 8 shows another alternative. Instead of marking the correct angle with a pen, an adjustable metal tab or other piece 144 could be mounted on cone 120. A graduated angular scale 143 could be etched or marked on elbow 130. The marker 144 could be adjusted to mark the correct desired final aiming angle. To calibrate marker 144, the cone would be set at vertical angle "zero" by system 10 and the marker 144 positioned such that its witness mark (the visible line or other indicia along its center) is aligned with a "zero" witness mark on elbow 130. This would allow re-aiming with the angular scale on the elbow if needed. A similar arrangement could be used with scale 142 and mounting plate 134.

Once the relevant nuts are tightened, the operator verifies the angles are still in the acceptable region and then uses the lock down function. The display 20 shows the final angles "H" and "V" the cone 120 was set at and allows the operator to accept these angles (see "Accept" button in FIG. 6C) or not (e.g. select "Re-aim" button to start over for the cone). This function ensures that all angles are aimed within the correct tolerance upon final assembly. Note in FIG. 6C that the acceptable range is approximately a few tenths of a degree. The final values can be stored in a database for future reference and quality assurance.

Note also that if either angle is not within tolerance, display 20 will show the final status of the cone 120 and the system will not allow the operator to accept until the angles are aimed correctly (i.e. within tolerance). Display 20 can use red colors to give a visual prompt to the operator that aiming is not correct. The operator will then hit "Re-Aim", and correctly aim the cone 120 to its acceptable tolerance.

If the operator does try to accept angles out of tolerance, the above visual prompt or a similar message will appear. An available feature of this example is a password that can be available to allow deviation from the indicated aiming angles if there is a situation where a cone 120 needs to be aimed differently from what the production initially called for, but this password is only given to authorized persons who can approve a different angle(s).

When the cone 120 is correctly locked down, one of the initial job screens can be viewed or automatically displays and shows the status of that cone (FIG. 5C). If it is correct, the cone icon turns green or yellow. If it has not been aimed, it remains gray. If something is not correct it will be red. An indicia on the display could also show the current position of each aiming sensor device 18 in space.

As can be appreciated, the aiming system 10 can be used for each of the cones 120 of a fitter 100. Display 20 would show the appropriate cone or fixture (device) number and its pre-determined aiming orientation (vertical and horizontal angles). The software/display could instruct the worker to start with a particular cone and advance through the cones in a certain sequence. The worker would simply move aiming sensor device 18 from one cone 120 to the next cone 120, and aim and lock down each cone according to each cone's pre-determined angles that are displayed on display 20. This is efficient and non-cumbersome. The worker only has to angularly orient the cone and tighten a couple bolts for each cone 120 and elbow 130. This avoids having to manipulate cone 120 and elbow 130 with the entire fixture (reflector 150, visor 152, and lamp 154) in place (as in FIG. 15). It also allows this pre-aiming to be done with simply the fitter 100 and cones 120, and not with the long pole 200 (FIG. 19A) attached.

Once all cones 120 for the fitter 100 are aimed, display 20 shows the status of all cones 120. If all cone icons are green, the operator hits a "Complete" button (could be in display of FIG. 5C). Alternatively, the system could automatically recognize aiming is complete.

When the "Complete" button or state is activated, display 20 shows the final status and data for all cones 120 (FIG. 5C). If everything is within the acceptable tolerance, the operator will select an "Accept" button to complete the job and transfer all data into a database. If something is not correct, the system 10 will not allow the operator to scan a new job until all angles are correct. By "select" it is meant the operator can interact with the system. Examples include but are not limited to, point and click with a computer mouse, keyboard entry, or touch screen.

When each cone 120 has been aimed with aiming system 10, reference plane device 16 and aiming sensor device 18 are removed and fitter 100 can then be removed from aiming station 30 and moved to a next station where any remaining processes, if any, required on the fitter assembly can be completed.

In this example, as is conventional for multiple pole, multiple light fixture sports lighting, each fixture on each pole 200 has a specific pre-calculated or designed aiming angle to the target area or sports field for a similarly pre-calculated or designed pole height and position, and pre-selected light source and optic system. Essentially a projection of the central or aiming axis of a fixture 150 to a point on the field, in FIG. 17, the aiming locations or points of fixtures numbered 1 through 5 for one pole are diagrammatically illustrated from pole 200. Similar aiming plans would exist for all other poles and fixtures (not shown). As mentioned, if the fixtures were not pre-aimed, the installer would have to somehow figure out where each aiming point on the football field 202 is and then figure out how to adjust pan and tilt each fixture so that its aiming axis accurately intersects with each point on field 202. The same would be true for each of the other poles 200.

However, utilizing system 10 allows each cone 120 to be pre-aimed relative to a reference plane along the longitudinal axis of backbone 102 of fitter 100 by methods previously described. Thus, when pre-aimed fitter 100 with final assembled fixtures is shipped to the installation location, the fixtures are already pre-aimed because the cones 120 and mounting plates 134 are pre-aimed and locked down to those positions relative to each other and their cross-arm. All that is required is that each pre-aimed fitter 100 (FIG. 18) be slip fit onto the tapered top 214 of its corresponding pole 200 as the poles 200 are laid out on the ground and final fixture assemblies 150 (and other structure such as ballast box 218) be attached or assembled in place. Base 210 has already been plumbed and concrete backfill cured in the ground 204 at the correct pole location. U.S. Pat. No. 6,340,790, incorporated by reference herein, describes this process. A crane 220 or other elevating method moves the assembled pole generally vertical so that its lower end 216 lowered onto tapered top end 212 of base 210 (FIGS. 19A and B). The only adjustment needed to accurately align each fixture to its corresponding designed aiming point on the target area or field is the correct rotation of the pole 200 on base 210 by aligning the alignment beam 318 to a reference (e.g. a landmark). This is very efficient and economical of labor and equipment resources. The alignment beam 318 in this example is a fanned laser generated by alignment laser assembly 300, which has been previously mounted (see FIG. 18) on fitter 100 to a referenced position relative to the rotational axis (e.g. X axis) of pole tube 102.

In this example, once preliminarily seated on base 210, the pole 200 is rotated to swing the plane of the alignment beam across the landmark on the field (e.g. home plate). When the alignment beam aligns with the landmark, such as home plate, installation aiming is done. There are no measurements to find aiming points on the field.

2. Alternate Position Sensor Systems

FIG. 9 illustrates an alternate system for aiming devices. This system can be useful in a factory setting using a displayed grid pattern 400 representative of the ultimate target area for the devices with an aiming target point 402 for each device identified on the grid 400. The displayed grid 400 may be a dynamic grid projected onto a screen 404 using a video projection system 406 and computer system 420. Its theory is somewhat similar to the method previously described with aiming system 10. Major differences are as follows. A collimated light beam 410 with a dot or crosshair pattern from a laser or light source is mounted to a jig, and the jig, in turn, is mounted across the open face of a cone 120 (in the case of the devices being lighting fixtures of the type of fixtures 150) and calibrated to be co-linear with the aiming or central axis of the aimed device (here cone 120). The device would be roughly aimed at the displayed grid to the aiming target point shown by manually manipulating cone 120. When the dot or crosshairs of beam 410 is aligned or aimed at the appropriate corresponding target point on the grid, then the aimed device is correctly positioned. The aiming coordinate information for the target point of the aimed device would be identified by the designer, similar to aiming system 10. The computer system 420 instructs the video projection system 406 to display the grid with the target point(s) in the desired position based on a known relationship between each aimed device and the displayed grid. In other words, this system would need pre-calculation of relationships between the positions of cones 120, projector 406, and screen 404. The displayed grid 400 may have one aiming point for each device (here aiming point #1 for cone 120-1, point #2 for cone 120-2, and point #3 for cone 120-3) or multiple positions relative to the aimed devices to allow for a wide range of aiming orientations. The grid 400 could be projected onto a solid wall, floor, ceiling or screen on a wall or on stand. It may even be desirable to have the display screen on a curved screen that wraps around the array of aimed devices. A modified aiming station similar to aiming station 30 could be used to establish a universal reference plane(s) for the aimed devices. Many variations are possible and considered included in the scope of this embodiment. As can be appreciated, computer 420 can have software which:

(a) actuates the collimated beam 410 on the jig,
(b) actuates the projector 406, and
(c) provides the projector with the grid and aiming point(s) pre-designed for the given device(s) (e.g. it could provide the bit map or data to the digital projector 406 to generate different grids 400 and/or points 402).

The worker(s) simply correctly mount the jig with laser on a device and then manipulate the device with its collimated beam to the correct aiming orientation relative the correct point 402 on the projected grid. The device can be locked or marked to the correct aiming orientation as with system 10. Optionally, the operator can enter into the computer that the device has been aimed, move the jig to the next device, and repeat until all devices are aimed. Alternatively, a jig with collimated source can be concurrently mounted to each device.

Therefore, as indicated at FIG. 9 and the above description, this alternative aiming system can allow factory aiming of devices to reasonable if not comparable accuracy to that of system 10. The system can be made as elementary or sophisticated as desired. For example, a single jig with single alignment beams source could be placed on a cone 120, one at a time, and does not have to be under computer control. The projector 106 could simply project an image of a grid with the appropriate aiming points for each cone 120 on the grid, again not necessarily under computer control. The worker then simply manipulates a cone 120 with the collimated alignment beam 410 to the appropriate aiming point on the projected grid.

On the other hand, a computerized or other controller-based system 420 could be operatively in electronic communication with one or more jigs and projector 406. In one aspect, a database of aiming angles for each cone 120-1, -2, and -3 relative to a reference plane for fitter 100 can be accessible by computer 420 or stored on it. Software could be programmed to access the database and create a grid image and automatically place the aiming points for each fixture or cone for that particular fitter 100 on the grid image. The computer 420 could instruct that constructed grid image and aiming points to be projected and could instruct a collimated beam 410-1, -2, and/or -3 to be turned on. Worker or workers could then individually or simultaneously adjust cones 120-1, -2, and/or -3 to the respective projecting aiming point(s) and lock it/them in place.

A next fitter 100 with multiple cones 120 could then be placed in its reference position relative to screen 404. The database could be accessed by computer 420 to generate a new grid and aiming points 400 for the new fitter 100. The process could be repeated.

This system is similar to system 10 in that it bases aiming off of a reference plane correlated to fitter 100 or fitter 102. The fitter must also have a known position and orientation relative to the projected grid and aiming points 400. The system of FIG. 9, however, does not require any position sensor system to measure the angular orientation of the cones 120. It simply uses the assumption that the collimated beam 410 from the jig placed on each cone 120 is the center axis or aiming axis for the cone 120. That beam 410 therefore projects that axis to the grid. The worker merely needs to visually align beam 410 with its correct aiming point on the grid. There is aiming consistency for all the cones 120.

One possible limitation of the system of FIG. 9 is for arrays of cones 120 having aiming directions that vary widely at opposite extremes. For example, some arrays have cones 120 that aim almost in the direction of the long axis of cross arm 110 in opposite directions. It is rarely possible for a factory setting to accommodate a screen or even project a grid of that size as a practical matter. The system 10, described previously, therefore has versatility to accommodate that situation because it can handle any reasonable range of aiming orientations that can be captured in the field of view in the cameras.

In the example of FIG. 9, a typical distance between fitter 100 and cones 120 and the screen or grid might be on the order of 10-20 feet. However, different distances and sizes are possible.

An option according to this embodiment could be a static grid that is permanently on a screen 400 or wall. That grid could have essentially rows and columns of cells that could be of equal area. Instead of imaging aiming points on the grid, the system might simply inform the worker that for cone 120-1, for example, collimated beam 410-1 should point to cell J-7 where columns are identified as A-Z and rows as 1-20 for the grid.

By referring to FIG. 9, it can be appreciated that the projected image is essentially an optical grid plus aiming points. The aiming points are associated with the devices to be aimed. The imaged aiming points that are projected could include other information. In FIG. 9, for example, the graphic "1" is placed next to a dot related to the aiming point for cone 120-1, the graphic "2" next to the dot on grid 400 for cone 120-2, etc.

As can be appreciated, it would usually not matter how close or far from screen 404 projector 406 is or devices 120 because grid 400 would retain the proportionality of the grid cells and the aiming points in relation to those grid cells and the grid as a whole. In other words, dots 1, 2, and 3 would remain in the same relative positions to their grid cells and each other whether the projection of grid 400 was closer to projector 406 and cones 120 or farther away than shown in FIG. 9. However, of course, there are practical limitations to the system of FIG. 9. The closer grid 400 is to projector 406 or cones 120, the smaller its size and perhaps the harder to achieve accuracy. The farther away grid 400 is might have practical limits regarding size of screens or walls or ceilings that could accommodate such a projection and/or the resolution of visibility of the grid and the aiming points.

It is desirable to have a fairly precisely known relationship between the reference plane of devices mounted on tube 102 and the plane of grid 400. Projection from projection 406 would most beneficially be from substantially the same general direction as devices 120 relative to grid 400 so that there is less potential distortion of the projected grid 400. For example, if projector 406 was severely to one side or the other of the general direction of devices 120, it could result in an elongation in one direction of the grid and its cells.

For cones 120 of the type discussed regarding the first embodiment fixtures 150, fitter tube 102 with its cones 120 should be at least several feet away from projected grid 400. One example is 10-20 feet away and grid 400 being 10-20 feet tall. Variations, of course, are possible.

One jig and collimated laser to generate a beam 410 could be used, one at a time sequentially for each cone 120. The jig can be attached to each cone 120 by a similar mounting lock in mechanism as previously described. Alternatives are possible. An alternative would be to build in a collimated laser for each cone 120 with its beam 410 in a known relationship to the central aiming axis of cone 120.

If fixture cones 120-1, -2 and -3 are typical sports lighting aiming angles, those angles would typically be between 15° and 45° down from a plane orthogonal to fitter tube 102 and generally through cross arm 110. For the substantially steeper angles, this would mean that grid 400 would extend substantially below cones 120 if fitter tube 102 is vertical. Therefore, optionally, fitter tube 102 could be tilted backwards so that a predominant number of beam directions 410 are horizontal or closer to horizontal. Another possibility would be to lay fitter tube 102 horizontal and project the grid 400 on a ceiling.

FIG. 10 illustrates another alternate system for aiming devices using an adjustable light source assembly that produces a collimated alignment beam 410 mounted to a jig and calibrated with the aiming axis of its device. A target 412 for the collimated alignment beam is placed at a known position from the aiming station (where the device(s) are located during aiming), which also places the target 412 at a known position from each device to be aimed (here three cones 120). A modified aiming station similar to aiming station 30 could be used to establish a universal reference plane for the aimed device(s). The aiming jig each with the adjustable collimated alignment beam 410 may be in communication with a computer system 420, such as the computer system of aiming system 10, or similar to such system. The collimated alignment beam 410 of each beam source could be controlled by stepper motors or other similar computer numerical controller systems to control the orientation of the projected alignment beam. Using the known position of the target 412, the desired aiming orientation of the aimed device(s) (here cones 120), and the position of the aimed device(s) 120 in relationship to the universal reference plane established by the aiming station, the orientation of the alignment beam(s) 410 can be configured by instructions from the computer system to the stepper motors or other control. The alignment beam 410 axis is oriented to be offset from the aiming axis 411 of the aimed device 120 such that when the alignment beam 410 intersects the target 412, the aiming axis 411 of the aimed device 120 is oriented as desired. Many variations are possible and considered included in the scope of this embodiment.

FIG. 10 therefore presents a somewhat similar alternative to FIG. 9. It allows devices like cones 120 to be quickly and accurately manipulated to predesigned aiming angles relative to the same references. In this case, instead of aligning a collimated beam 410 with the central aiming axis of its cone 120 and then aligning that beam 410 for each fixture with a unique aiming point on some grid, a single or essentially single aiming target is used for all cones 120.

In the example shown in FIG. 10, the center of target 412 would be a single aiming point. This target 412 could be much smaller than, for example, the projected grid 400 of FIG. 9. It takes advantage of a couple of known relationships. The position of each cone 120-1, -2, and -3 would be known relative to each other. A reference plane or planes can be known or assigned regarding fitter tube 102 and its associated structure. Target 412 can be positioned in a very precisely known relationship to each cone 120. For example, it could be positioned on an adjacent wall or stand just perhaps 10-20 feet away or even nearer the cones 120.

As with the other embodiments, a computer program (or other means or methods) is informed of the desired aiming angles of each cone 120 relative to its reference plane or planes related to fitter 102 or associated structure. With these known geometrical relationships, software or by other means can calculate a vector from the position of each cone 120 to the center of target 412 in relationship to a vector representing the central aiming axis for each cone 120 if aimed to its predesigned aiming orientation relative the reference plane or planes. As indicated above, by utilization of some accurately controllable articulatable apparatus, a collimated beam source could be mounted to that apparatus, which in turn could be mounted to a jig that can be removably mounted across the face of each cone 120. A computer or other controller, once being informed of the known relationships and the intended predesigned aiming orientation of a cone 120, could move the beam source so that its beam 410 aligns with the center of target 412. The central axis of cone 120 would then be correctly aimed to its predesigned aiming orientation. This would be repeated for each cone 120. The beam 410 would have a different angle to target 412 for each cone 120.

Utilizing commercially available numerically controlled articulators or stepper motors, quite high accuracy (on the level of accuracy to be within a few degrees or even a fraction of a degree like the prior embodiments) are possible, assuming the correct mounting of the beam source to each cone 120 and accurate knowledge of the previously described geometric relationships.

Examples of some of these types of servos or numerically articulatable members are commercially available from a variety of sources. One example is Baldor Electric Co., Fort Smith, Ark. (USA) (www.baldor.com). A PC computer application allows programming of the motion control which is sent through an interface to the motion controller. For example, an elongated laser pointer can be held at one end in a mechanical coupling capable of tilting the elongated laser in any direction away from and at an acute angle with a reference axis. Servo, stepper, or analogous accurately controllable motor(s) or actuator(s) are operably connected to the mechanical coupling and a two-axis motion control or similar apparatus to instruct the direction and degree of tilt. The motion controller can be in communication with a PC or database to obtain the offset (direction and degree of tilt) from the central axis of the cone 120 or device that is calculated for the laser to align with an offset target when the cone 120 or device central axis in correct orientation. They can be instructed from a computer or some other digital system. The computer or digital system can access the known geometrical relationships and predesigned aiming axis for each of the cones 120 from a database or otherwise for each set of cones 120.

The embodiment of FIG. 10 does utilize moving parts and includes some additional complexity and variables. It may not be as versatile as some other embodiments. However, it does not require a complex vision system or big screen or projection area.

One option would be to utilize more than one target 412. Each of the plural targets could have a known relationship with the other components and by straight forward calculations, similar aiming could be accomplished. For example, there might be a number of static or permanent aiming points around the work area. Depending on the aiming of each of the devices, different aiming targets or points 412 could be used for different devices.

As illustrated, the system of FIG. 10 can aim the devices 120 in a relatively small area or space. By using the single target 412, the accurate aiming of plurality of devices 120 is possible. FIG. 10 illustrates the central aiming axes 411-1, -2, and -3 for each cone 120 as well as diagrammatically depicts how each of those axes go to unique directions when projected to a surface. FIG. 10 also diagrammatically depicts how that could result in differently placed general beams 414-1, -2, and -3 to a target 413 once the additional parts of lighting fixtures 150 would be assembled to cones 120 (i.e., lamps, reflectors, etc.).

FIG. 11 illustrates still another alternate system using virtual reality environment 430 to aid the worker 450 in correct orientation of the aimed device(s). Motion or position sensors are used with computer graphics to simulate the environment 430 that the aimed devices are used in. The aimed devices would be placed in an aiming station and the reference plane established. Each device would be aimed to the correct orientation using feedback from the virtual reality environment.

A position sensor system like that of system 10 could be used to measure the angular position of each cone 120. This could be done with utilization of active markers 17 and 19, one on fitter tube 120 to establish a reference plane and one on the open end of each cone 120 to establish the plane of that open face and thus the central aiming axis 410 for each such fixture cone 120. Using that position sensor system, computer 420 could be continuously informed of the angle of central aiming axis 410 of a cone 120 relative to reference plane.

Using commercially available virtual reality systems and methods, a virtual reality venue could be computer-generated that could be displayed to a worker 450 via a headset 451. By known virtual reality methods, the virtual reality venue could be, as illustrated in FIG. 11, a sports field 452. The generated field 452 could include aiming points 402 for each cone 120. Single worker 450 could aim cones 120 himself or herself as follows.

The position sensor system camera 14 (like system 10) informs computer 420 of the angle of central axis 410 of cone 420. Computer 420 would translate that into some indication in virtual reality space relative to field 452. One example would be a dot or other graphic representing the virtual intersection of central axis 410 of cone 420 with the virtual field 452. The worker then simply manipulates the aiming direction of cone 120 until the spot representing its central axis relative to field 452 aligns with the displayed aiming point 402 on field 452. The worker would then lock cone 120 in place. The worker would then move to the next cone 120 and repeat for the other virtual aiming points 402 on virtual field 452. The worker would continue for all of the cones.

By known virtual reality methods, the worker would perceive field 452 as being much larger in size than the headset 451. Effectively, it would be a projection 430 in virtual reality. An advantage is that the worker can move around, turn his or her body or head, and continue to view the same virtual field 452 with the virtual aiming points 402-1, -2, and -3. In other words, the worker could actually turn towards each cone 120 and manipulate it while viewing the virtual field 452 and how the virtual intersection of the aiming of cone 120 coincides (or does not) with its associated aiming point on virtual field 452. Manual adjustment of a cone 120 by the worker results in a directly proportional movement of the graphic dot on the virtual field so the worker knows if he/she is adjusting the cone 120 closer or further relative the correct aiming direction.

An example of a virtual reality system that could be configured for the embodiment of FIG. 11 is commercially available from Fifth Dimension Technologies, Irvine, Calif. (USA). See www.5dt.com. See, also, www.Vrealities.com, a distributor of virtual reality products including head-mounted displays, motion trackers, etc.

E. Pole Rotation Tool Component

FIGS. 19B-D, 20, 21, and to 22 illustrate tool 230 that is useful to manually rotate pole 200 before it is seated on base 210. It solves a variety of issues. It provides a worker precise control of rotation of the pole 200 on base 210. It provides good lateral control of the tool, yet provides flexibility of vertical position of the handle.

Prior attempts to manually rotate pole 200 on base 120 include inserting a steel bar or long 2×4 lumber into a hand hole or jacking ear along the side of pole 200 and moving the bar laterally. However, this is cumbersome and is not precise. For example, if the worker overshoots the correct position, he/she may have to withdraw the metal bar, walk around to the other side of the pole, insert the bar into the opposite side of the pole and try to rotate the pole accurately in the reverse direction. Tool 230 allows the worker to rotate the pole in either direction without changing the connection of the tool to the pole or moving very much in position.

FIG. 19A shows how preassembled pole and fitter 100/200, with factory pre-aimed fixtures 150, is brought to previously installed and plumbed base 210. A crane 220 is illustrated. Other machines are possible. It can dangle the assembly over base 210 or could grip pole 200 along its length and move it into place.

FIG. 19B illustrates partial seating of lower tapered end 216 of pole 200 on the tapered upper end 212 (FIG. 19A) of base 210. Strap 244 of tool head 234 (FIG. 19C) has been previously cinched around lower end 216 of pole 200 (FIG. 19C).

Handle 232 can be installed onto head 234. When installed, handle 232 extends away from pole 200, but is pivotable in generally a vertical plane so that a worker 360 can move handle 232 up or down for the worker's preferred or desired orientation relative to tool head 234. Because head 234 is securely cinched on pole 200, horizontal movement of handle 232 by worker 360 is generally sufficient to manually rotate the yet-to-be-seated pole 200 in either direction around the vertical axis of pole 200.

As shown in FIGS. 20 and 21, head 234 has strap 244 affixed to one side of a V-shaped member 242 (it could have a rubberized or high friction inner surface). Free end 245 of strap 244 can be inserted in a ratchet strap tightener 246 such as are well known and commercially available. This allows the free end 245 of strap 244 to be released from ratchet 246 and moved around the outside of pole 200, then inserted into ratchet member 246. Ratchet member 246 is then moved back and forth to cinch strap 244 around pole 200 to prevent head 234 from sliding on pole 200. Alternately, the opposite end 247 of strap 244 may have a hook that engages with a pin on head 234. Ratchet member 246 would cinch strap 244 as previously described herein.

FIGS. 20 and 21 also show handle 232 is removable from head 234. Head 234 includes a receiver 250 that is hollow and receives member 258, which is pivotally attached to portion 256 of handle 232. As indicated in FIG. 21, member 258 is connected to part 257 of handle 232 and pivots in only one direction—that is, around a pivot axis defined by bolt 261 (and nut 267 and washer 265) that attaches piece 257 to piece 256. Pin 266, extending laterally from the side of piece 258, is insertable into L-shaped entrance slot 254 of piece 250 and then down past linear slot portion 252. This allows handle 232 to be removable from head 234. However, when handle 232 is connected, it can only pivot up and down generally in a vertical plane (see FIG. 22). It does not pivot in a horizontal direction when strap 244 is attached to a vertical pole. Horizontal movement would provide rotational force to head 234. This relationship is essentially a locking socket.

Head 234, receiver 250, and member 258 can be made of metal or other quite strong material to take the forces needed to rotate pole 200 on base 120. To advance pin 266 down linear slot 252, handle 232 must be orthogonal to the socket (FIG. 22, horizontal position). This provides the greatest leverage as the pivot connection between parts 258 and 257 is fully supported by the inside walls of socket 250. Handle 232 can also be metal, but could be of other material such as plastic or wood of sufficient strength and rigidity for its purpose.

Once rotated to correct position, the pole 200 is then securely seated on base 210 in a plumb position. Alternately, the pole 200 or other structure could be securely seated and attached on an anchor bolt-type foundation or other supporting means.

F. Pole Rotational Alignment Unit Component

1. Alignment Beam

FIGS. 12-14 show details of alignment beam assembly 300. A relatively inexpensive line alignment beam source 310 has a lens that is optically configured to issue a fan-shape (e.g. 60 degree diverging) beam 318 through window 350 and lens 352 in housing 306 (which includes removable side 354). An example of such an alignment beam is relatively small, low-power, and inexpensive commercially available apparatus in the nature of laser pointers or line lasers (e.g., similar to those used in laser levels) specifically configured to have an optical lens at their output which diverges, fans, or spreads the alignment beam issuing from it in a plane. An example would be a Model PLKD LDBXQ03B industrial grade line laser module with 60° fan angle in one plane from Yueqing Dengke Electron Ltd., Xiaxue Industry Area, Shifan Town, Yueqing, Zhejiang CHINA (and purchasable from http:\\denlaser.com) (635 or 650 nm wavelength).

As shown in FIG. 18, a horizontally outwardly extending metal ear or arm 302 along pole fitter 100 provides a mounting surface for mounting plate 304 of alignment beam assembly 300. Housing 306 encloses the alignment beam source and its alignment equipment. Housing 306 is connected to mounting plate 304 by arm 308.

Referring to FIGS. 13 and 14, alignment beam source 310 is connected by wires 314 to plug 316. Wire and plug 314 and 316 would extend through arm 308 and through the opening in mounting plate 304 into the interior of housing 306. Plug 316 could be plugged into the wiring in fitter 100 to provide electrical energy from an electrical power source to alignment beam source 310. A switch could be configured down in an enclosure or ballast box 218 (FIG. 19A) or down near the bottom of pole 200 to switch alignment beam source 310 on. Alternatively, alignment beam source 310 could be locally battery powered and only be used during initial installation. This may be acceptable if use of the alignment beam 318 is not needed thereafter. Still further, alignment beam source 310 could use battery power with a remote sensor control, such as an IR sensor, to turn it on and off. However, permanently powering the alignment beam would allow it to be utilized if alignment is ever needed to be checked or if some re-aiming of the fixtures by rotating the pole is needed. Still further, it might be that maintenance of the lighting fixtures would be accomplished by lifting pole 200 off of base 210 and laying it down horizontally and then reinstalling it on base 210. Alignment beam assembly 300 could then be used again for correct rotational alignment.

Using the aiming method previously described in the aiming system 10 or alternate aiming system, the alignment beam 318 issues in a plane oriented from a reference plane used to aim each of the cones 120. For example, beam 318 issues in plane X"Z" diagrammatically illustrated in FIG. 13. Plane X"Z" can be aligned with or parallel or otherwise in a known geometric relationship to plane XZ used as the reference plane for aiming cones 120 or other devices. The aiming process for the alignment beam 318 is similar to the fixtures 150 and uses the same basic equipment and jigs. This ensures the alignment beam is aimed with the same accuracy as the fixtures 150 with cones 120 and mounting plates 134 and uses the same reference plane for orientation. For example, the alignment beam sensor device with set of markers 19 could use the three recessed surfaces 309 on the outer alignment beam housing 306 (see FIG. 12) as the reference plane for the alignment beam. The alignment beam source 310 inside the housing 306 is calibrated to be parallel to this reference plane defined by features on the outer side of housing 306.

FIGS. 13 and 14 show a mounting structure for alignment beam source 310 that allows fine vertical and horizontal adjustment to allow for the alignment beam 318 to be parallel to the plane created by the three recessed areas 309 on the outer surface of housing 306. By aligning the alignment beam source 310 with the housing reference plane, the aiming of the alignment beam 318 can be controlled off that housing plane.

First, alignment beam source 310, with generally cylindrical body, can be essentially clamped in bracket 320 (FIG. 14). This allows alignment beam source 310 to be adjusted rotationally. Alignment beam source 310 has an optic package 312 that generates its beam 318 which diverges in a single plane. Rotational adjustment can adjust the issuance of that beam plane relative to its mount in housing 306. Secondly, bracket 322 pins bracket 320, with alignment beam source 310, against mounting plate 336. Rivets 324 substantially pin brackets 320 and 322 in place. However, a threaded bolt, spring, and nut combination 326 extends between bracket 320 and plate 336 in a manner that allows fine rotational adjustment of alignment beam source 310 by rotating bracket 320 around the longitudinal axis defined by alignment beam source 310 and bracket 322 holding 310 against 336.

Secondly, plate 336 is pivotal relative to plate 330 by attachment of the corresponding ears 338 and 334 by rivets 340. Plate 330 is mounted to housing 306 by rivets or fasteners 332. Threaded fastener/spring/nut combination 342 is positioned as indicated in FIG. 14 to allow fine adjustment of horizontal pivoting between plates 336 and 330 around the pivot axis defined by rivets 340. This would allow fine adjustment of a horizontal aiming of alignment beam source 310.

The rotationally adjustment of alignment beam source 310 controlled by brackets 320/322 and threaded bolt assembly 326, and horizontal adjustment controlled by brackets 330/336 and threaded bolt assembly 342 work together to calibrate the alignment beam to be parallel to the defined reference plane of recessed areas 309 of housing 306 used for the aiming. For this example, the reference plane is based off these three recessed flat areas 309 cast in the outer housing 306. Other features of housing 306 could be used to establish a reference plane for aiming the completed unit 300. The vertical alignment of alignment beam 318 is controlled by "rotation adjuster" screw 326 (FIG. 14) while the horizontal alignment is controlled by "horizontal pan adjuster" screw 342.

As previously described, once calibrated so that beam 318 is parallel to the reference plane, the aiming (e.g. horizontal orientation) of assembled alignment beam unit 300 mounted on bracket 302 can be completed using the aiming system 10 previously described. It would be beneficial if the alignment beam 318 were within 0.1 degrees or so of dead on to its designed aiming direction. It is believed that as much as +/− three inch variance at the landmark or aiming point can in many cases be acceptable, but more accuracy is usually possible with this method. The horizontal orientation of the alignment beam 318 is determined by the relationship of the landmark location (or other aiming point) and the desired location of the devices and the orientation of the devices. This horizontal orientation of unit 300 is determined by the lighting designer or other person and provided to the worker aiming the alignment beam unit 300 with, e.g., aiming system 10.

When the entire assembled structure with the pre-aimed devices is initially preliminarily lowered onto base 210, fan-shaped alignment beam 318 would allow someone on or near the field to locate it by using the flash phenomenon previously described, even though the beam 318 itself could not be seen. This is an effective and efficient, as well as accurate, way to find the vertical reference plane for the entire pole. When the on-field worker confirms the flash at the appropriate and accurate landmark or aiming point that should coincide with the vertical reference plane, the correct rotational orientation of pole 200 is confirmed.

FIGS. 19B, 12, 13, and 23 illustrate the basic principals of this rotational alignment method. Alignment beam assembly 300 projects a narrow vertical beam of light 318 easily detected by the eye when directly in line with its aiming. Standing on the landmark, the worker looks at the alignment beam assembly 300. The worker walks in a line perpendicular to the line between the pole and the landmark until the beam "flash" is perceived in the worker's eye or eyes. The worker can direct the pole's rotation in either direction until the flash is visible when standing on the landmark. The worker can also continually confirm the correct rotation alignment as the pole is being lowered. The pole is then seated in place as its correct rotational position is completed. It is efficient and easy for the worker to find a known landmark.

In the present embodiment, alignment beam source 310 is a Class 2M laser beam during operation and all procedures of operation. Wavelength is 635-660 nm. Laser beam power for the classification is less than 1 mW CW. Beam diameter is less than 5 mm at aperture. Divergence is less than 1.5 mrad×1 radian. Transverse beam mode is TEM00. Other laser beams or collimated or pseudo-collimated light sources may be used.

It can be appreciated that the alignment beam could be battery powered within the housing unit 300. It could be turned on when assembling the pole and fitter and fixtures on the ground. It would need only a limited operation life for the elevation and rotation of the pole into correct position. The battery could then expire, as the alignment beam would not be needed again. Alternatively, an infrared (IR) remote control might be used to turn it on or off. Operation at selected, spaced apart times could be desired. For example, alignment could be periodically re-checked. Or poles 200 might be taken down for replacement or maintenance of poles or fixtures, and the alignment beam could be re-energized to realign the pole when re-erected.

However, as indicated in the Figures, the alignment beam source could be hard-wired to a remote power source provide permanent access to electrical power. A hard-wired switch could turn the alignment beam on or off when needed.

A slightly different pole alignment method is as follows. A convex mirror could be placed on pole 200 in a position correlated with the reference plane and the on-field worker could stand on the landmark with an alignment beam. The on-field worker would shine the alignment beam in the direction of the minor. When the pole is correctly rotated relative the landmark, the on-field worker should perceive the "flash" in the mirror to confirm correct alignment. Alternatively, the worker could walk laterally relative the pole, shining the alignment beam at the minor. When the flash is perceived, the worker would know how far and in what direction he/she is offset from the landmark and could direct rotation of the pole to the correct position.

Another possibility is the use of laser beam sensors. An on-field worker could point a commercially available laser beam sensor towards the alignment beam on pole 200. Such sensors can indicate through displays, LED lights, or audibly how far away the beam is from dead-on position. The worker can direct rotation of the pole to the correct position through some communication. A possibility is a walkie-talkie or radio frequency head set radio. A commercially available laser beam sensor is a Model 54 or 56 Thunder laser detector from Apache Technologies, Dayton, Ohio USA (+/−45 degree reception angle, accurate to within ⅛ inch, and truth at up to 500 feet whether laser beam is visible or not). It detects laser beam energy and responds with lights, a display, or sound to indicate closeness of proximity to the beam, and then when the detector is dead on the beam. Visible laser beams are not necessarily required. For example, an infrared (IR) laser beam could be used. An IR detector could be used at a position away from the IR laser beam to detect when in alignment with the non-visible IR laser beam.

2. Mechanical Pole Alignment Sighting Tool

An alternative or additional pole rotation confirmation tool is shown at FIG. 16. Tool 380 could be stamped out of metal or molded of plastic and mounted either to the side of pole fitter backbone 102 or even down nearer the bottom of pole 200 (e.g. at eye level to a person standing on field 202) such that portion 390 of back wall 382 and vertical slot 388 of front wall 386 are in coordination with the vertical reference plane of pole fitter 100 or pole 200. Back wall 382 and front wall 386 are held separated by middle portion 384. Portion 390 of back wall 382 could be colored a highly visually distinctive or high contrast color (e.g. white, fluorescent orange, etc.) compared to the color of the outer face of front wall 386 (e.g. flat black or gray). Tool 380 could be mounted to fitter 100 or pole 200 by any number of means including screws, bolts, ring clamp, or even adhesive or welding. It could be permanent or temporary.

A worker standing on the field at the correct location (e.g. the landmark) for the desired rotation of pole 200 would look (unaided or aided, e.g. with binoculars or the like) through vertical slot 388 in front wall 386. If that worker's line of sight 396 reveals portion 390 of back wall 382, the worker would assume pole 200 is in correct rotational position. However, as indicated in FIG. 16, if pole 200 is rotated too far clockwise around the long axis of pole 200, worker would see portion 392 through slot 388. In this example, portion 392 is of a bright or easily perceivable color such as red. The worker would then perceive red and know pole 200 is not correctly aligned, and know which direction (counter-clockwise) the pole needs to be rotated for correct alignment. The worker could communicate (or could him or herself) go back to the pole and rotate it slightly counter-clockwise to align it correctly. In this embodiment, portion 394 on the other side of middle portion 390 is a different color such as blue. Therefore, on the other hand, if the worker sees any part of blue section 394, he or she could communicate to rotate the pole clockwise an appropriate amount for correct alignment.

As can be appreciated, this method using tool 380 is less complex. It may be difficult to be as accurate as alignment beam assembly 300. It may require use of binoculars, a sighting scope, or other visual assistance. A rifle scope with bull's eye or cross hairs could be used for quite high accuracy. Use of mechanical sight 380 could be done without having to energize alignment beam 310, if one is mounted on pole 200, or sight 380 could be used instead of alignment beam 310.

G. Options and Alternatives

It will be appreciated that the present invention can take many forms and embodiments. The foregoing exemplary embodiments are by example and illustration only and are not inclusive or exclusive of the various forms and embodiments the invention and/or its aspects can take.

For example, as mentioned, different types of position sensing equipment can be used to indicate correct factory aiming of cones 120 or other devices. Also, factory aiming could be accomplished with entire fixtures or devices in place and/or with fixtures or devices on the poles. It is conceivable also that the aiming system 10 or other forms could be transported to a location outside of a main centralized factory. For example, it could be set up in a building or appropriate place near or on site of the installation.

Tools 230 and 380 could take various forms and embodiments. Variations obvious to those skilled in the art will be included.

Likewise, the precise form and configuration of alignment beam assembly 300 could vary. Variations obvious to those skilled in the art will be included within the aspects of the invention which are defined by the appended claims.

What is claimed is:

1. A method of installing a plurality of elevated devices at or near a physical target area or space so that an independently aimable output of each device is coordinated to promote a composite or aggregate effect from the plurality of devices, comprising:

a. prior to installation at the physical target area or space, preparing an aiming plan for the plurality of devices comprising:
   i. assigning the plurality of devices into one or more arrays of devices;
   ii. assigning an installed position, elevation, and orientation for each device relative the physical target area or space;
   iii. assigning an installed position for a support structure to support each device of each array in its assigned installed position, elevation, and orientation;
b. designating a common reference plane at or near each array;
c. translating the assigned installed position, elevation, and orientation of each device relative to the physical target area or space in the aiming plan into an aiming angle for each device of each array relative to the common array reference plane associated with the corresponding array;
d. adjusting each device to its translated aiming angle relative its said common array reference plane to a pre-aimed position;
e. mounting the array of pre-aimed devices to its support structure;
f. preliminarily installing each support structure at its assigned installed position at or near the physical target area or space;
g. finally installing each support structure and array by rotating around a vertical axis each preliminarily installed support structure and array at its assigned installed position to align the common array reference plane of each array of pre-aimed devices relative the physical target area or space to align the translated aiming angle of each device relative its common array reference plane with its assigned installed position and orientation relative the physical target area or space;
h. so that final, installed aiming of all devices at or near the physical target area or space is coordinated to promote a composite or aggregated effect with the outputs of the devices according to the aiming plan.

2. The method of claim 1 wherein the devices comprise lighting fixtures and the output comprises a light beam.

3. The method of claim 1 wherein the devices comprise antennas, transmitters, receivers, or transceivers of electromagnetic energy.

4. The method of claim 1 wherein the assigned installed position of each support structure is spaced apart from one another.

5. The method of claim 1 wherein the support structure comprises a pole or elevating structure.

6. The method of claim 1 wherein the step of rotating around a vertical axis is relative to an assigned reference point related to the target area or space.

7. The method of claim 6 wherein the assigned reference point is a landmark.

8. The method of claim 6 wherein each support structure is aligned with the same reference point related to the target area or space.

9. The method of claim 1 wherein the translation comprises using a position sensor system which senses position and orientation of the devices relative to the reference plane.

10. The method of claim 9 wherein the position sensor system comprises an optical motion tracker system.

11. The method of claim 1 wherein the translation comprises using light beams associated with orientation of each device in conjunction with a projected grid with aiming points for each device.

12. The method of claim 1 wherein the translation comprises using light beams associated with orientation of each device in conjunction with a common target.

13. The method of claim 1 wherein the translation comprises using a virtual reality system in conjunction with a position sensor.

14. A method of positioning and orienting a plurality of devices relative a target area or space, each device adapted to project an individual aimable output, comprising:

a. preparing an aiming plan for a composite or aggregated effect from the aimable outputs of the plurality of devices, the aiming plan including a predetermined individual position and aiming orientation of each device in space at or around the target area or space, the aiming plan organizing the devices into one or more sets or arrays of devices, each set or array adapted to be supported on a supporting member each designed for installation at a predetermined position and vertical orientation relative the target area or space, each device mounted to its supporting member by an adjustable mount;

b. assembling the adjustable mount for each device of a set or array to a mounting member;

c. designating for each set or array a common reference plane related to its mounting member;

d. pre-aiming each adjustable mount relative to the common reference plane for its set or array;

e. preliminarily installing the mounting member and pre-aimed devices for each set or array in its predetermined position and vertical orientation relative the target area or space so that the reference plane is in the same general vertical orientation as the vertical orientation of the supporting member in the aiming plan;

f. if needed, rotating the supporting member around a vertical axis to rotate the reference plane to a predetermined orientation relative to the target area or space;

g. so that pre-aiming of all mounts relative to a reference plane for each set or array and preliminary installing of each supporting member is coordinated into a final installation to promote a composite or aggregated effect with the outputs according to the aiming plan.

15. The method of claim 14 wherein the devices comprise lighting fixtures and the output comprises a light beam.

16. The method of claim 14 wherein the supporting member comprises a pole or elevating structure.

17. The method of claim 1 wherein the support structure includes a cross arm to which is mounted one or more said devices.

18. The method of claim 1 wherein the support structure comprises a top fitter to which are mounted an array.

19. The method of claim 14 wherein the mounting member comprises a cross arm.

20. The method of claim 14 wherein the mounting member comprises a top fitter.

21. A method for installing a plurality of aimable devices comprising:

a. creating an aiming plan for the aimable devices relative to a target space including xyz dimensions, wherein the aiming plan includes:
   i. where each device is positioned in the xyz space;
   ii. how each device is aimed relative to the xyz space;

b. pre-aiming each device by:
   i. designating a reference plane at or near each device;
   ii. deriving a relationship between the reference plane and the xyz space;
   iii. pre-aiming the device based on the derived relationship;

c. installing in the xyz space the devices by aligning the reference plane for a device in a predetermined relationship to the xyz space.

22. The method of claim 21 wherein the device is a lighting fixture having a light output distribution pattern that is aimable.

23. The method of claim 22 wherein the xyz space is generally defined by the length and width of an athletic field and the space above that length and width.

24. The method of claim 23 wherein the aiming plan is computer-generated based on predetermined illumination target levels.

25. The method of claim 24 wherein the reference plane is related to physical structure at or near the device.

* * * * *